United States Patent
Otsuka et al.

(10) Patent No.: US 8,682,546 B2
(45) Date of Patent: Mar. 25, 2014

(54) VEHICULAR DAMPING CONTROL SYSTEM

(75) Inventors: Takayuki Otsuka, Susono (JP); Kenji Harima, Numazu (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 10 days.

(21) Appl. No.: 13/382,193

(22) PCT Filed: Jun. 23, 2010

(86) PCT No.: PCT/IB2010/001509
§ 371 (c)(1),
(2), (4) Date: Jan. 4, 2012

(87) PCT Pub. No.: WO2011/004228
PCT Pub. Date: Jan. 13, 2011

(65) Prior Publication Data
US 2012/0101691 A1    Apr. 26, 2012

(30) Foreign Application Priority Data

Jul. 9, 2009 (JP) .................................. 2009-163063
Jul. 9, 2009 (JP) .................................. 2009-163079

(51) Int. Cl.
*B60W 10/06* (2006.01)
*B60W 30/02* (2012.01)

(52) U.S. Cl.
USPC ........... 701/54; 701/101; 701/103; 123/192.1

(58) Field of Classification Search
CPC .. B60W 30/025; B60W 30/02; B60W 30/022
USPC ..................................................... 123/192.1
See application file for complete search history.

(56) References Cited

U.S. PATENT DOCUMENTS

| | | | | |
|---|---|---|---|---|
| 5,537,967 | A | * | 7/1996 | Tashiro et al. .............. 123/192.1 |
| 6,621,244 | B1 | * | 9/2003 | Kiyomiya et al. ............ 318/611 |
| 7,633,257 | B2 | * | 12/2009 | Sakamoto et al. ............ 318/611 |
| 2007/0042861 | A1 | | 2/2007 | Takaoka et al. |
| 2007/0113546 | A1 | | 5/2007 | Jankovic |
| 2008/0249690 | A1 | | 10/2008 | Matsumoto et al. |

(Continued)

FOREIGN PATENT DOCUMENTS

| | | |
|---|---|---|
| EP | 1 221 394 | 7/2002 |
| EP | 1 978 278 | 10/2008 |

(Continued)

OTHER PUBLICATIONS

International Search Report Issued Mar. 4, 2011 in PCT/IB10/01509 FIled Jun. 23, 2010.

*Primary Examiner* — Khoi Tran
*Assistant Examiner* — Ryan Rink
(74) *Attorney, Agent, or Firm* — Oblon, Spivak, McClelland, Maier & Neustadt, L.L.P.

(57) ABSTRACT

A vehicular damping control system that executes damping control that suppresses sprung mass vibration in the vehicle by controlling a power source mounted in a vehicle changes the control mode of the damping control according to the operating range of the power source. Changing the control mode of the damping control according to the operating range of the power source enables the vehicular damping control system to improve coordination between the damping control and other control related to the power source, for example, and thus execute appropriate damping control.

16 Claims, 30 Drawing Sheets

(56) References Cited

U.S. PATENT DOCUMENTS

| | | |
|---|---|---|
| 2008/0276904 A1 | 11/2008 | Surnilla et al. |
| 2009/0112402 A1* | 4/2009 | Furuichi et al. ............ 701/38 |
| 2009/0145381 A1 | 6/2009 | Watanabe |
| 2010/0228465 A1 | 9/2010 | Itabashi |

FOREIGN PATENT DOCUMENTS

| | | |
|---|---|---|
| JP | 7 324644 | 12/1995 |
| JP | 10 227243 | 8/1998 |
| JP | 11 173186 | 6/1999 |
| JP | 2001-336435 | 12/2001 |
| JP | 2002-180863 | 6/2002 |
| JP | 2003 148222 | 5/2003 |
| JP | 2004-76677 | 3/2004 |
| JP | 2004 168148 | 6/2004 |
| JP | 2005-140032 | 6/2005 |
| JP | 2006 69472 | 3/2006 |
| JP | 2007-138928 | 6/2007 |
| JP | 2008-274954 | 11/2008 |
| JP | 2009-108829 | 5/2009 |
| JP | 2009 108830 | 5/2009 |
| JP | 2009-114862 | 5/2009 |
| JP | 2009-132380 | 6/2009 |
| WO | 2009 057750 | 5/2009 |
| WO | 2010 049766 | 5/2010 |

* cited by examiner

FOR PM REGENERATION MODE

ENGINE SPEED

LOW COOLANT TEMPERATURE

MEDIUM COOLANT TEMPERATURE

HIGH COOLANT TEMPERATURE

F I G . 31
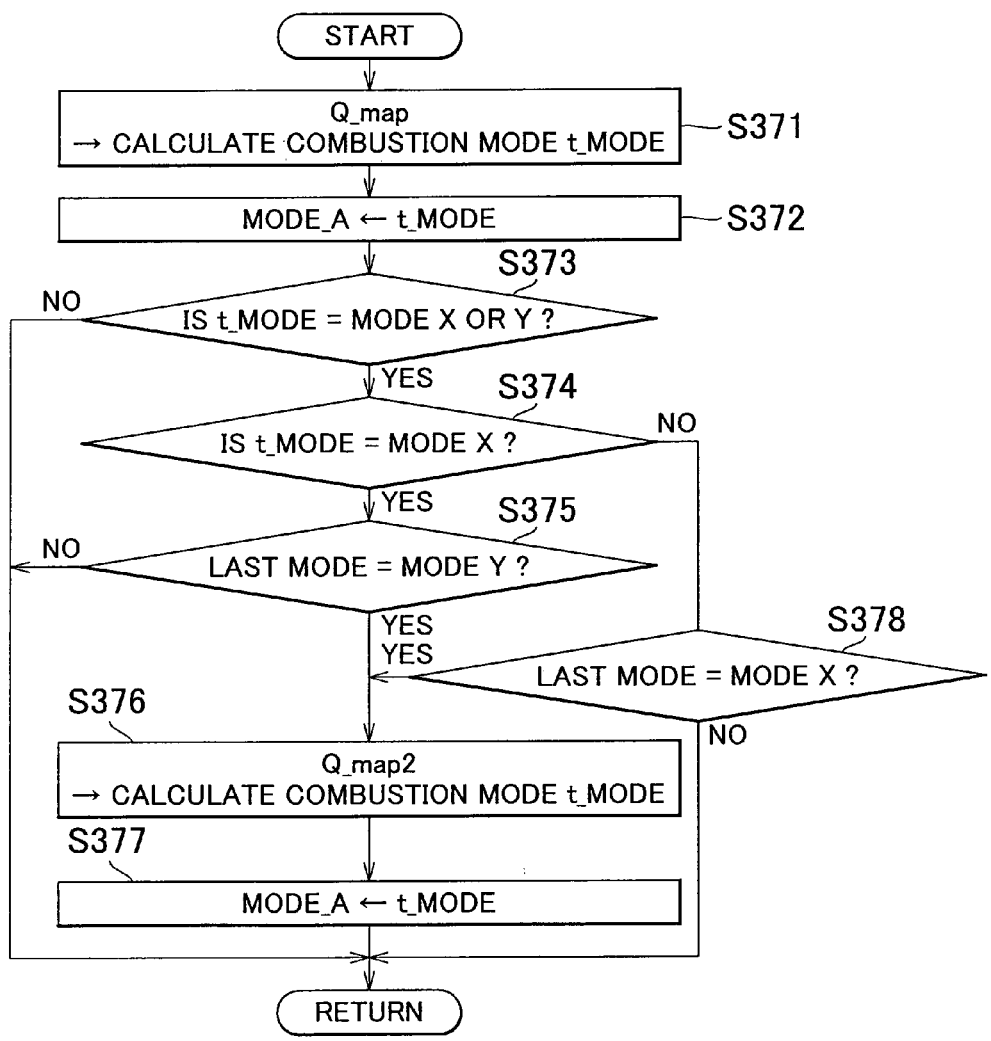

F I G . 32
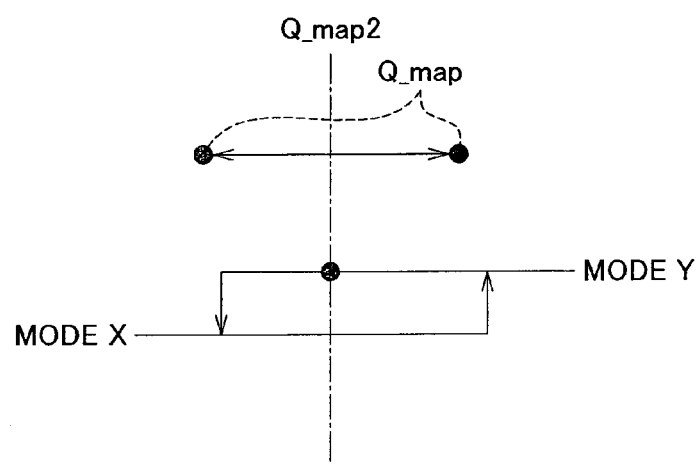

VEHICULAR DAMPING CONTROL SYSTEM

BACKGROUND OF THE INVENTION

1. Field of the Invention

The invention relates to a vehicular damping control system. More particularly, the invention relates to a vehicular damping control system that suppresses sprung mass vibration in a vehicle by controlling a power source mounted in the vehicle.

2. Description of the Related Art

One known vehicular damping control system that suppresses vibration in a vehicle is a vehicular damping control system that executes so-called sprung mass damping control that suppresses sprung mass vibration in a vehicle by controlling the power source. Sprung mass vibration in a vehicle here refers to vibration of a frequency component of 1 to 4 Hz, for example, (the frequency component that appears differs noticeably depending on the type and structure of the vehicle; a frequency component near 1.5 Hz is common in many vehicles) of the vibration that is generated in a vehicle body via the suspension from input from the road surface to the wheels of the vehicle, when the vibration source is the road surface. This sprung mass vibration in a vehicle includes a component in the pitch direction or the bounce direction (i.e., the vertical direction) of the vehicle.

One such related vehicular damping control system is the vehicle stabilizing control system described in Japanese Patent Application Publication No. 2006-69472 (JP-A-2006-69472), for example. The vehicle stabilizing control system described in JP-A-2006-69472 uses the sum of the running resistance disturbance and the estimated drive shaft torque as the current driving force, and obtains the pitching vibration corresponding to this current driving force from an output equation and an equation-of-state of a vehicle body sprung mass vibration model. The vehicular stabilizing control system then obtains a correction value such that the pitching vibration expressed by this output equation quickly becomes 0, then corrects the basic required engine torque based on this, correction value, and adjusts the intake air amount, the fuel injection quantity, and the ignition timing and the like of the engine, which serves as the power source, based on the corrected engine torque, so as to control the driving force of the vehicle to suppress sprung mass vibration in the vehicle.

Incidentally, with the vehicular stabilizing control system described in JP-A-2006-69472 described above, it is desirable to execute more appropriate damping control, such as to coordinate the damping control described above with other control such as normal engine control, based on the state of the power source, i.e., the engine or the like, for example.

Also, conventionally this type of vehicular damping control system performs sprung mass damping control that suppresses sprung mass vibration input from the road surface by performing fuel injection control of the engine. This sprung mass damping control is control that estimates pitching from a change in the driving wheels, and controls the engine torque by adjusting the fuel injection quantity to suppress that estimated pitching.

With a diesel engine, the engine torque is determined by the fuel injection quantity, so the engine torque can be converted to a fuel injection quantity and vice versa. Therefore, in a diesel engine, fuel injection control in the engine is performed by adding the control amount of the sprung mass control to the driver required torque that has been calculated from the accelerator operation amount, the vehicle speed, or the gear speed or the like, and converting this required torque to a fuel injection quantity.

On the other hand, diesel engines incorporate measures for reducing emissions, such as using catalysts, EGR, and the like, and regeneration control is also performed so that the performance of the catalyst does not decrease due to particulates and sulfur accumulating in the catalyst. This regeneration control controls the EGR amount, as well as catalyst temperature increase control, the quantity of fuel in a main injection that controls the air-fuel ratio flowing into the catalyst, the injection timing, and multiple injections that include pilot injections and after-injections and the like. Also, EGR amount control and multiple injection control are also performed to suppress oxides of nitrogen emitted from diesel engines. Optimal combinations of these controls are determined as control modes, such as combustion control modes and multiple injection control modes of the engine, mainly by the engine speed and the fuel injection quantity calculated from the driving force required by the driver, such as from the accelerator operation amount and the gear speed and the like.

Incidentally, when these kinds of control modes change, the injection quantity and the injection timing and the like also change, which causes the torque to fluctuation suddenly. Therefore, in order to inhibit these control modes from being changed frequently, technology described in Japanese Patent Application Publication No. 11-173186 (JP-A-11-173186) provides hysteresis in the transition region between a pilot region where a pilot injection is performed and a normal region where a pilot injection is not performed. Moreover, the technology described in JP-A-11-173186 suppresses a sudden torque fluctuation by changing the fuel injection quantity of the pilot injection, the time interval between the pilot injection and the main injection, the fuel injection quantity of the main injection, and the fuel injection timing in a continuous manner in this transition region.

However, because the fuel injection quantity is changed as a result of incorporating the sprung mass damping control described above, the control mode may still change frequently even if hysteresis is provided in the control mode switching region. When the control mode changes, a phase offset in the actual torque with respect to the torque required by the driver occurs and the gain (in the amount of actual torque with respect to the required torque) changes. That is, when the control mode changes, the EGR state (whether EGR is on or off) and the multiple injection state change within a short period of time. As a result, if the actual torque differs from the required torque due to differences in the multiple injections and the responsiveness of the EGR gas, a difference will occur in the torque before and after the control mode is switched, which will cause the phase to be offset and the gain to change. If the phase is offset, damping control that does not match the pitching frequency will be performed so pitching will be unable to be sufficiently suppressed. Also, if the gain changes, excessive damping control may produce a "rough" feeling, while insufficient damping control will not be able to suppress pitching sufficiently. In this way, with the related vehicle control systems, even if sprung mass damping control is performed, improvements in riding comfort and operational stability are difficult to realize due to the frequent changing of the control mode.

SUMMARY OF THE INVENTION

Therefore, in view of this problem, the invention provides a vehicular damping control system capable of improving riding comfort by executing appropriate damping control.

Thus, a first aspect of the invention relates to a vehicular damping control system that executes damping control that suppresses sprung mass vibration in a vehicle by controlling a power source mounted in the vehicle, in which a control mode of the damping control is changed according to an operating range of the power source.

Also, in this vehicular damping control system, when the power source is operating near a boundary between different operating ranges of the power source, the control mode of the damping control may be changed such that the power source operates in one of the operating ranges where the damping control is not executed.

Also, in the vehicular damping control system described above, the operating range of the power source may be determined according to at least an operation amount of the power source for adjusting a control amount in the damping control, and the control mode of the damping control may be changed by limiting the operation amount when the power source is operating near a boundary between different operating ranges of the power source.

Also, in the vehicular damping control system described above, the power source may include at least an engine, and the different operating ranges of the power source may be operating ranges having different air-fuel ratios of an air-fuel mixture that is able to be combusted in a combustion chamber of the power source.

Also, in the vehicular damping control system described above, the different operating ranges of the power source may be a stoichiometric air-fuel ratio operating range where the air-fuel ratio is a stoichiometric air-fuel ratio, and a lean air-fuel ratio operating range where the air-fuel ratio is a lean air-fuel ratio in which the ratio of fuel is less than the ratio of fuel in the stoichiometric air-fuel ratio.

Also, in the vehicular damping control system described above, the different operating ranges of the power source may be a stoichiometric air-fuel ratio operating range where the air-fuel ratio is a stoichiometric air-fuel ratio, and a rich air-fuel ratio operating range where the air-fuel ratio is a rich air-fuel ratio in which the ratio of fuel is greater than the ratio of fuel in the stoichiometric air-fuel ratio.

Also, in the vehicular damping control system described above, the power source may include at least an engine, and the different operating ranges of the power source may be a cylinder-deactivated operating range in which the operation of at least one of a plurality of cylinders of the power source is halted, and an all-cylinders-activated operating range in which all of the plurality of cylinders of the power source are operated.

Also, in the vehicular damping control system described above, the power source may include at least an engine, and the different operating ranges of the power source may be ranges in which the state of intake air of the power source differs.

Also, in the vehicular damping control system described above, the power source may include at least an engine, and the different operating ranges of the power source may be regions in which the state of exhaust of the power source differs. The operating ranges in which the state of the exhaust of the power source differs may be an EGR activated operating range of the engine, and an EGR deactivated operating range of the engine.

Also, in the vehicular damping control system described above, the different operating ranges of the power source may be ranges in which the operating state of an actuator of the power source differs.

Also, in the vehicular damping control system described above, when there are a plurality of combinations of different operating ranges of the power source, the control mode of the damping control may be changed when the power source is operating near the boundary between different operating ranges of each of the combinations.

Also, in the vehicular damping control system described above, the control mode of the damping control may be changed by changing means for adjusting the control amount in the damping control for each of the different operating ranges of the power source.

Also, in the vehicular damping control system described above, the power source may include at least an engine, and the different operating ranges of the power source may be a pressure-boost adjusting operating range in which the control amount in the damping control is adjusted by adjusting boost pressure in an intake passage with a supercharger provided in the intake passage, and a throttle adjusting operating range in which the control amount in the damping control is adjusted by adjusting an opening amount of the intake passage with a throttle valve provided in the intake passage.

Also, in the vehicular damping control system described above, the power source may include at least an engine, and the different operating ranges of the power source may be a lift adjusting operating range in which the control amount in the damping control is adjusted by adjusting a lift amount of an intake valve provided in the intake passage with a variable intake valve lift mechanism, and a throttle adjusting operating range in which the control amount in the damping control is adjusted by adjusting an opening amount of the intake passage with a throttle valve provided in the intake passage.

Also, in the vehicular damping control system described above, the power source may include at least an engine and an electric motor, and the different operating ranges of the power source may be an engine adjusting operating range in which the control amount in the damping control is adjusted by adjusting the output of the engine, and an electric motor adjusting operating range in which the control amount in the damping control is adjusted by adjusting the output of the electric motor.

Also, in the vehicular damping control system described above, when the different operating ranges of the power source include three or more different operating ranges, the control mode of the damping control may be changed by changing means for adjusting the control amount in the damping control for each of the operating ranges.

According to the vehicular damping control system described above, damping control is able to be executed appropriately by changing the control mode of the damping control according to the operating range of the power source.

Further, the control mode of the damping control may be changed according to a control mode of the power source that is selected according to the state of the power source.

According to this vehicular damping control system, damping control suitable for the control mode of the power source can be performed by changing the control mode of the damping control according to the control mode of the power source.

Also, an operating state (a control amount) of the damping control may be reduced in a region where the control mode of the power source that is selected according to the state of the power source switches, compared to a region where the control mode does not switch.

According to this vehicular damping control system, reducing the operating state (i.e., the control amount) of the damping control in a region where the control mode of the power source switches compared to a region where the control mode does not switch makes it possible to reduce sudden changes in damping control that occur when the control mode switches. As a result, torque fluctuation is able to be suppressed which enables riding comfort to be improved.

Also, the damping control may be prohibited in a region where the control mode of the power source that is selected according to the state of the power source switches.

According to this vehicular damping control system, prohibiting the damping control in the region where the control mode of the power source switches makes it possible to prevent the control mode from switching frequently due to the effects from the damping control. As a result, torque fluctuation caused by the control mode switching is able to be suppressed, so riding comfort can be improved.

Also, the control mode of the damping control may be changed such that the damping control will continue to be executed in a region where the control mode of the power source that is selected according to the state of the power source will not switch.

According to this vehicular damping control system, changing the control mode of the damping control such that the damping control will continue to be executed in a region where the control mode of the power source that is selected according to the state of the power source will not switch makes it possible to prevent the control mode from switching while performing damping control. As a result, a decrease in the damping control effect due to the control mode switching can be prevented, and torque fluctuation caused by the control mode switching can be suppressed, which enables riding comfort to be improved.

In this case, the execution state of the damping control may be determined based on a control amount until the control mode switches. Determining the execution state of the damping control based on the control amount until the control mode switches in this way makes it possible to prevent a decrease in the damping control effect due to the control mode switching.

Also, the execution state of the damping control may be determined on the condition that the control mode does not switch. Determining the execution state of the damping control on the condition that the control mode does not switch in this way makes it possible to prevent a decrease in the damping control effect due to the control mode switching.

In this case, a gain of the damping control may be corrected. Correcting the gain of the damping control in this way enables the control amount in the damping control to be changed smoothly, so riding comfort can be improved.

Also, a control amount for selecting a control mode of the power source that is selected according to the state of the power source may be a value obtained by subtracting the control amount of the damping control.

According to this vehicular damping control system, setting the control amount for selecting the control mode of the power source to a value obtained by subtracting the control amount of the damping control makes it possible to prevent the control mode from switching while performing damping control. As a result, torque fluctuation caused by the control mode switching can be suppressed, so riding comfort can be improved.

Incidentally, the power source may be a diesel engine, and the control mode of the power source may be related to fuel combustion. In this way, riding comfort can be effectively improved in a vehicle provided with a diesel engine by suppressing the control mode related to fuel combustion of the diesel engine from switching.

Also, the power source may include at least an engine, and when a vibration fluctuation component of approximately 1.5 Hz is generated in the vertical direction of the vehicle, damping control may be performed by outputting anti-phase torque from the engine. Also, anti-phase torque may be prohibited from being output from the engine in a region where a control mode of the engine that is selected according to a usage region of the engine switches.

According to this vehicular damping control system, prohibiting anti-phase torque from being output from the engine in a region where a control mode of the engine switches makes it possible to prevent the control mode from switching frequently due to anti-phase torque being output when a fluctuation component of approximately 1.5 Hz is generated in the vertical direction of the vehicle. As a result, torque fluctuation caused by the control mode switching can be suppressed, so riding comfort can be improved.

Also, anti-phase torque may be output from the engine in a range where a control mode of the engine that is selected according to a usage region of the engine will not switch.

According to this vehicular damping control system, outputting anti-phase torque from the engine in a range where a control mode of the engine that is selected according to a usage region of the engine will not switch makes it possible to prevent the control mode from switching while suppressing vibration in the vehicle. As a result, a decrease in the damping control effect due to the control mode switching can be prevented, and torque fluctuation caused by the control mode switching can be suppressed, which enables riding comfort to be improved.

Also, the gain of anti-phase torque output from the engine may be corrected in a range where a control mode of the engine that is selected according to a usage region of the engine will not switch.

According to this vehicular damping control system, the gain of anti-phase torque output from the engine is corrected in a range where a control mode of the engine that is selected according to a usage region of the engine will not switch, so the control mode of the engine can be prevented from switching, while torque fluctuation can be made smooth. As a result, it is possible to prevent a decrease in the vibration suppression effect due to the control mode switching, and torque fluctuation caused by the control mode switching can be suppressed, so riding comfort can be improved.

Also, a control mode of the engine may be selected precluding the anti-phase torque that is output from the engine by the damping control, in a region where the control mode of the engine that is selected according to a usage region of the engine switches.

According to this vehicular damping control system, selecting a control mode of the engine precluding the anti-phase torque that is output from the engine by the damping control, in a region where the control mode of the engine that is selected according to a usage region of the engine switches makes it possible to prevent the control mode from switching due to anti-phase torque output from the engine according to damping control when selecting the control mode. As a result, it is possible to prevent the control mode from switching while performing damping control by outputting anti-phase torque from the engine, when a fluctuation component of approximately 1.5 Hz is generated in the vertical direction of the vehicle, in a region where the control mode of the engine switches.

Accordingly, the invention enables riding comfort to be improved by inhibiting the control mode of the power source from changing when damping control is performed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein:

FIG. 31 is a flowchart illustrating how the mode is calculated by the sprung mass damping required driving force outputting portion in the vehicular damping control system according to a sixth example embodiment of the invention; and FIG. 32 is a view showing a switch between mode X and mode Y in the vehicular damping control system according to a sixth example embodiment of the invention.

DETAILED DESCRIPTION OF EMBODIMENTS

Example embodiments the vehicular damping control system according to the present invention will be described in greater detail below with reference to the accompanying drawings. Incidentally, the invention is not limited by these example embodiments. Also, the constituent elements of the example embodiments described below include elements that can be easily substituted by one skilled in the art or elements that are substantially similar.

Figure 1:
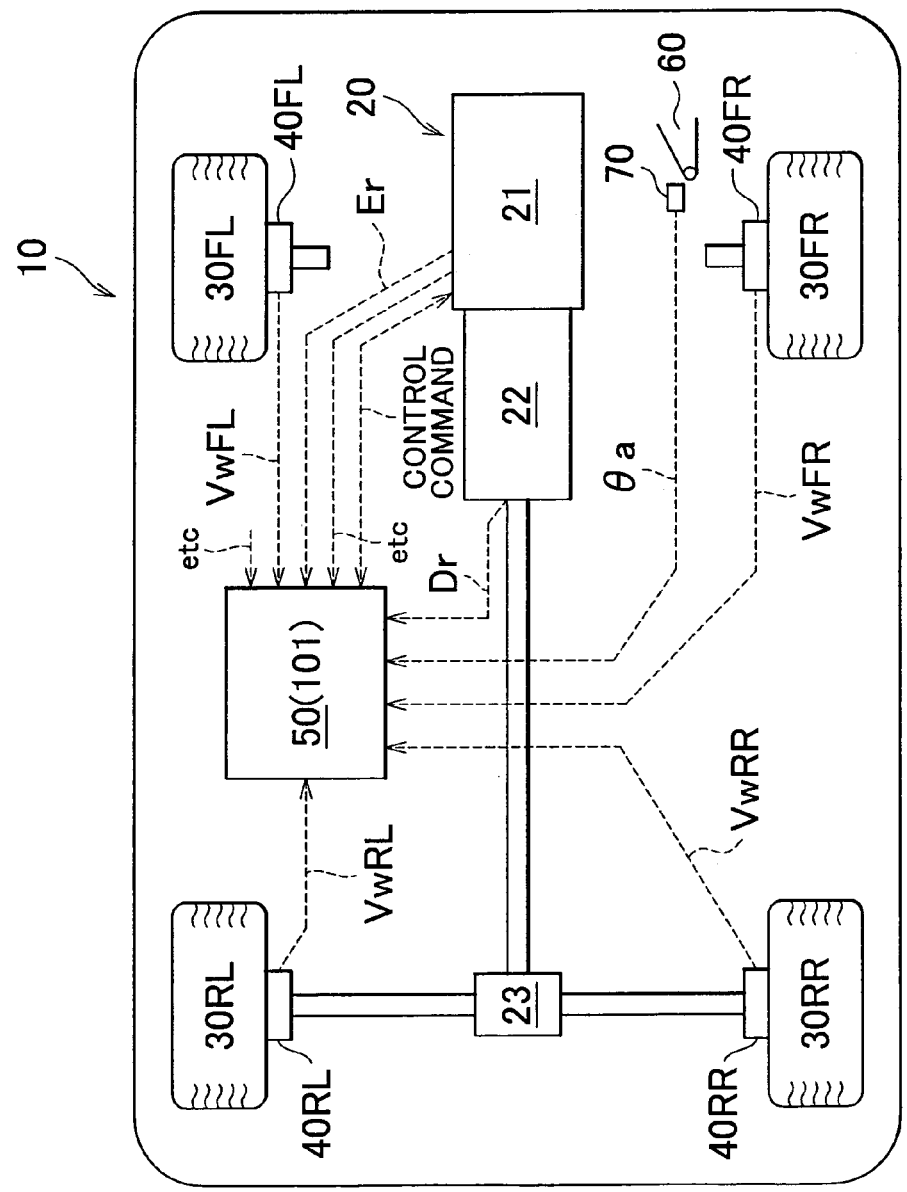
FIG. 1 is a block diagram schematically showing an example structure of a vehicle to which a vehicular damping control system according to a first example embodiment of the invention has been applied.
Figure 2:
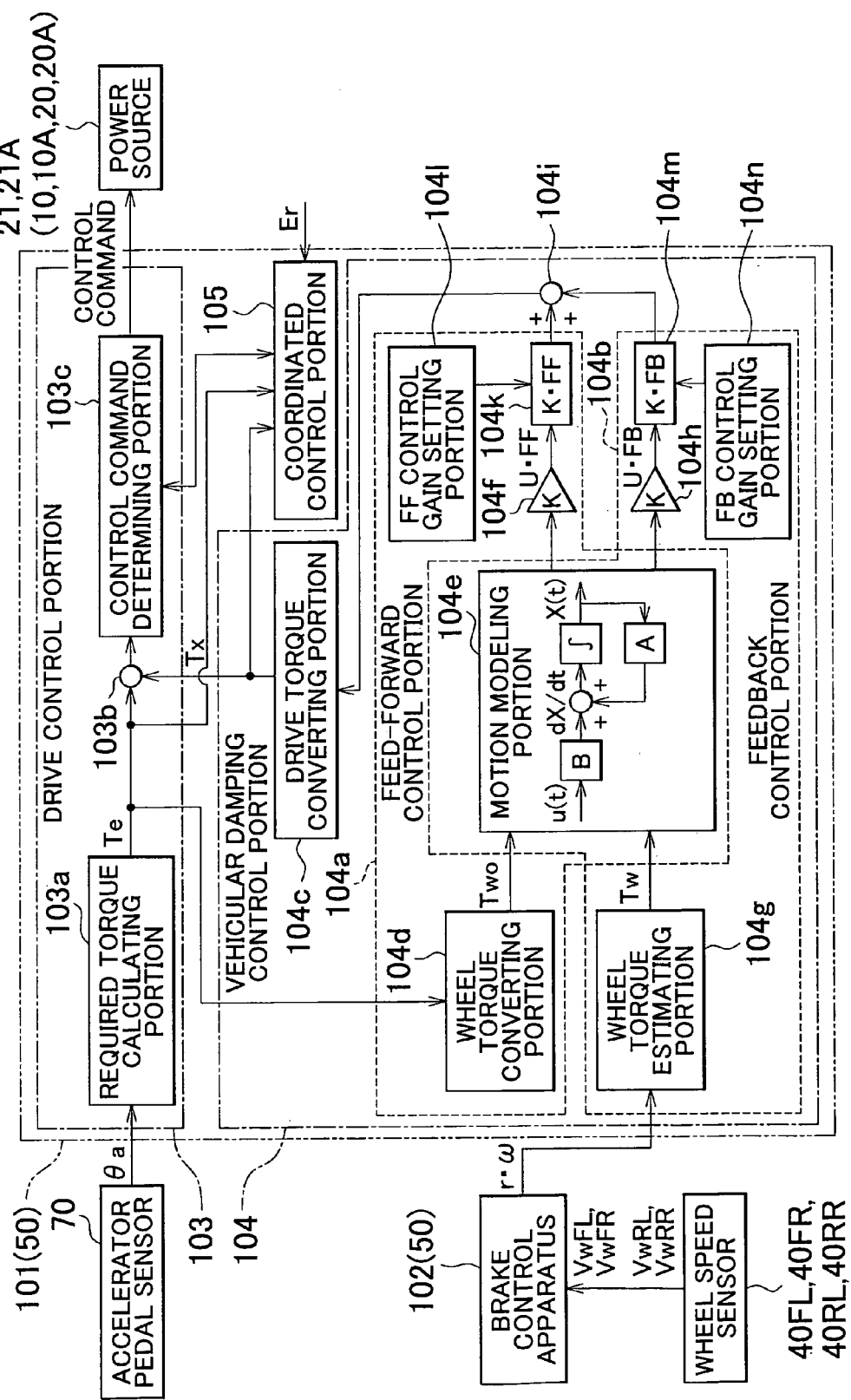
FIG. 2 is a view in the form of control blocks showing a frame format of an example of the functional structure of the vehicular damping control system according to the first example embodiment of the invention.
Figure 3:
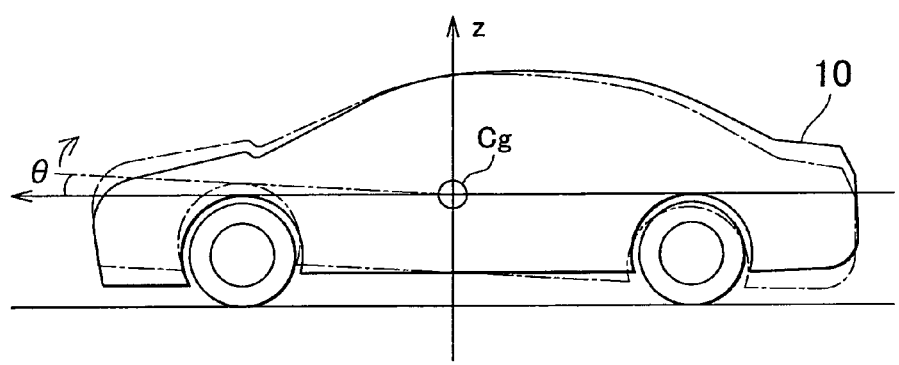
FIG. 3 is a view illustrating state variables of vehicle body vibration that is suppressed in the vehicular damping control system according to first example embodiment of the invention.
Figure 4:
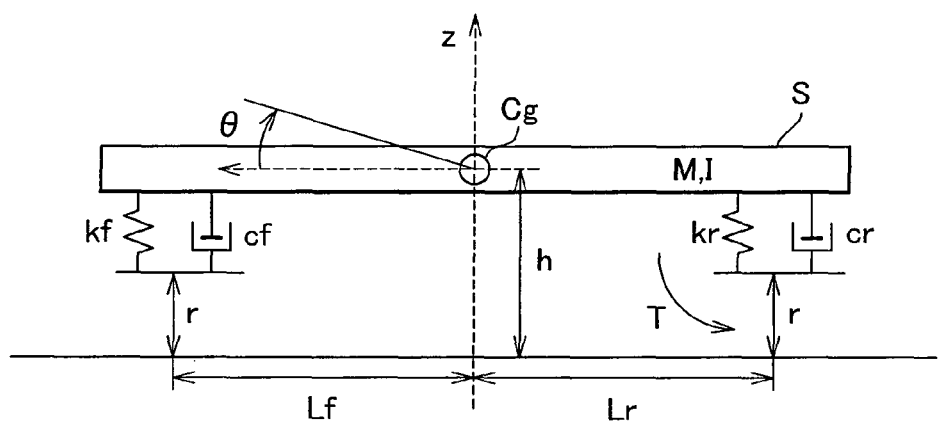
FIG. 4 is a diagram of an example of a dynamic motion model of assumed vehicle body vibration in the vehicular damping control system according to the first example embodiment of the invention.
Figure 5:
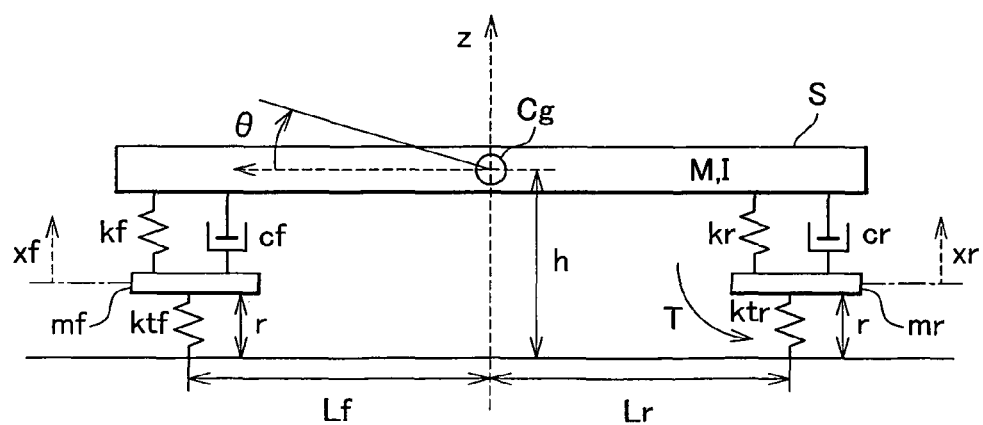
FIG. 5 is a diagram of another example of a dynamic motion model of assumed vehicle body vibration in the vehicular damping control system according to the first example embodiment of the invention.
Figure 6:
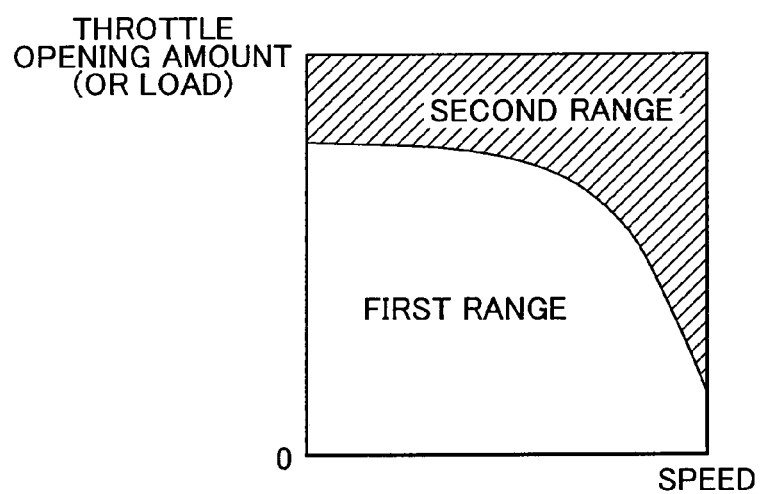
FIG. 6 is a view of one example of an operating range determining map of the vehicular damping control system according to the first example embodiment of the invention.
Figure 7:
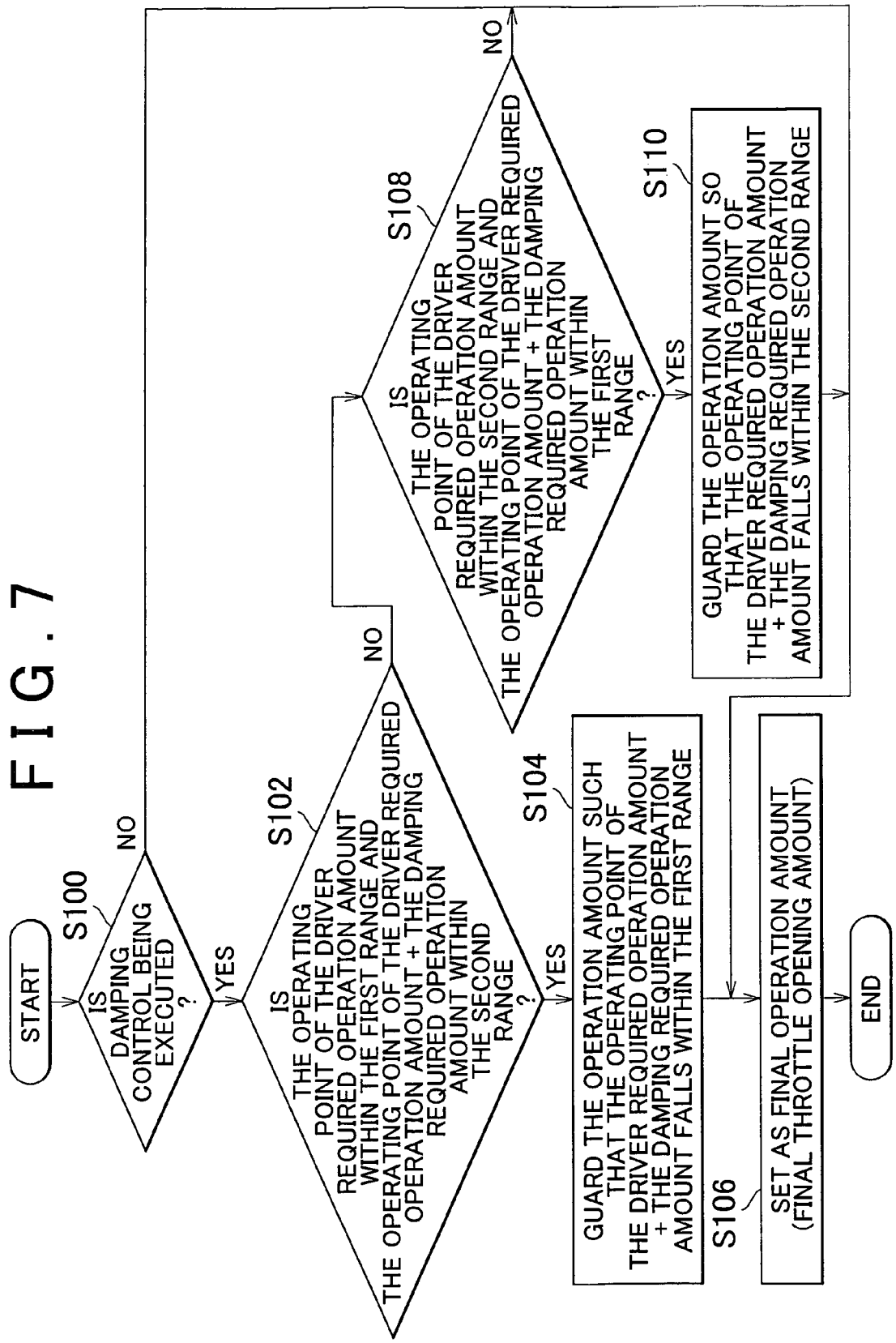
FIG. 7 is a flowchart illustrating an example of coordinated control of the vehicular damping control system according to the first example embodiment of the invention.
Figure 8:
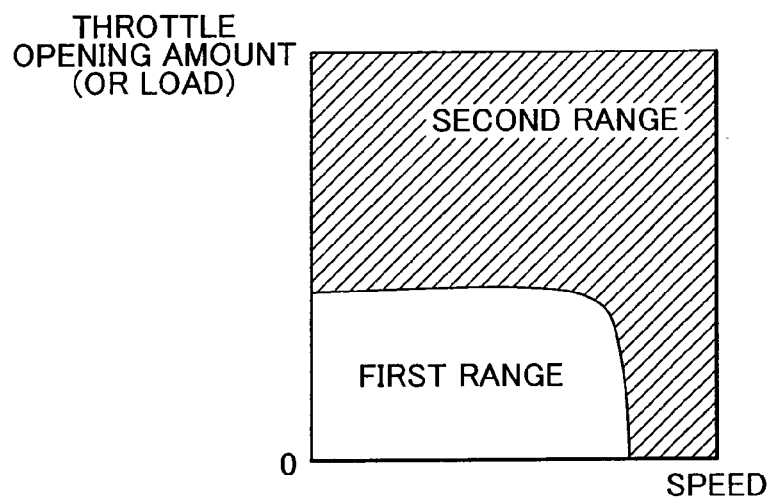
FIG. 8 is a view of another example of an operating range determining map of the vehicular damping control system according to the first example embodiment of the invention.
Figure 9:
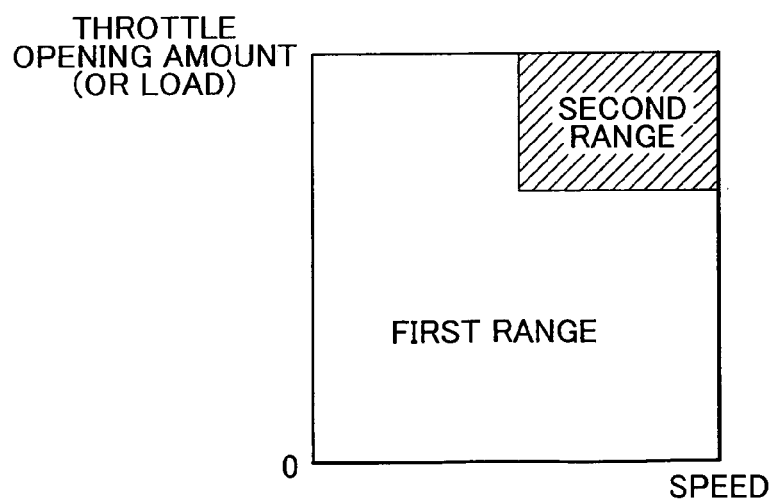
FIG. 9 is a view of yet another example of an operating range determining map of the vehicular damping control system according to the first example embodiment of the invention.
Figure 10:
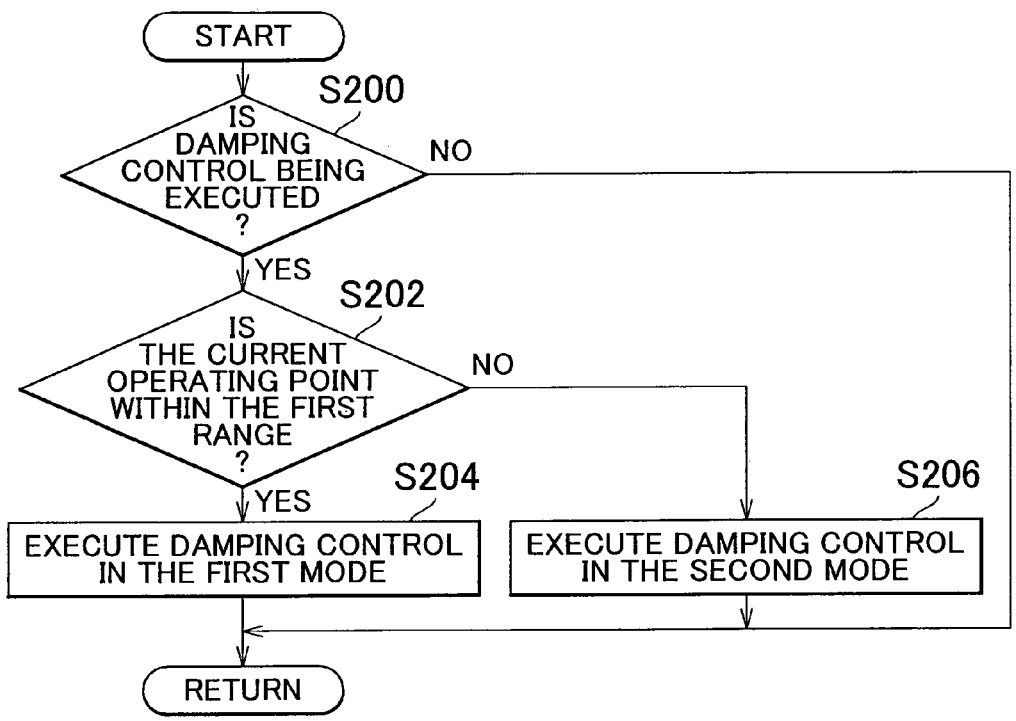
FIG. 10 is a flowchart illustrating another example of coordinated control of the vehicular damping control system according to the first example embodiment of the invention.
Figure 11:
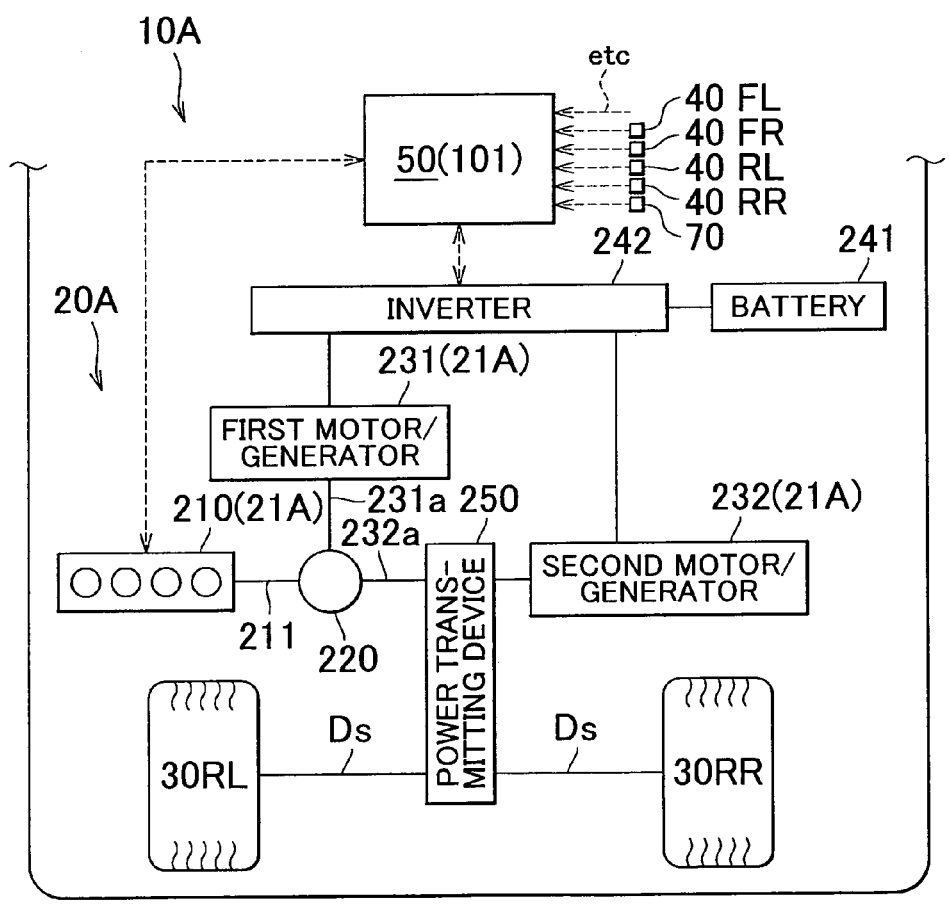
FIG. 11 is a block diagram schematically showing another example structure of a vehicle to which the vehicular damping control system according to the first example embodiment of the invention has been applied.

FIG. 1 is a block diagram schematically showing an example structure of a vehicle to which a vehicular damping control system according to a first example embodiment of the invention has been applied. FIG. 2 is a view in the form of control blocks showing a frame format of an example of the functional structure of the vehicular damping control system according to the first example embodiment of the invention. FIG. 3 is a view illustrating state variables of vehicle body vibration that is suppressed in the vehicular damping control system according to first example embodiment of the invention. FIGS. 4 and 5 are diagrams of examples of a dynamic motion model of assumed vehicle body vibration in the vehicular damping control system according to the first example embodiment of the invention. FIG. 6 is a view of one example of an operating range determining map of the vehicular damping control system according to the first example embodiment of the invention. FIG. 7 is a flowchart illustrating an example of coordinated control of the vehicular damping control system according to the first example embodiment of the invention. FIGS. 8 and 9 are views of other examples of an operating range determining map of the vehicular damping control system according to the first example embodiment of the invention. FIG. 10 is a flowchart illustrating another example of coordinated control of the vehicular damping control system according to the first example embodiment of the invention, and FIG. 11 is a block diagram schematically showing another example structure of a vehicle to which the vehicular damping control system according to the first example embodiment of the invention has been applied.

A vehicular damping control system 101 according to the first example embodiment is applied to a vehicle 10 provided with a power source 21 as a power source for running, as shown in FIG. 1. Incidentally, the vehicle 10 shown in FIG. 1 is described as using an engine, such as a gasoline engine, a diesel engine, or an LPG engine, as the power source 21. However, the vehicle 10 may also use an electric motor, or an engine together with an electric motor, like the vehicle 10A shown in FIG. 11 which will be described later. That is, the vehicular damping control system 101 may also be applied to a so-called hybrid vehicle 10A.

Also, the vehicle 10 to which the vehicular damping control system 101 according to the first example embodiment has been applied has the power source 21 mounted toward the front in the direction in which the vehicle 10 travels and is a rear wheel drive vehicle in which the driving wheels are the left and right rear wheels, i.e., wheels 30RL and 30RR. Incidentally, the position in which the power source 21 of the vehicle 10 is mounted is not limited to being toward the front. That is, the power source 21 of the vehicle 10 may also be mounted toward the rear or in the center. Also, the drive configuration of the vehicle is not limited only to rear wheel drive. That is, the vehicle 10 may also be a front wheel drive vehicle or a four wheel drive vehicle.

Also, as shown in FIG. 1, the vehicular damping control system 101 according to this first example embodiment is formed built into an electronic control unit (ECU) 50, which will be described later. That is, the vehicular damping control system 101 is described as being formed together with the ECU 50, but the invention is not limited to this. That is, the vehicular damping control system 101 may also be formed separate from the ECU 50 and connected to the ECU 50.

The vehicular damping control system 101 in this first example embodiment executes so-called sprung mass damping control (i.e., damping control) that suppresses sprung mass vibration in the vehicle 10 by controlling the power source 21. Sprung mass vibration in the vehicle 10 here refers to vibration of 1 to 4 Hz, for example, (the frequency component that appears differs noticeably depending on the type and structure of the vehicle; a frequency component near 1.5 Hz is common in many vehicles) of the vibration that is generated in the body of the vehicle 10 via the suspension from input from the road surface to the wheels 30FL and 30FR, which are the left and right front wheels of the vehicle 10, and the wheels 30RL and 30RR, which are the left and right rear wheels of the vehicle 10, according to dips and bumps in the road surface when the vibration source is the road surface. This sprung mass vibration in the vehicle 10 includes a component in the pitch direction of the vehicle 10 and/or a component in the bounce direction (i.e., the vertical direction) of the vehicle 10. The sprung mass damping described here suppresses sprung mass vibration in the vehicle 10.

When vibration having a frequency component in the range of 1 to 4 Hz, or more specifically, near 1.5 Hz, for example, occurs in the pitch direction or the bounce direction (i.e., the vertical direction) of the vehicle 10 from input to the wheels 30FL and 30FR, which are the left and right front wheels of the vehicle 10, and the wheels 30RL and RR, which are the left and right rear wheels of the vehicle 10, from the road surface, the vehicular damping control system 101 suppresses that vibration by adjusting the wheel torque (i.e., the torque applied between the wheels and the wheel-contacting road surface) that the wheels (i.e., the driving wheels when driving) apply to the road surface, which is accomplished by controlling the power source 21 so that it outputs anti-phase drive torque (driving force). That is, the vehicular damping control system 101 suppresses the vibration by performing wheel torque control that generates damping torque, i.e., wheel torque that suppresses sprung mass vibration, in the wheels 30RL and 30RR, which are the driving wheels that transmit drive torque to the road surface, by controlling the power of the power source 21, i.e., the drive torque. In the damping control executed by the vehicular damping control system 101, sprung mass vibration is suppressed by applying this damping torque to the wheels 30RL, and 30RR.

As a result, the vehicular damping control system 101 improves operational stability for the driver and riding comfort for the occupants and the like. Also, this kind of control of the power generated by the power source 21, i.e., damping control through power control, suppresses the generation of vibration energy by adjusting the source of the force that generates the vibration, rather than suppressing the generated vibration energy by absorbing it like damping control by suspension does. Therefore, the damping action is relatively fast, and the energy efficiency is good. Also, with damping control through power control, the control target is concentrated on the power (i.e., the drive torque) of the power source, so the control is relatively easy to adjust.

The vehicle 10 to which the vehicular damping control system 101 is applied has the wheels 30FL and 30FR, which are the left and right front wheels, and the wheels 30RL and 30RR, which are the left and right rear wheels, as shown in FIG. 1. Also, the vehicle 10 has an accelerator pedal 60 that is operated by the driver, and an accelerator pedal sensor 70 that detects a required value from an accelerator operation by the driver, i.e., an accelerator pedal depression amount θa which is the depression amount of the accelerator pedal 60, and outputs an electric signal indicative of that accelerator pedal depression amount θa to the ECU 50. The vehicle 10 also has a drive apparatus 20 that applies driving force to the wheels 30RL and 30RR in response to an accelerator operation, i.e., a depression operation of the accelerator pedal 60 by the driver, mounted in any one of a variety of well-known configurations. In the example shown in the drawing, this drive apparatus 20 is structured such that power (i.e., drive torque) generated by the power source 21 is transmitted to the wheels 30RL and 30RR via a transmission (including a torque converter or the like, for example) 22 and a differential gear unit 23 and the like. Incidentally, although not shown here, the vehicle 10 is also provided with brake devices that generate braking force in each wheel, and a steering apparatus for controlling the steering angle of the front wheels or front and rear wheels, just like any one of a variety of well-known vehicles.

The operation of the drive apparatus 20 is controlled by the ECU 50 that also serves as the vehicular damping control system 101. The ECU 50 may include a drive circuit and a microcomputer that has a CPU, ROM, RAM, and an input/output port device that are all connected together via a bi-directional common bus, which are well-known. The ECU 50 receives various signals, including a signal indicative of the wheel speed Vwi (i=FL, FR, RL, RR) from a wheel speed sensor 40i (i=FL, FR, RL, RR) provided on each of the wheels 30FL, 30FR, 30RL, and 30RR, and signals from sensors provided on various parts of the vehicle 10 that are indicative of the engine speed (i.e., the output rotation speed of the power source 21; the rotation speed of the output shaft of the motor is the power source 21 is a motor) Er, the output rotation speed Dr of the transmission 22, the accelerator pedal depression amount θa, and if the power source 21 is a gasoline engine, the coolant temperature, the intake air temperature, the intake air pressure, the atmospheric pressure, the throttle opening amount, the fuel injection quantity, the fuel injection timing, and the ignition timing and the like (or if the power source 21 is a motor, the amount of current supplied and the state-of-charge SOC of the battery and the like) as parameters corresponding to the operating environment of the power source 21, the shift position of a shift position apparatus, not shown, provided in the vehicle 10, and if the transmission 22 is a transmission that has a plurality of gear speeds, the gear speed of the transmission 22 and the like. Incidentally, aside from these signals, the ECU 50 also receives various detection signals for obtaining various parameters necessary for various controls to be executed in the vehicle 10 of this first example embodiment.

As shown in FIG. 2, the ECU 50 includes, for example, the vehicular damping control system 101 that also functions as a drive control apparatus by controlling the operation of the power source 21, or more specifically, the power generated by the power source 21, based on the driver required torque Te and the like, and a brake control apparatus 102 that controls the operation of brake devices, not shown. Incidentally, in this first example embodiment, the driving force control apparatus is formed built into the vehicular damping control system 101, but the invention is not limited to this. That is, the driving force control apparatus may be formed separate from the ECU 50 and connected to the ECU 50. Similarly, the brake control apparatus 102 may also be formed separate from the ECU 50 and connected to the ECU 50.

As shown in FIG. 2, the brake control apparatus 102 receives an electrical signal in the form of a pulse that is generated successively each time each wheel 30FL, 30FR, 30RL, and 30RR rotates a predetermined amount, from each wheel speed sensor 40FL, 40FR, 40RL, and 40RR. The brake control apparatus 102 calculates the rotation speed of each wheel (hereinafter also referred to simply as "wheel rotation speed") ωi (i=FL, FR, RL, RR) by measuring the time intervals until the pulse signals input successively arrive, and then calculates the wheel speed of each wheel (hereinafter also referred to simply as "wheel speed") Vwi by multiplying that rotation speed of each wheel tai by the wheel radius r. In this first example embodiment, the brake control apparatus 102 outputs the average value r×ω of the wheel speed VwFL, VwFR, VwRL, and VwRR corresponding to each wheel 30FL, 30FR, 30RL, and 30RR to the vehicular damping control system 101 (i.e., a vehicular damping control portion 104 in this first example embodiment). Incidentally, the calculation from the wheel rotation speed to the wheel speed may also be performed by the vehicular damping control system 101. In this case, the wheel rotation speed is output from the brake control apparatus 102 to the vehicular damping control system 101.

Further, the brake control apparatus 102 may perform automatic braking control such as ABS control, VSC (Vehicle Stability Control), and TRC (Traction Control), which are well-known. That is, the brake control apparatus 102 may inhibit the friction force between the wheels 30FL, 30FR, 30RL, and 30RR and the road surface (i.e., the vector sum of the lateral force and the longitudinal force of the wheels 30FL, 30FR, 30RL, and 30RR) from becoming excessive and exceeding a threshold, or control the slip ratio or the longitudinal force on the wheels to inhibit the behavior of the vehicle 10 from deteriorating due to the friction force of the wheels 30FL, 30FR, 30RL, and 30RR exceeding that threshold. Alternatively, the brake control apparatus 102 may also be formed as part of VDIM (Vehicle Dynamics Integrated Management) that aims to stabilize the behavior of the vehicle 10 by integrating ABS control, VSC, TRC, slip ratio control of the wheels 30FL, 30FR, 30RL, and 30RR, and steering control and the like.

Here, in the automatic braking control (e.g., ABS control, VSC, TRC, VDIM), the brake control apparatus 102 may change and control the power generated by the power source 21 in order to control the behavior of the vehicle 10, i.e., in order to actively control the behavior of the vehicle 10 so that it becomes stable by changing that behavior. In this first example embodiment, when performing driving force control to change and control the behavior of the vehicle 10 based on automatic braking control, the brake control apparatus 102 changes the driver required torque Te, for example. That is, the brake control apparatus 102 also functions as a vehicle behavior controlling portion. When changing the driver required torque Te based on automatic braking control, the brake control apparatus 102 outputs a braking torque correction amount with which the drive torque of the power source 21 is able to change the behavior of the vehicle 10 so that it becomes stable, to the vehicular damping control system 101 that also functions as the drive control apparatus. Here, the braking torque correction amount output from the brake control apparatus 102 to the vehicular damping control system 101 is added to or subtracted from the driver required torque Te that has been calculated in a required torque calculating portion 103a which will be described later. As a result, the driver required torque Te is changed (i.e., corrected and adjusted) so that the behavior of the vehicle 10 is changed and controlled based on the braking torque correction amount, and a control command indicative of the final required torque, which is the required torque obtained by changing the driver required torque Te, is output from a control command determining portion 103c to the power source 21. Incidentally, the brake control apparatus 102 may also calculate the accelerator pedal depression amount θa when controlling the drive torque generated by the power source 21 in order to change and control the behavior of the vehicle 10 based on the automatic braking control. In this case, the calculated accelerator pedal depression amount θa is output to the required torque calculating portion 103*a* of the vehicular damping control system 101.

As the drive control apparatus, the vehicular damping control system 101 determines the driver required torque (i.e., the torque corresponding to the required driving force) Te, which is the drive torque of the power source 21 of the drive apparatus 20 that is required by the driver, based on the accelerator pedal depression amount θa as a value indicative of the driving force that is required of the vehicle 10 by the driver, as shown in FIG. 2. Then the vehicular damping control system 101 outputs a control command to the power source 21 based on the final required torque obtained by performing various changes (corrections and adjustments) to this driver required torque Te that serves as the base for the control. The control command output to the power source 21 of the drive apparatus 20 is a command that includes the operation amount to be input to the power source 21 in order to adjust the drive torque of the power source 21, which is the control target, to the final required torque, in other words, to adjust the damping torque that is applied to the wheels 30RL and 30RR, which will be described later. The operation amount of the power source 21 included in this control command is, for example, the ignition timing or the throttle opening amount corresponding to the final required torque if the power source 21 is a gasoline engine, the fuel injection quantity corresponding to the final required torque if the power source 21 is a diesel engine, and the amount of current supplied corresponding to the final required torque if the power source 21 is a motor.

Then in this vehicular damping control system 101, in order to execute control to suppress vibration in the pitch direction and vibration in the bounce direction of the vehicle 10, i.e., damping control which is control to suppress sprung mass vibration, by controlling the drive torque of the power source 21, the vehicular damping control system 101 corrects the driver required torque Te which is the drive torque required by the driver based on the damping torque which is the control amount in the damping control, or more specifically, the damping torque which is the wheel torque required by the damping control, or corrects the control command indicative of the driver required torque Te based on a damping control command indicative of the damping torque, and then outputs a control command corresponding to the final required torque, which is the required torque obtained by correcting driver required torque Te, to the power source 21 of the drive apparatus 20.

The vehicular damping control system 101 in this first example embodiment includes the drive control portion 103 and the vehicular damping control portion 104, as shown in FIG. 2.

The drive control portion 103 includes the required torque calculating portion 103*a*, an adder 103*b*, and the control command determining portion 103*c*. The required torque calculating portion 103*a* calculates the driver required torque Te based on the accelerator pedal depression amount θa according to a suitable well-known method. The adder 103*b* corrects the driver required torque Te calculated by the required torque calculating portion 103*a* with a damping torque correction amount Tx corresponding to damping torque which is the control amount in the damping control calculated by the vehicular damping control portion 104. That is, the adder 103*b* corrects the driver required torque Te calculated by the required torque calculating portion 103*a*, based on the damping torque. The control command determining portion 103*c* generates a control command for the power source 21 corresponding to the final required torque obtained by correcting the driver required torque Te with the damping torque correction amount Tx according to the damping torque, and then outputs that generated control command to various controllers, not shown, of the power source 21. That is, after converting the accelerator pedal depression amount θa to the driver required torque Te with the required torque calculating portion 103*a*, the drive control portion 103 calculates the final required torque by correcting (adjusting) the driver required torque Te based on the damping torque with the adder 103*b*, then converts this final required torque to a control command for the drive apparatus 20 with the control command determining portion 103*c*, and outputs this control command to the drive apparatus 20.

The vehicular damping control portion 104 sets the damping torque correction amount Tx corresponding to the damping torque which is the control amount in the damping control for executing damping control to suppress sprung mass vibration in the vehicle 10 by controlling the power source 21.

In this vehicular damping control portion 104, (1) the wheel torque of the wheels is obtained from the force applied between the wheels and the road surface, (2) the quantity of state of the pitch/bounce vibration is obtained, and (3) the correction amount for the wheel torque to suppress the quantity of state of the pitch/bounce vibration is calculated and the required torque or the control command is corrected based on this calculated correction amount. In this first example embodiment, for the wheel torque in (1), a wheel torque estimated value is calculated based on the wheel speed of the wheels (or the wheel rotation speed of the wheels) as an actual measured value that correlates with the vibration received from the brake control apparatus 102, but the invention is not limited to this. For the wheel torque, a wheel torque estimated value may also be calculated based on the engine speed. The wheel torque may also be a detection value of the wheel torque actually generated at the wheel, from a sensor that is able to directly detect the value of the wheel torque while the vehicle 10 is running, such as a wheel torque sensor or a wheel six-component meter. The quantity of state of the pitch/bounce vibration in (2) is described as being calculated according to a motion model of the vehicle body vibration in the vehicle 10, but the invention is not limited to this. That is, for the quantity of state of the pitch/bounce vibration, a detection value from any one of various sensors, such as a pitch/bounce sensor, a G sensor, or a sensor that detects the compression amount of the suspension, may also be used as an actual measured value that correlates with the vibration. That is, in this first example embodiment, the damping torque is set as an actual measured value that correlates with the vibration by feedback control that is based on at least the wheel speed of the wheels of the vehicle 10, as will be described later. However, the invention is not limited to this. That is, an actual measured value that correlates with the vibration may also be directly detected by a sensor and the damping torque for suppressing vibration may be set based on this actual measured value that correlates with this vibration. The vehicular damping control system 101 in this first example embodiment is realized in the processes of (1) to (3).

In the vehicle 10, when the drive apparatus 20 is operated based on an accelerator operation by the driver, i.e., a request by the driver for driving force, for example, such that a fluctuation in wheel torque occurs, bounce vibration in a direction perpendicular to the center of gravity Cg of the vehicle body (i.e., in direction z) (i.e., vibration in the bounce direction), and pitch vibration in the pitch direction (direction θ) about the center of gravity of the vehicle body (i.e., vibration in the pitch direction) may be generated in the body of the vehicle 10 illustrated in FIG. 3. Also, when external force or torque (i.e., disturbance) is applied to the wheels 30FL, 30FR, 30RL, and 30RR of the vehicle 10 from the road surface due to dips and bumps on the road surface when the vehicle 10 is traveling, that disturbance is transmitted to the vehicle 10 and may cause pitch/bounce vibration in the vehicle body as expected.

Therefore, the vehicular damping control portion 104 creates a dynamic motion mode of the pitch/bounce vibration in the body of the vehicle 10, and calculates the state variables of the vehicle body vibration, i.e., the displacements z and θ of the vehicle body when the driver required torque Te corresponding to the driving force required by the driver (i.e., the value after that driver required torque Te has been converted to wheel torque) and the current wheel torque (i.e., the estimated value thereof) are input in the motion model, and the rates of change dz/dt and dθ/dt of those displacements. Then the power of the power source 21 of the drive apparatus 20 is controlled and the drive torque is adjusted (i.e., the driver required torque) or the control command corresponding to the driver required torque is corrected so that the state variables obtained from the model converge on 0, i.e., so that the pitch/bounce vibration can be suppressed.

As shown in FIG. 2, the vehicular damping control portion 104 includes a feed-forward control portion 104a, a feedback control portion 104b, and a drive torque converting portion 104c. Here, the vehicular damping control portion 104 sets the damping torque which is the control amount in the damping control by performing feedback control based on the wheel speed of the wheels of the vehicle 10 in conjunction with feed-forward control based on the driver required torque (i.e., the required driving force) with respect to the vehicle 10.

The feed-forward control portion 104a has the structure of a so-called optimum regulator, and includes a wheel torque converting portion 104d, a motion modeling portion 104e, and a FF secondary regulator portion 104f. In the feed-forward control portion 104a, the value of the driver required torque Te that has been converted to wheel torque by the wheel torque converting portion 104d (i.e., the driver required wheel torque Two) is input to the motion modeling portion 104e for the pitch/bounce vibration in the body of the vehicle 10. In the feed-forward control portion 104a, the response of the state variables of the vehicle 10 with respect to the input torque is calculated by the motion modeling portion 104e, and an FF system damping torque correction amount U×FF is calculated as the correction amount for the driver required wheel torque Two that minimizes those state variables, based on a predetermined gain K, which will be described later, by the FF secondary regulator portion 104f. This FF system damping torque correction amount U×FF is an FF control amount in the damping control that is set by the feed-forward control system that is based on the driver required torque Te (i.e., the required driving force) with respect to the power source 21.

The feedback control portion 104b also has the structure of a so-called optimum regulator. Here, the feedback control portion 104b includes a wheel torque estimating portion 104g, a motion modeling portion 104e that is also used by the feed-forward control portion 104a, and an FB secondary regulator portion 104h. In this feedback control portion 104b, a wheel torque estimated value Tw is calculated based on the average value r×w of the wheel speed, as will be described later, by the wheel torque estimating portion 104g. This wheel torque estimated value Tw is input to the motion modeling portion 104e as disturbance input. Incidentally, here, the motion modeling portion of the feed-forward control portion 104a is the same as the motion modeling portion of the feedback control portion 104b, so the motion modeling portion 104e is used for both. Alternatively, however, separate motion modeling portions may be provided. In the feedback control portion 104b, the response of the state variables of the vehicle 10 with respect to the input torque is calculated by the motion modeling portion 104e, and an FB system damping torque correction amount U×FB is calculated as the correction amount for the driver required wheel torque Two that minimizes those state variables, based on a predetermined gain K, which will be described later, by the FB secondary regulator portion 104h. This FB system damping torque correction amount U×FB is an FB control amount in the damping control that is set by the feedback control system according to the amount of change in the wheel speed based on the external force or torque (i.e., disturbance) from the input to the wheels 30FL, 30FR, 30RL, and 30RR of the vehicle 10 from the road surface.

In the vehicular damping control portion 104, the FF system damping torque correction amount U×FF, which is the FF control amount from the feed-forward control portion 104a, and the FB system damping torque correction amount U×FB, which is the FB control amount from the feedback control portion 104b are output to the adder 104i. The FF system damping torque correction amount U×FF and the FB system damping torque correction amount U×FB are then added together by the adder 104i to calculate the damping torque which is the total control amount in the damping control. In this vehicular damping control portion 104, this damping torque is converted to a damping torque correction amount Tx, which is the value after it has been converted to units of drive torque of the drive apparatus 20, i.e., units of driver required torque Te, by the drive torque converting portion 104c. Then the vehicular damping control portion 104 outputs that damping torque correction amount Tx to the adder 103b. That is, the vehicular damping control system 101 changes the driver required torque Te to a final required torque (i.e., the drive torque) that is able to generate damping torque (i.e., wheel torque) to suppress sprung mass vibration in the wheels 30RL and 30RR, by correcting the driver required torque Te based on the damping torque correction amount Tx obtained using the dynamic motion model.

Accordingly, the vehicular damping control system 101 is able to adjust the final required torque generated by the power source 21 based on the driver required torque Te, which is the drive torque required of the power source 21 by the driver, and the damping torque correction amount Tx corresponding to the damping torque which is both the control amount in the damping control and the wheel torque required at the wheels 30RL and 30RR by the damping control. As a result, damping torque that suppresses sprung mass vibration can be generated after generating driver required wheel torque in the wheels 30RL and 30RR. That is, the vehicular damping control system 101 is able to suppress vibration from being generated in the vehicle body by executing damping control to generate damping torque that suppresses sprung mass vibration in the wheels 30RL and 30RR, which are the driving wheels that transmit power, by controlling the power generated by the power source 21 provided in the vehicle 10, and changing the wheel torque of the wheels 30RL and 30RR by controlling the output torque (i.e., drive torque) of the power source 21.

Incidentally, after changing the driver required torque Te to the final required torque (i.e., drive torque) by correcting that driver required torque Te with the damping torque correction amount Tx with the adder 103b, the vehicular damping control system 101 converts the final required torque to a control command that includes the operation amount (such as the ignition timing or the throttle opening amount corresponding to the final required torque if the power source 21 is a gasoline engine, the fuel injection quantity corresponding to the final required torque if the power source 21 is a diesel engine, and the amount of current supplied corresponding to the final required torque if the power source 21 is a motor, or the like) of the power source 21 to realize this final required torque with the correct command determining portion 103c, and outputs that control command to the power source 21 of the power apparatus 20. However, the invention is not limited to this. For example, in the step before the adder 103b, after calculating the control command that includes the operation amount of the power source 21 to realize the drive required torque Te and calculating the damping control command that includes the operation amount of the power source 21 to realize the drive torque corresponding to the damping torque correction amount Tx, the vehicular damping control system 101 may also correct the operation amount of the power source 21 that is included in the control command with the operation amount of the power source 21 that is included in the damping control command with the adder 103b, then convert the corrected operation amount into a final control command, and output this final control command to the power source 21 of the drive apparatus 20. Also, in this case, the control amount in the damping control is damping torque which is the wheel torque required at the wheels 30RL and 30RR by the damping control. However, the control amount in the damping control may also be the damping torque correction amount Tx obtained by converting the damping toque into units of drive torque of the drive apparatus 20, or the final required torque obtained by correcting the driver required torque Te with the damping torque correction amount Tx.

Here, in the damping control of the vehicular damping control system 101, an equation-of-state of the state variables of the bounce direction or the pitch direction into which the driver required wheel torque Two and the wheel torque estimated value Tw (i.e., the disturbance) have been input is formed assuming a dynamic motion model of the pitch direction and the bounce direction of the body of the vehicle 10, as described above. Then an input (i.e., damping torque) that brings the state variables of the pitch direction and the bounce direction to 0 is determined using the theory of the optimum regulator from that equation-of-state, and the driver required torque Te is corrected based on the obtained damping torque.

An example of this dynamic motion model of the bounce direction or the pitch direction of the body of the vehicle 10 is a model in which the vehicle body is regarded as a rigid body S of mass M and inertia moment I, and this rigid body S is supported by front-wheel suspension with a modulus of elasticity kf and an attenuation rate cf, and rear-wheel suspension with a modulus of elasticity kr and an attenuation rate cr, as shown in FIG. 4 (i.e., is a sprung mass vibration model of the body of the vehicle 10). In this case, the equation of motion in the bounce direction at the center of gravity Cg of the vehicle body (the dynamic motion model in the bounce direction) and the equation of motion in the pitch direction at the vehicle center of gravity Cg (the dynamic motion model in the pitch direction) may be as shown in Expression 1 below.

[Expression 1]

$$M\frac{d^2 z}{dt^2} = -kf(z + Lf \cdot \theta) - \qquad (1a)$$
$$cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right)$$

-continued
$$I\frac{d^2 \theta}{dt^2} = -Lf\left\{kf(z + Lf \cdot \theta) + cf\left(\frac{dz}{dt} + Lf \cdot \frac{d\theta}{dt}\right)\right\} + \qquad (1b)$$
$$Lr\left\{kr(z - Lr \cdot \theta) + cr\left(\frac{dz}{dt} - Lr \cdot \frac{d\theta}{dt}\right)\right\} + \frac{h}{r} \cdot T$$

In Expression 1, Lf and Lr represent the distance from the center of gravity Cg to the front axle and the rear axle, respectively, and r represents the wheel radius. Also, h represents the height from the road surface to the center of gravity Cg. Incidentally, in Expression (1a), the first and second terms are components of force from the front axle, and the third and fourth terms are components of the force from the rear axle. Further, in Expression (1b), the first term is the moment component of the force from the front axle, and the second term is the moment component of the force from the rear axle. Also, the third term in Expression (1b) is the moment component of the force applied by the wheel torque T (=Two, Tw) generated at the driving wheels about the center of gravity of the vehicle body.

Expressions (1a) and (1b) can be rewritten in the form of an equation-of-state (of a linear system) as shown in Expression (2a) below, with the displacements z and θ of the body of the vehicle 10 and the rates of change dz/dt and dθ/dt of those displacements as the state variable vector X(t).

$$dX(t)/dt = A \times X(t) + B \times u(t) \qquad (2a)$$

In Expression (2a) above, X(t), A, and B are as shown below.

[Expression 2]

$$X(t) = \begin{pmatrix} z \\ dz/dt \\ \theta \\ d\theta/dt \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

The elements a1 to a4 and b1 to b4 in matrix A are by combining the coefficients of z, θ, dz/dt, and dθ/dt in Expressions (1a) and (1b), respectively, such that a1=−(kf+kr)/M, a2=−(cf+cr)/M, a3=−(kf×Lf−kr×Lr)/M, a4=−(cf×Lf−cr×Lr)/M, b1=−(Lf×kf−Lr×kr)/I, b2=−(Lf×cf−Lr×cr)/I, b3=−(Lf2×kf+Lr2×kr)/I, and b4=−(Lf2×cf+Lr2×cr)/I.

Also, u(t) is equal to T (i.e., u(t)=T) and is the input of the system expressed by the equation-of-state (2a) above. Accordingly, from Expression (1b) above, the element p1 in matrix B is equal to h/(I×r) (i.e., p1=h/(I×r)).

If $$u(t) = -K \times X(t) \qquad (2b)$$

in the equation-of-state (2a) above, then the equation-of-state (2a) becomes $$dX(t)/dt = (A - BK) \times X(t) \qquad (2c)$$

Therefore, when the initial value X0(t) of X(t) is set to X0(t)=(0, 0, 0, 0) (assuming that there is no vibration before torque is input) and the differential equation (Expression 2c) of the state variable vector X(t) is solved, the damping torque u(t) that suppresses bounce/pitch vibration is determined by determining the gain K that brings X(t), i.e., the displacement in the bounce direction and the pitch direction and the time rate of change thereof, to 0.

The gain K can be determined using the so-called theory of the optimum regulator. It is known that according to this theory, when the value of the evaluation function (with an integration range of 0 to infinity) in quadratic form $$J=\int(X^T QX+u^T Ru)dt \quad (3a)$$

is minimized, X(t) stably converges in the equation-of-state (2a) and the matrix K that minimizes the evaluation function J is applied by $$K=R^{-1}\times B^T \times P$$

Here, P is the solution to a Riccardi equation $$-dP/dt=A^T P+PA+Q-PBR^{-1}B^T P$$

This Riccardi equation can be solved by any known method in the field of linear systems. From this, the gain K can be determined.

Incidentally, Q and R in the evaluation function J and the Riccardi equation are a positive semidefinite symmetric matrix and a positive definite symmetric matrix, respectively, which are set arbitrarily and are weighting matrices of the evaluation function J determined by the designer of the system. For example, when Q and R in the motion model here are

[Expression 3]

$$Q = \begin{pmatrix} 1 & 0 & 0 & 0 \\ 0 & 10^3 & 0 & 0 \\ 0 & 0 & 1 & 0 \\ 0 & 0 & 0 & 10^2 \end{pmatrix}, R = (1)$$

or the like, and the norm (magnitude) of specified components (such as dz/dt and dθ/dt) from among the components of the state variable vector is set larger than the norm of other components (such as z and θ) in Expression (3a), the components in which the norm is set larger converge more stably than the other components do. Also, when the value of the component of Q is increased, the transient characteristic value, i.e., the value of the state variable vector, quickly converges on a stable value, and when the value of R is increased, the consumption energy decreases. Here, the gain corresponding to the feed-forward control portion 104a may be different from the gain K corresponding to the feedback control portion 104b. For example, the gain K corresponding to the feed-forward control portion 104a may be gain corresponding to the feeling of acceleration as felt by the driver, and the gain K corresponding to the feedback control portion 104b may be gain corresponding to the responsiveness or feeling by the driver.

In actual sprung mass damping control of the vehicular damping control portion 104, as shown in the block diagram in FIG. 2, the state variable vector X(t) is calculated by solving the differential equation in Expression (2a) using the torque input value, in the motion modeling portion 104e. Next, the value u(t), which is the product of the gain K determined in order to minimize the state variable vector X(t) or bring it to 0 as described above with the FF secondary regulator portion 104f and the FB secondary regulator portion 104h, multiplied by the state variable vector X(t) which is the output of the motion modeling portion 104e, i.e., the FF system damping torque correction amount U×FF and the FB system damping correction amount U×FB, is converted into units of driver required torque Te of the power source 21, i.e., units of drive torque of the power source 21, in the drive torque converting portion 104c, and the driver required torque Te is corrected in the adder 103b. The system expressed by Expressions (1a) and (1b) is a resonance system, and the value of the state variable vector X(t) with respect to a given input is essentially only the component of the natural frequency of the system. Therefore, by correcting the driver required torque Te with u(t) (i.e., the converted value thereof), the component of the natural frequency of the system, of the driver required torque Te, i.e., the component that causes pitch/bounce vibration in the body of the vehicle 10, can be corrected, thereby suppressing that pitch/bounce vibration in the body of the vehicle 10. When the component of the natural frequency of the system in the driver required torque Te corresponding to the driving force required by the driver is eliminated, the component of the natural frequency of the system in the control command corresponding to the driver required torque Te output to the power source 21 is only −u(t), so the vibration from Tw (i.e., the disturbance) converges.

Incidentally, the parameters of the dynamic motion model used in the motion modeling portion 104e are stored in the vehicular damping control system 101. For example, parameters such as M, I, Lf, Lr, h, r, kf, cf, kr, and cr, are stored in the vehicular damping control system 101 and used when calculating the FF system damping torque correction amount U×FF and the FB system damping torque correction amount U×FB.

Incidentally, a model that takes into account the spring elasticity of the tires on the front and rear wheels (a model of the sprung mass/unsprung mass vibration in the body of the vehicle 10), in addition to the structure shown in FIG. 4, may also be used for the dynamic motion model of the bounce direction and the pitch direction of the body of the vehicle 10, as shown in FIG. 5, for example. When the tires on the front wheels have a modulus of elasticity of ktf and the tires on the rear wheels have a modulus of elasticity of ktr, the equation of motion of the bounce direction of the center of gravity Cg of the vehicle body and the equation of motion of the pitch direction of the center of gravity Cg of the vehicle body can written as shown in the expressions in Expression 4 below.

[Expression 4]

$$M\frac{d^2 z}{dt^2} = -kf(z+Lf\cdot\theta-xf)-cf\left(\frac{dz}{dt}+Lf\cdot\frac{d\theta}{dt}-\frac{dxf}{dt}\right)- \quad (4a)$$
$$kf(z-Lf\cdot\theta-xr)-cr\left(\frac{dz}{dt}-Lr\cdot\frac{d\theta}{dt}-\frac{dxr}{dt}\right)$$

$$I\frac{d^2\theta}{dt^2} = -Lf\left\{kf(z+Lf\cdot\theta-xf)+cf\left(\frac{dz}{dt}+Lf\cdot\frac{d\theta}{dt}-\frac{dxf}{dt}\right)\right\}+ \quad (4b)$$
$$Lr\left\{kr(z-Lr\cdot\theta-xr)+cr\left(\frac{dz}{dt}-Lr\cdot\frac{d\theta}{dt}-\frac{dxr}{dt}\right)\right\}+\frac{h}{r}\cdot T$$

$$mf\frac{d^2 xf}{dt^2} = kf(z+Lf\cdot\theta-xf)+cf\left(\frac{dz}{dt}+Lf\cdot\frac{d\theta}{dt}-\frac{dxf}{dt}\right)+ktf\cdot xf \quad (4c)$$

$$mr\frac{d^2 xr}{dt^2} = kr(z-Lr\cdot\theta-xr)+cr\left(\frac{dz}{dt}-Lr\cdot\frac{d\theta}{dt}-\frac{dxr}{dt}\right)+ktr\cdot xr \quad (4d)$$

In Expression 4 above, xf and xr are unsprung mass displacement amounts of the front and rear wheels, respectively, and mf and mr are the unsprung masses of the front and rear wheels, respectively. Expressions (4a) to (4d) form equations-of-state as shown in Expression (2a) above, just as in FIG. 4, with z, θ, xf, xr, and the time differential values thereof as the state variable vectors (where matrix A is eight rows and eight columns and matrix B is eight rows and one column). The gain matrix K that brings the state variable vectors to 0 can be determined according to the theory of the optimum regulator. The actual damping control in the vehicular damping control system 101 is just as it is in FIG. 4.

Here, for example, a torque sensor may also be provided in each of the wheels 30FL, 30FR, 30RL, and 30RR, and the wheel torque that is input as disturbance in the feedback control portion 104b of the vehicular damping control portion 104 in FIG. 2 may be actually detected. However, in this case, the wheel torque estimated value Tw estimated by the wheel torque estimating portion 104g from another detectable value of the vehicle 10 while the vehicle 10 is traveling may be used.

This wheel torque estimated value Tw can be estimated or calculated from Expression (5) below using temporal differentiation of the average value ω of the wheel rotation speed or the average value r×ω of the wheel speed obtained from the wheel speed sensor for each wheel, for example.

$$Tw = M \times r2 \times d\omega/dt \tag{5}$$

In Expression (5) above, M is the mass of the vehicle, and r is the wheel radius. That is, when the sum of the driving force generated at the location where the driving wheels contact the road surface is equal to the total driving force M×G (G is the acceleration) of the vehicle 10, the wheel torque estimated value Tw is provided by Expression (5a) below.

$$Tw = M \times G \times r \tag{5a}$$

The acceleration G of the vehicle is provided by Expression (5b) below by the differential value of the wheel speed r×ω.

$$G = r \times d\omega/dt \tag{5b}$$

Therefore, the wheel torque can be estimated as shown in Expression (5) above.

Incidentally, the vehicular damping control portion 104 in this first example embodiment sets the damping torque based on the FF system damping torque correction amount, i.e., the FF control amount in the feed-forward control portion 104a that is based on the driver required torque Te corresponding to the driving force required by the driver, and the FB system damping torque correction amount, i.e., the FB control amount in the feedback control portion 104b that is based on the wheel speed of the wheels of the vehicle 10. This vehicular damping control portion 104 is able to realize suitable damping control according to the operating state of the vehicle 10 by correcting the FF system damping torque correction amount or the FB system damping torque correction amount based on the operating state of the vehicle 10.

Here, as described above, in the vehicular damping control portion 104, although the feed-forward control portion 104a and the feedback control portion 104b both use the motion modeling portion 104e, they are basically formed as separate, independent control systems. After calculating both the FF system damping torque correction amount and the FB system damping torque correction amount, the vehicular damping control portion 104 sets the damping torque by adding the FF system damping torque correction amount and the FB system damping torque correction amount together. Therefore, the vehicular damping control portion 104 is able to establish upper and lower limits for, as well as correct, the FF system damping torque correction amount of the feed-forward control portion 104a and the FB system damping torque correction amount of the feedback control portion 104b individually, before actually setting the damping torque. Also, as a result, it is possible to easily interrupt one of the controls according to the state of the vehicle 10.

The vehicular damping control portion 104 in this first example embodiment also has a FF control correcting portion 104k and a FF control gain setting portion 104l provided in the feed-forward control portion 104a, and a FB control correcting portion 104m and a FB control gain setting portion 104n provided in the feedback control portion 104b. The vehicular damping control portion 104 corrects the FF system damping torque correction amount with the FF control correcting portion 104k and the FF control gain setting portion 104l, and corrects the FB system damping torque correction amount with the FB control correcting portion 104m and the FB control gain setting portion 104n. That is, the vehicular damping control portion 104 sets the FF control gain for the FF system damping torque correction amount according to the state of the vehicle 10 and then corrects the FF system damping torque correction amount by multiplying this FF control gain by the FF system damping torque correction amount, and also sets the FB control gain for the FB system damping torque correction amount according to the state of the vehicle 10 and then corrects the FB system damping torque correction amount by multiplying this FB control gain by the FB system damping torque correction amount.

The FF control correcting portion 104k is positioned after the FF secondary regulator portion 104f and before the adder 104i. This FF control correcting portion 104k receives the FF system damping torque correction amount U×FF from the FF secondary regulator portion 104f, and outputs a corrected FF system damping torque correction amount U×FF to the adder 104i. The FF control correcting portion 104k corrects the FF system damping torque correction amount U×FF based on an FF control gain K×FF, which is set by the FF control gain setting portion 104l, by multiplying this FF control gain K×FF by that FF system damping torque correction amount U×FF. Then, the FF control gain setting portion 104l sets this FF control gain K×FF according to the operating state of the vehicle 10. That is, the FF system damping torque correction amount U×FF input from the FF secondary regulator portion 104f to the FF control correcting portion 104k is corrected according to the operating state of the vehicle 10 by the FF control correcting portion 104k, by setting the FF control gain K×FF according to the operating state of the vehicle 10 with the FF control gain setting portion 104l. Incidentally, the FF control correcting portion 104k may also set upper and lower limits in advance to guard the FF system damping torque correction amount U×FF so that it falls within the range between the upper and lower limit values.

The FB control correcting portion 104m is positioned after the FB secondary regulator portion 104h and before the adder 104i. This FB control correcting portion 104m receives the FB system damping torque correction amount U×FB from the FB secondary regulator portion 104h, and outputs a corrected FB system damping torque correction amount U×FB to the adder 104i. The FB control correcting portion 104m corrects the FB system damping torque correction amount U×FB based on an FB control gain K×FB, which is set by the FB control gain setting portion 104n, by multiplying this FB control gain K×FB by that FB system damping torque correction amount U×FB. Then, the FB control gain setting portion 104n sets this FB control gain K×FB according to the operating state of the vehicle 10. That is, the FB system damping torque correction amount U×FB input from the FB secondary regulator portion 104h to the FB control correcting portion 104m is corrected according to the operating state of the vehicle 10 by the FB control correcting portion 104m, by setting the FB control gain K×FB according to the operating state of the vehicle 10 with the FB control gain setting portion 104n. Incidentally, the FB control correcting portion 104m may also set upper and lower limits in advance to guard the FB system damping torque correction amount U×FB so that it falls within the range between the upper and lower limit values.

In the vehicular damping control system 101 structured as described above, it is preferable to execute more suitable damping control, e.g., adjust the trade-offs from generating damping torque by controlling the power source 21, by coordinating the damping control described above with other control such as normal engine control, depending on the operating range of the power source 21 i.e., the engine or the like.

Thus, the vehicular damping control system 101 in this first example embodiment executes suitable control according to the operating state of the power source 21 by, for example, coordinating the damping control with other control related to the power source 21, which is accomplished by changing the control mode of the damping control according to the operating range of the power source 21.

More specifically, the vehicular damping control system 101 in this first example embodiment is provided with a coordinated control portion 105, as shown in FIG. 2. This coordinated control portion 105 changes the control mode of the damping control according to the operating range of the power source 21.

The coordinated control portion 105 in this first example embodiment changes the control mode of the damping control when the power source 21 is operating near a boundary between different operating ranges of the power source 21. More specifically, the coordinated control portion 105 executes more suitable damping control by coordinating the damping control with other control to adjust the trade-offs from generating damping torque by controlling the power source 21, which is accomplished by changing the control mode of damping control such that the power source 21 will operate in one of the operating ranges when damping control is not executed, when the power source 21 is operating near a boundary between different operating ranges.

Here, the operating range of the power source 21 is an operating range determined according to at least the operation amount of the power source 21 in order to adjust the control amount in the damping control. The coordinated control portion 105 is provided connected to the control command determining portion 103c, for example. When the power source 21 is operated near a boundary between different operating ranges, the coordinated control portion 105 limits the operation amount of the power source 21 to change the control mode of the damping control such that the power source 21 operates in one of the operating ranges when damping control is not executed.

Here, the control amount in the damping control is a value that is to be adjusted to a value desirable for suppressing sprung mass vibration in the vehicle 10, i.e., a value that is to be controlled for suppressing sprung mass vibration in the vehicle 10, in the damping control by the vehicular damping control system 101. As described above, the control amount in the damping control of this first example embodiment is damping torque as wheel torque required at the wheels 30RL and 30RR by the damping control, but it may also be the damping torque correction amount Tx, or the final required torque obtained by correcting the driver required torque Te with the damping torque correction amount Tx.

The operation amount of the power source 21 is an amount that effects the damping torque (i.e., output) which is the control amount in the damping control used with the power source 21 by being input to the power source 21 which is the control target. That is, the operation amount of the power source 21 is a value for adjusting the damping torque which is the control amount in the damping control via the power source 21 that is the control target. In other words, the operation amount of the power source 21 is a value that is input to the power source 21 in order to adjust the damping torque (i.e., the actual value) which is the control amount in the damping control used with the power source 21 that is the control target, to the required damping torque (i.e., the target value). As described above, the operation amount of the power source 21 for adjusting the damping torque in this first example embodiment is, for example, the throttle opening amount or the ignition timing if the power source 21 is a gasoline engine, the fuel injection quantity if the power source 21 is a diesel engine, and the amount of current supplied if the power source 21 is a motor.

Here, a case will be described in which the power source 21 is a gasoline engine and the operation amount of the power source 21 for adjusting the damping torque is the throttle opening amount, i.e., a case in which the operating range of the power source 21 is determined according to at least the throttle opening amount which is the operation amount of the power source 21 for adjusting the damping torque, for example.

Here, different operating ranges of the power source 21 are operating ranges in which the air-fuel ratio of the air-fuel mixture that is able to be combusted in the combustion chamber of the gasoline engine which is the power source 21 differs. More specifically, the different operating ranges of the power source are, for example, a stoichiometric air-fuel ratio operating range and a rich air-fuel ratio operating range. The stoichiometric air-fuel ratio operating range is an operating range where the air-fuel ratio of the air-fuel mixture is a stoichiometric air-fuel ratio, while the rich air-fuel ratio operating range is an operating range where the amount of fuel with respect to the amount of oxygen is increased such that the air-fuel ratio of the air-fuel mixture has a larger ratio of fuel than the stoichiometric air-fuel ratio does.

FIG. 6 is a view of one example of an operating range determining map. This operating range determining map is a map that is modified in advance to match each vehicle 10 provided with the vehicular damping control system 101, and is stored in a storage element, not shown. In the operating range determining map in FIG. 6, the horizontal axis represents the speed corresponding to the engine speed Er of the engine which is the power source 21, and the vertical axis represents the throttle opening amount which is the operation amount of the power source 21 for adjusting the damping torque. Incidentally, the vertical axis may also represent the engine load which is determined according to the throttle opening amount.

The operation of the gasoline engine that forms the power source 21 is controlled based on a predetermined operating range corresponding to the engine speed and the throttle opening amount, as shown in the example in FIG. 6. In the operating range determining map shown in FIG. 6, the first range is the stoichiometric air-fuel ratio operating range and the second range is the rich air-fuel ratio operating range, for example. That is, in the gasoline engine that forms the power source 21, air-fuel ratio control is executed such that the air-fuel ratio becomes a stoichiometric air-fuel ratio when the combination of the speed and the throttle opening amount is in the first range, i.e., the stoichiometric air-fuel ratio operating range, and air-fuel ratio control is executed such that the air-fuel ratio becomes a rich air-fuel ratio when the combination of the speed and the throttle opening amount is in the second range, i.e., the rich air-fuel ratio operating range.

Then, the coordinated control portion 105 can determine whether the power source 21 is operating near the boundary between different operating ranges based on the operating range determining map in FIG. 6. For example, based on the operating range determining map in FIG. 6, the coordinated control portion 105 is able to determine that the power source 21 is operating near the boundary between the different operating ranges when i) the operating point of the power source 21 determined by the combination of the current speed and the driver required throttle opening amount is within the first range, i.e., the stoichiometric air-fuel ratio operating range, and the operating point of the power source 21 determined by the combination of the current speed and the sum of the damping required throttle opening amount and the driver required throttle opening amount is within the second range, i.e., the rich air-fuel ratio operating range, or ii) the operating point of the power source 21 determined by the combination of the current speed and the driver required throttle opening amount is within the second range, i.e., the rich air-fuel ratio operating range, and the operating point of the power source 21 determined by the combination of the current speed and the sum of the damping required throttle opening amount and the driver required throttle opening amount is within the first range, i.e., the stoichiometric air-fuel ratio operating range.

Here, the driver required throttle opening amount is the operation amount (i.e., the driver required operation amount) of the power source 21 corresponding to the driver required torque Te before it is corrected with the damping torque correction amount Tx. The damping required throttle opening amount is the operation amount (i.e., the damping required operation amount) of the power source 21 corresponding to the damping torque correction amount Tx. Also, the sum of the damping required throttle opening amount and the driver required throttle opening amount corresponds to the final required throttle opening amount (i.e., the final required operation amount) which is the operation amount of the power source 21 corresponding to the final required torque.

Then, when the operating point of the power source 21 determined by the combination of the current speed and the driver required throttle opening amount is within the first range, i.e., the stoichiometric air-fuel ratio operating range, and the operating point of the power source 21 determined by the combination of the current speed and the sum of the damping required throttle opening amount and the driver required throttle opening amount is within the second range, i.e., the rich air-fuel ratio operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the first range, i.e., the stoichiometric air-fuel ratio operating range, which is one of the operating ranges when the damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the rich air-fuel ratio operating range, and the operating point of the power source 21 determined by the combination of the current speed and the sum of the damping required throttle opening amount and the driver required throttle opening amount is within the first range, i.e., the stoichiometric air-fuel ratio operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the rich air-fuel ratio operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with air-fuel ratio control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Here, when limiting the final throttle opening amount which is the operation amount of the power source 21, the coordinated control portion 105 may also limit that final throttle opening amount by establishing upper and lower limits for the throttle opening amount that is the sum of the damping required throttle opening amount and the driver required throttle opening amount. Incidentally, the coordinated control portion 105 is not limited to this. That is, the coordinated control portion 105 may also limit the final throttle opening amount by limiting the damping torque, the damping torque correction amount Tx, or the damping required throttle opening amount by changing the various control gains when setting the damping torque correction amount Tx. The coordinated control portion 105 may also limit the final throttle opening amount by limiting the driver required throttle opening amount. Also, the coordinated control portion 105 may also limit the final throttle opening amount by prohibiting damping control itself, i.e., by setting the damping torque correction amount Tx to 0 and setting the damping required throttle opening amount to 0.

Next, an example of coordinated control in the vehicular damping control system 101 according to the first example embodiment will be described with reference to the flowchart in FIG. 7. Incidentally, the control routine is executed repeatedly in control cycles every several milliseconds to every several tens of milliseconds.

The coordinated control portion 105 of the vehicular damping control system 101 determines whether damping control is being executed based on detection signals from various sensors, control signals, or whether a damping control-on flag is on or off, or the like (S100). If it is determined that damping control is not being executed (i.e., No in S100), the coordinated control portion 105 sets the operation amount corresponding to the final required torque that is included in the control command from the control command determining portion 103c to the power source 21 as it is as the final operation amount (i.e., the final throttle opening amount) and then controls the power source 21 (S106), after which the coordinated control portion 105 ends the current control cycle and proceeds on to the next control cycle. Incidentally, here, both the damping torque correction amount Tx and the damping required throttle opening amount are 0.

If it is determined that damping control is being executed (i.e., Yes in S100), the coordinated control portion 105 then determines whether the operating point of the power source 21 determined by the combination of the current speed and the driver required throttle opening amount which is the driver required operation amount is within the first range, i.e., the stoichiometric air-fuel ratio operating range, and the operating point of the power source 21 determined by the combination of the current speed and the sum of the damping required throttle opening amount, which is the damping required operation amount, and the driver required throttle opening amount, which is the driver required operation amount, is within the second range, i.e., the rich air-fuel ratio operating range (S102).

If the determination in step S102 is yes (i.e., Yes in S102), the coordinated control portion 105 then establishes an upper limit to guard the throttle opening amount, which is the operation amount corresponding to the final required torque that is included in the control command from the control command determining portion 103c to the power source 21, such that the operating point of the power source 21 determined by the combination of the current speed and the sum of the damping required throttle opening amount, which is the damping required operation-amount, and the driver required throttle opening amount, which is the driver required operation amount, falls within the first range, i.e., the stoichiometric air-fuel ratio operating range (S104). The coordinated control portion 105 sets this guarded throttle opening amount as the final throttle opening amount and then controls the power source 21 (S106), after which the coordinated control portion 105 ends the current control cycle and proceeds on to the next control cycle.

If the determination in step S102 is no (i.e., No in S102), the coordinated control portion 105 then determines whether the operating point of the power source 21 determined by the combination of the current speed and the driver required throttle opening amount which is the driver required operation amount is within the second range, i.e., the rich air-fuel ratio operating range, and the operating point of the power source 21 determined by the combination of the current speed and the sum of the damping required throttle opening amount, which is the damping required operation amount, and the driver required throttle opening amount, which is the driver required operation amount, is within the first range, i.e., the stoichiometric air-fuel ratio operating range (S108).

If the determination in step S108 is yes (i.e., Yes in S108), the coordinated control portion 105 then establishes a lower limit to guard the throttle opening amount, which is the operation amount corresponding to the final required torque that is included in the control command from the control command determining portion 103c to the power source 21, such that the operating point of the power source 21 determined by the combination of the current speed and the sum of the damping required throttle opening amount, which is the damping required operation amount, and the driver required throttle opening amount, which is the driver required operation amount, falls within the second range, i.e., the rich air-fuel ratio operating range (S110). The coordinated control portion 105 sets this guarded throttle opening amount as the final throttle opening amount and then controls the power source 21 (S106), after which the coordinated control portion 105 ends the current control cycle and proceeds on to the next control cycle.

If the determination in step S108 is no (i.e., No in S108), the coordinated control portion 105 sets the operation amount corresponding to the final required torque that is included in the control command from the control command determining portion 103c to the power source 21 as it is as the final operation amount (i.e., the final throttle opening amount) and then controls the power source 21 (S106), after which the coordinated control portion 105 ends the current control cycle and proceeds on to the next control cycle.

Incidentally, the different operating ranges of the power source 21 described above are not limited to the stoichiometric air-fuel ratio operating range and the rich air-fuel ratio operating range.

For example, the different operating ranges of the power source 21 may be a stoichiometric air-fuel ratio operating range and a lean air-fuel ratio operating range. The stoichiometric air-fuel ratio operating range is an operating range where the air-fuel ratio of the air-fuel mixture is a stoichiometric air-fuel ratio, while the lean air-fuel ratio operating range is an operating range where the amount of fuel with respect to the amount of oxygen is decreased such that the air-fuel ratio of the air-fuel mixture has a smaller ratio of fuel than the stoichiometric air-fuel ratio does. The lean air-fuel ratio operating range is a lean combustion (i.e., lean burn) operating range in which the gasoline engine that forms the power source 21 is operated with lean combustion (i.e., lean burn), and is an operating range that attempts to improve emissions performance, fuel efficiency, and combustion efficiency in the engine by making the ratio of fuel with respect to oxygen less than it is with the stoichiometric air-fuel ratio.

FIG. 8 is a view of another example of an operating range determining map. This operating range determining map is a map that is modified in advance to match each vehicle 10 provided with the vehicular damping control system 101, and is stored in a storage element, not shown. In the operating range determining map in FIG. 8, the horizontal axis represents the speed corresponding to the engine speed Er of the engine which is the power source 21, and the vertical axis represents the throttle opening amount which is the operation amount of the power source 21 for adjusting the damping torque. Incidentally, the vertical axis may also represent the engine load which is determined according to the throttle opening amount.

In the operating range determining map shown in FIG. 8, the first range is the lean air-fuel ratio operating range and the second range is the stoichiometric air-fuel ratio operating range, for example. That is, in the gasoline engine that forms the power source 21, air-fuel ratio control is executed such that the air-fuel ratio becomes a lean air-fuel ratio when the combination of the speed and the throttle opening amount is in the first range, i.e., the lean air-fuel ratio operating range, and air-fuel ratio control is executed such that the air-fuel ratio becomes a stoichiometric air-fuel ratio when the combination of the speed and the throttle opening amount is in the second range, i.e., the stoichiometric air-fuel ratio operating range.

In this case, when the operating point of the power source 21 determined by the combination of the current speed and the driver required throttle opening amount is within the first range, i.e., the lean air-fuel ratio operating range, and the operating point of the power source 21 determined by the combination of the current speed and the sum of the damping required throttle opening amount and the driver required throttle opening amount is within the second range, i.e., the stoichiometric air-fuel ratio operating range, the coordinated control, portion 105 limits the throttle opening amount that serves as the operation amount, such that the operating point of the power source 21 determined by the combination of the current speed and the sum of the damping required throttle opening amount and the driver required throttle opening amount falls within the first range, i.e., the lean air-fuel ratio operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the stoichiometric air-fuel ratio operating range, and the operating point of the power source 21 determined by the combination of the current speed and the sum of the damping required throttle opening amount and the driver required throttle opening amount is within the first range, i.e., the lean air-fuel ratio operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the stoichiometric air-fuel ratio operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with air-fuel ratio control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Also, the different operating ranges of the power source 21 may also be a cylinder-deactivated operating range and an all-cylinders-activated operating range. The cylinder-deactivated operating range is an operating range in which the operation of at least one of the plurality of cylinders is halted in a gasoline engine that forms the power source 21 and is provided with a so-called variable cylinder system that halts operation of at least one of a plurality of cylinders according to an operating condition. This cylinder-deactivated operation range is an operating range that attempts to improve emissions performance and fuel efficiency in the engine by halting operation of at least one of a plurality of cylinders according to an operating condition, for example. On the other hand, the all-cylinders-activated operating range is an operating range in which all of the plurality of cylinders of the gasoline engine that forms the power source 21 are operated. This all-cylinders-activated operating range is an operating range for ensuring power performance necessary during take-off or when accelerating or the like by operating all of the plurality of cylinders, for example. Incidentally, the cylinder-deactivated operating range and the all-cylinders-activated operating range also correspond to a combination of ranges where the sum of the lengths in the length direction of the cylinders (i.e., the lengths in the axial direction of the cylinders) that are operating in the gasoline engine that forms the power source 21 differ from one another.

In this case, for example, in the operating range determining map shown in FIG. 8, the first range may be the cylinder-deactivated operating range and the second range may be the all-cylinders-activated operating range. That is, in the gasoline engine that forms the power source 21, variable cylinder control is executed such that operation of at least one of a plurality of cylinders is halted when the combination of the speed and the throttle opening amount is in the first range, i.e., the cylinder-deactivated operating range, and variable cylinder control is executed such that all of the plurality of cylinders are operated when the combination of the speed and the throttle opening amount is in the second range, i.e., the all-cylinders-activated operating range.

In this case, when the operating point of the power source 21 determined by the combination of the current speed and the driver required throttle opening amount is within the first range, i.e., the cylinder-deactivated operating range, and the operating point of the power source 21 determined by the combination of the current speed and the sum of the damping required throttle opening amount and the driver required throttle opening amount is within the second range, i.e., the all-cylinders-activated operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the first range, i.e., the cylinder-deactivated operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the all-cylinders-activated operating range, and the operating point of the power source 21 determined by the combination of the current speed and the sum of the damping required throttle opening amount and the driver required throttle opening amount is within the first range, i.e., the cylinder-deactivated operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the all-cylinders-activated operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with variable cylinder control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed. Also, the vehicular damping control system 101 is able to suppress a specific cylinder from being repeatedly operated and halted more than is necessary, and thus is able to suppress deterioration of so-called NV performance (i.e., noise and vibration performance), in addition to executing suitable damping control, by coordinating the damping control with the variable cylinder control of the power source 21.

Further, the different operating ranges of the power source 21 may also be operating ranges in which the state of the intake air in the gasoline engine that serves as the power source 21 differs, for example. More specifically, the different operating ranges of the power source 21 may be a closed intake air flow control valve operating range and an open intake air flow control valve, as the operating ranges in which the state of the intake air of the gasoline engine differs, for example. The closed intake air flow control valve operating range is an operating range in which an intake air flow control valve is closed, in a gasoline engine that forms the power source 21 and has an intake air flow control valve (i.e., an intake air fluidic valve) provided in an intake passage. On the other hand, the open intake air flow control valve operating range is an operating range in which the intake air flow control valve is open.

Here, the intake air flow control valve provided in the intake passage is a valve that creates turbulence by changing the flow of intake air introduced into the combustion chamber of the engine that forms the power source 21, which is achieved by the intake air flow control valve being opened and closed. A tumble control valve (TCV) or a swirl control valve (SCV) are examples of such an intake air flow control valve. A tumble control valve is able to make the tumble flow produced in the combustion chamber relatively strong by making its opening amount (i.e., the sectional area of the passage through which intake air is able to pass in the intake passage) relatively small. A swirl control valve is able to make the swirl flow produced in the combustion chamber relatively strong by making its opening amount relatively small. The closed intake air flow control valve operating range described above is typically an operating range that attempts to improve emissions performance, fuel efficiency, and combustion efficiency in the engine by increasing the strength of the turbulence produced in the combustion chamber by making the opening amount of the valve relatively small.

In this case, in the operating range determining map shown in FIG. 8, for example, the first range is the closed intake air flow control valve operating range and the second range is the open intake air flow control valve operating range. That is, in the gasoline engine that forms the power source 21, intake air flow control valve opening/closing control is executed such that the opening amount of the intake air flow control valve becomes relatively small when the combination of the speed and the throttle opening amount is in the first range, i.e., the closed intake air flow control valve operating range, and intake air flow control valve opening/closing control is executed such that the opening amount of the intake air flow control valve becomes wide open when the combination of the speed and the throttle opening amount is in the second range, i.e., the open intake air flow control valve operating range.

In this case, when the operating point of the power source 21 determined by the combination of the current speed and the driver required throttle opening amount is within the first range, i.e., the closed intake air flow control valve operating range, and the operating point of the power source 21 determined by the combination of the current speed and the sum of the damping required throttle opening amount and the driver required throttle opening amount is within the second range, i.e., the open intake air flow control valve operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the first range, i.e., the closed intake air flow control valve operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the open intake air flow control valve operating range, and the operating point of the power source 21 determined by the combination of the current speed and the sum of the damping required throttle opening amount and the driver required throttle opening amount is within the first range, i.e., the closed intake air flow control valve operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the open intake air flow control valve operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with intake air flow control valve opening/closing control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Also, the closed intake air flow control valve operating range and the open intake air flow control valve operating range may also be operating ranges in which the operating state of the intake air flow control valve, which is the actuator of the power source 21, differs. That is, the operating state of the intake air flow control valve in the closed intake air flow control valve operating range is an operating state in which the opening amount of the intake air flow control valve is set relatively small, while the operating state of the intake air flow control valve in the open intake air flow control valve operating range is an operating state in which the opening amount of the intake air flow control valve is set to wide open. In other words, operating state of the intake air flow control valve which is the actuator of the power source 21 is able to be switched according to the throttle opening amount that is the operation amount of the power source 21 for adjusting the damping torque which is the control amount in damping control. That is, in this power source 21, the operating state of the actuator is switched each time the operating point of the power source 21 determined by the combination of the current speed and the throttle opening amount shifts from the first range, i.e., the closed intake air flow control valve operating range, to the second range, i.e., the open intake air flow control valve operating range, or from the second range, i.e., the open intake air flow control valve operating range, to the first range, i.e., the closed intake air flow control valve operating range.

Here, the vehicular damping control system 101 not only executes suitable damping control by coordinating damping control with intake flow control valve opening/closing control, i.e., actuator drive control of the power source 21, as described above, but is also able to suppress so-called hunting by suppressing the operating state of the intake air flow control valve, which is the actuator of the power source 21, from switching more than is necessary, and thus is able to suppress the number of times that the intake air flow control valve is operated, which lengthens the life of the device and reduces the power used for control.

Also, the different operating ranges of the power source 21 may be a closed variable intake control valve operating range and an open variable intake control valve operating range as the operating ranges in which the state of the intake air of the gasoline engine differs, for example. In a gasoline engine that forms the power source 21 and is provided with a so-called variable intake system (ACIS: Acoustic Control Induction System) that varies the path, length, or volume or the like of an intake passage, the closed variable intake control valve operating range is an operating range in which an ACIS valve, as a variable intake control valve of the variable intake system, is closed. On the other hand, the open variable intake control valve operating range is an operating range in which the ACIS valve is open.

Here, this variable intake system is designed to improve charging efficiency of the intake air and stabilize idling according to the state of the engine and the like by changing the path, length, or volume or the like of the intake passage, which is achieved by the ACIS valve being controlled open and closed. This variable intake system is able to improve charging efficiency of the air drawn into the combustion chamber of the engine that forms the power source 21 by making the opening amount (i.e., the sectional area of the passage through which intake air is able to pass in the intake passage) of the ACIS valve wide open.

FIG. 9 is a view of another example of an operating range determining map. This operating range determining map is a map that is modified in advance to match each vehicle 10 provided with the vehicular damping control system 101, and is stored in a storage element, not shown. In the operating range determining map in FIG. 9, the horizontal axis represents the speed corresponding to the engine speed Er of the engine which is the power source 21, and the vertical axis represents the throttle opening amount which is the operation amount of the power source 21 for adjusting the damping torque. Incidentally, the vertical axis may also represent the engine load which is determined according to the throttle opening amount.

In the operating range determining map shown in FIG. 9, the first range is the closed variable intake control valve operating range and the second range is the open variable intake control valve operating range, for example. That is, in the gasoline engine that forms the power source 21, variable intake control is executed such that the opening amount of the ACIS valve becomes completely closed when the combination of the speed and the throttle opening amount is in the first range, i.e., the closed variable intake control valve operating range, and variable intake control is executed such that the opening amount of the ACIS valve becomes wide open when the combination of the speed and the throttle opening amount is in the second range, i.e., the open variable intake control valve operating range.

In this case, when the operating point of the power source 21 determined by the combination of the current speed and the driver required throttle opening amount is within the first range, i.e., the closed variable intake control valve operating range, and the operating point of the power source 21 determined by the combination of the current speed and the sum of the damping required throttle opening amount and the driver required throttle opening amount is within the second range, i.e., the open variable intake control valve operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the first range, i.e., the closed variable intake control valve operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the open variable intake control valve operating range, and the operating point of the power source 21 determined by the combination of the current speed and the sum of the damping required throttle opening amount and the driver required throttle opening amount is within the first range, i.e., the closed variable intake control valve operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the open variable intake control valve operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with variable intake control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Also, the closed variable intake control valve operating range and the open variable intake control valve operating range may also be operating ranges in which the operating state of the ACIS valve in the variable intake system, which is the actuator of the power source 21, differs, similar to the closed intake air flow control valve operating range and the open intake air flow control valve operating range described above. Here, the vehicular damping control system 101 not only executes suitable damping control by coordinating damping control with variable intake control, i.e., actuator drive control of the power source 21, as described above, but is also able to suppress so-called hunting by suppressing the operating state of the ACIS valve in the variable intake system, which is the actuator of the power source 21, from switching more than is necessary, and thus is able to suppress the number of times that the ACIS valve is operated, which lengthens the life of the device and reduces the power used for control.

Also, the different operating ranges of the power source 21 may also be operating ranges in which the state of the exhaust from the gasoline engine that serves as the power source 21 differs, for example. More, specifically, the different operating ranges of the power source 21 may be an exhaust cooling promoting operating range and a basic operating range, as the operating ranges in which the state of the exhaust differs, for example. The exhaust cooling promoting operating range is an operating range in which cooling of the exhaust from the engine is promoted by an exhaust cooling system, in a gasoline engine that forms the power source 21 and has an exhaust cooling system provided in an exhaust passage. On the other hand, the basic operating range is an operating range in which cooling of the exhaust from the engine is not promoted by the exhaust cooling system.

Here, this exhaust cooling system is designed to promote cooling of the exhaust from the engine by changing the path, length, or volume or the like of the exhaust passage, which is achieved by an exhaust cooling promoting control valve being controlled open and closed, for example. This exhaust cooling system is able to promote cooling of the exhaust from the engine that forms the power source 21 by changing the path, length, or volume or the like by making the opening amount (i.e., the sectional area of the passage through which exhaust gas is able to pass in the exhaust passage) of the exhaust cooling control valve wide open.

In this case, in the operating range determining map shown in FIG. 8, the first range may be the basic operating range and the second range may be the exhaust cooling promoting operating range, for example. That is, in the gasoline engine that forms the power source 21, exhaust cooling control is executed such that the cooling of the exhaust from the engine is not promoted by the exhaust cooling system when the combination of the speed and the throttle opening amount is in the first range, i.e., the basic operating range, and exhaust cooling control is executed such that the cooling of the exhaust from the engine is promoted by the exhaust cooling system when the combination of the speed and the throttle opening amount is in the second range, i.e., the exhaust cooling promoting operating range.

In this case, when the operating point of the power source 21 determined by the combination of the current speed and the driver required throttle opening amount is within the first range, i.e., the basic operating range, and the operating point of the power source 21 determined by the combination of the current speed and the sum of the damping required throttle opening amount and the driver required throttle opening amount is within the second range, i.e., the exhaust cooling promoting operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the first range, i.e., the basic operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the exhaust cooling promoting operating range, and the operating point of the power source 21 determined by the combination of the current speed and the sum of the damping required throttle opening amount and the driver required throttle opening amount is within the first range, i.e., the basic operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the exhaust cooling promoting operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with exhaust cooling control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Also, the basic operating range and the exhaust cooling promoting operating range may also be operating ranges in which the operating state of the exhaust cooling control valve of the exhaust cooling system, which is the actuator of the power source 21, differs, similar to the closed intake air flow control valve operating range and the open intake air flow control valve operating range described above. Here, the vehicular damping control system 101 not only executes suitable damping control by coordinating damping control with exhaust cooling control, i.e., actuator drive control of the power source 21, as described above, but is also able to suppress so-called hunting by suppressing the operating state of the exhaust cooling control valve of the exhaust cooling system, which is the actuator of the power source 21, from switching more than is necessary, and thus is able to suppress the number of times that the exhaust cooling control valve is operated, which lengthens the life of the device and reduces the power used for control.

Also, the different operating ranges of the power source 21 may also be an EGR (EGR: Exhaust Gas Recirculation) activated operating range and an EGR deactivated operating range, as the operating ranges in which the state of the exhaust from the engine differs. The EGR activated operating range is an operating range in which exhaust gas from the engine is recirculated to the intake side by an EGR system, in a gasoline engine that forms the power source 21 and has an EGR system provided in the exhaust passage. On the other hand, the EGR deactivated operating range is an operating range in which exhaust gas from the engine is not recirculated to the intake side by the EGR system.

Here, this EGR system is designed to improve fuel efficiency and emissions performance of the engine by recirculating exhaust gas to the intake side of the engine via an EGR passage, which is achieved by an EGR valve being controlled open and closed, for example. This EGR system is to able improve fuel efficiency and emissions performance of the engine by increasing the amount of exhaust gas that is recirculated to the intake side of the engine, which is done by making the opening amount (i.e., the sectional area of the passage through which exhaust gas is able to pass) of the EGR valve relatively large.

In this case, in the operating range determining map shown in FIG. 8, the first range may be the EGR activated operating range and the second range may be the EGR deactivated operating range, for example. That is, in the gasoline engine that forms the power source 21, EGR control is executed such exhaust gas from the engine is recirculated to the intake side by the EGR system when the combination of the speed and the throttle opening amount is in the first range, i.e., the EGR activated operating range, and EGR control is executed such that exhaust gas from the engine is not recirculated to the intake side by the EGR system when the combination of the speed and the throttle opening amount is in the second range, i.e., the EGR deactivated operating range.

In this case, when the operating point of the power source 21 determined by the combination of the current speed and the driver required throttle opening amount is within the first range, i.e., the EGR activated operating range, and the operating point of the power source 21 determined by the combination of the current speed and the sum of the damping required throttle opening amount and the driver required throttle opening amount is within the second range, i.e., the EGR deactivated operating range, the coordinated control portion 105 limits the throttle opening amount that serves as the operation amount, such that the operating point of the power source 21 determined by the combination of the current speed and the sum of the damping (required throttle opening amount and the driver required throttle opening amount falls within the first range, i.e., the EGR activated operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to suppressing decreases in fuel efficiency and emissions performance of the gasoline engine that serves as the power source 21.

Also, when the operating point of the power source 21 determined by the combination of the current speed and the driver required throttle opening amount is within the second range, i.e., the EGR deactivated operating range, and the operating point of the power source 21 determined by the combination of the current speed and the sum of the damping required throttle opening amount and the driver required throttle opening amount is within the first range, i.e., the EGR activated operating range, the coordinated control portion 105 limits the throttle opening amount that serves as the operation amount, such that the operating point of the power source 21 determined by the combination of the current speed and the sum of the damping required throttle opening amount and the driver required throttle opening amount falls within the second range, i.e., the EGR deactivated operating range, which is one of the operating ranges when damping control is not executed, and sets this limited throttle opening amount as the final throttle opening amount. As a result, the vehicular damping control system 101 is able to improve the operational stability for the driver and riding comfort for the occupants and the like by executing suitable damping control, in addition to improving responsiveness by placing the power source 21 in a state in which it is able to respond quickly to a demand for additional acceleration in order to satisfy the running performance demands on the vehicle 10, for example.

Therefore, the vehicular damping control system 101 is able to coordinate the damping control with EGR control of the power source 21, and thus execute suitable damping control, by limiting the throttle opening amount that serves as the operation amount of the power source 21 when the power source 21 is operating near the boundary between different operating ranges, and changing the control mode of the damping control such that the power source 21 operates in one of the operating ranges when damping control is not executed.

Also, the EGR activated operating range and the EGR deactivated operating range may also be operating ranges in which the operating state of the EGR valve of the EGR system, which is the actuator of the power source 21, differs, similar to the closed intake air flow control valve operating range and the open intake air flow control valve operating range described above. Here, the vehicular damping control system 101 not only executes suitable damping control by coordinating damping control with EGR control, i.e., actuator drive control of the power source 21, as described above, but is also able to suppress so-called hunting by suppressing the operating state of the EGR valve of the EGR system, which is the actuator of the power source 21, from switching more than is necessary, and thus is able to suppress the number of times that the EGR valve is operated, which lengthens the life of the device and reduces the power used for control.

Incidentally, the means for making the state of the exhaust from the engine that forms the power source 21 different, or the actuator of the power source 21 that switches operating states according to the operation amount of the power source 21 in order to adjust the control amount (i.e., the damping torque) of the damping control, is not limited to the exhaust cooling control valve of the exhaust cooling system or the EGR valve of the EGR system. For example, the means, i.e., the actuator of the power source 21 may also be, for example, an exhaust pressure control valve that variably controls the exhaust pressure in the engine, a waste gate valve that controls the boost pressure in an engine provided with a supercharger by opening and closing a bypass conduit (i.e., a waste gate) that bypasses the turbine of the supercharger, an exhaust brake that generates braking force by increasing the back pressure applied to a piston in the engine by blocking the exhaust passage, or a bypass valve that opens and closes a branched exhaust passage having a catalyst is provided in each branch so as to lead exhaust gas to one of the catalysts to purify it.

Also, the vehicular damping control system 101 may have a plurality of combinations of different operating ranges of the power source 21 such as those described above. In this case, the control mode of the damping control may be changed when the power source 21 is operating near the boundary between different operating ranges in each of the combinations. In this case as well, the vehicular damping control system 101 is able to execute appropriate damping control according to the state of the power source 21 by coordinating the damping control with other control related to the power source 21.

Also, in the description above, the operating range of the power source 21 is described as being determined according to at least the operation amount of the power source 21 for adjusting the control amount (i.e., the damping torque) in the damping control, which is the throttle opening amount in the description above, but the invention is not limited to this. That is, the operating range of the power source 21 may also simply be determined according to various parameters related to the state of the power source 21.

Further, in the description above, the vehicular damping control system 101 changes the control mode of the damping control such that the power source 21 operates in one of the operating ranges when damping control is not executed, when the power source 21 is operating near the boundary between different operating ranges. However, the invention is not limited to this. That is, the vehicular damping control system 101 may also change the control mode of the damping control according to the operating range of the power source 21.

The coordinated control portion 105 may also change the control mode of the damping control by changing the means for adjusting the damping torque which is the control amount in the damping control, i.e., by changing the type of operation amount of the power source 21 for adjusting the damping torque in the damping control, for each of the different operating ranges of the power source 21, for example. That is, the coordinated control portion 105 may, also change the control mode of the damping control to a control mode that corresponds to each of the operating ranges, in the operating ranges that differ from each other, among the operating ranges of the power source 21.

In this case, when the engine that forms the power source 21 has a supercharger and a throttle valve, the different operating ranges of the power source 21 may include a pressure-boost adjusting operating range and a throttle adjusting operating range, for example. The pressure-boost adjusting operating range is an operating range in which the damping torque which is the control amount in the damping control is adjusted by adjusting the boost pressure in the intake passage with a supercharger provided in an intake passage of the engine that forms the power source 21. The throttle adjusting operating range is an operating range in which the damping torque which is the control amount in the damping control is adjusted by adjusting the opening amount of the intake passage with a throttle valve provided in the intake passage of the engine that forms the power source 21.

Another example of coordinated control of the vehicular damping control system 101 according to the first example embodiment will now be described with reference to the flowchart in FIG. 10. Incidentally, the control routine is executed repeatedly in control cycles every several milliseconds to every several tens of milliseconds.

The coordinated control portion 105 of the vehicular damping control system 101 determines whether damping control is being executed based on detection signals from various sensors, control signals, or whether a damping control-on flag is on or off, or the like (S200). If it is determined that damping control is not being executed (i.e., No in S200), the coordinated control portion 105 ends the current control cycle and proceeds on to the next control cycle.

If, on the other hand, it is determined that damping control is being executed (i.e., Yes in S200), the coordinated control portion 105 then determines whether the current operating point of the power source 21 is within the first range, i.e., the pressure-boost adjusting operating range, for example (S202). The coordinated control portion 105 is able to determine whether the current operating point of the power source 21 is within a first range, i.e., the pressure-boost adjusting operating range, by determining whether the current operating point of the power source 21 is in an operating range in which the damping torque which is the control amount in the damping control is unable to be adjusted without a pressure boost, for example.

Here, the operating range in which the damping torque which is the control amount in the damping control is unable to be adjusted without a pressure boost is an operating range in which the opening amount of the throttle valve is wide open (WOT: Wide Open Throttle), for example. That is, the first range, i.e., the pressure-boost adjusting operating range, and the second range, i.e., the throttle adjusting operating range, are operating ranges in which the boundary therebetween is set according to the throttle opening amount of the throttle valve. Here, the first range, i.e., the pressure-boost adjusting operating range, is an operating range in which the opening amount of the throttle valve is near wide open (WOT), and the second range, i.e., the throttle adjusting operating range, is an operating range in which the opening amount of the throttle valve is equal to or less than a predetermined opening amount.

If it is determined by the coordinated control portion 105 that the current operating point of the power source 21 is within the first range, i.e., the pressure-boost adjusting operating range, (i.e., Yes in S202), the vehicular damping control system 101 then executes damping control in a first mode in which the damping torque is adjusted by adjusting the boost pressure using the supercharger (S204), after which the vehicular damping control system 101 ends the current control cycle and proceeds on to the next control cycle. That is, if the current operating point of the power source 21 is within the first range, i.e., the pressure-boost adjusting operating range, such that the vehicular damping control system 101 executes damping control in the first mode, the vehicular damping control system 101 uses the boost pressure as the operation amount of the power source 21 for adjusting the damping torque and includes the operation amount for adjusting this boost pressure in a control command from the control command determining portion 103c to the power source 21.

Incidentally, the boost pressure from the supercharger can be adjusted by, for example, adjusting the flowrate of exhaust gas introduced to the turbine, which is done by controlling the opening amount of a nozzle vane provided in the turbine of the supercharger, adjusting the opening amount of a waste gate valve provided in a bypass conduit (i.e., a waste gate) that bypasses the turbine, or, if the supercharger is a so-called motor-assisted supercharger, adjusting the driving of this motor.

If it is determined by the coordinated control portion 105 that the current operating point of the power source 21 is not within the first range, i.e., the pressure-boost adjusting operating range, (i.e., No in S202), that is, if the current operating point of the power source 21 is within the second range, i.e., the throttle adjusting operating range, then the vehicular damping control system 101 executes damping control in a second mode in which the damping torque is adjusted by adjusting the throttle opening amount with the throttle valve (S206), after which the vehicular damping control system 101 ends the current control cycle and proceeds on to the next control cycle. That is, if the current operating point of the power source 21 is within the second range, i.e., the throttle adjusting operating range, such that the vehicular damping control system 101 executes damping control in the second mode, the vehicular damping control system 101 uses the opening amount of the throttle as the operation amount of the power source 21 for adjusting the damping torque and includes the operation amount for adjusting this throttle opening amount in a control command from the control command determining portion 103*c* to the power source 21.

Therefore, the vehicular damping control system 101 is able to coordinate damping control with pressure-boost control of the power source 21, and thus appropriately execute damping control, by changing the control mode of the damping control by changing the means for adjusting the damping torque that is the control amount in the damping control for each different operating range of the power source 21.

Incidentally, the first range, i.e., the pressure-boost adjusting operating range, and the second range, i.e., the throttle adjusting operating range, may also be operating ranges in which the boundary therebetween is set according to so-called turbo lag. In an engine with a turbocharger such as that described above, it is known that so-called turbo lag occurs, in which there is a temporal delay in response from the time the throttle valve is opened until the engine speed accelerates. Therefore, the boundary between the first range, i.e., the pressure-boost adjusting operating range, and the second range, i.e., the throttle adjusting operating range, may be set according to the extent of this turbo lag, and the first mode or the second mode of the damping control may be used as the situation demands based on the first range, i.e., the pressure-boost adjusting operating range, and the second range, i.e., the throttle adjusting operating range, which are determined according to the extent of the turbo lag. Also, depending on the situation, one of the first mode or the second mode of the damping control may be a made that sets the damping torque which is the control amount in the damping control to 0, i.e., prohibits damping control.

Further, when the control mode of the damping control is changed by changing the means for adjusting the damping torque which is the control amount in the damping control for each different operating range of the power source 21, and the engine that forms the power source 21 is provided with a so-called variable intake valve lift mechanism and a throttle valve, the different operating ranges of the power source 21 may also include a lift adjusting operating range and a throttle adjusting operating range, for example. The coordinated control portion 105 may also use the first mode or the second mode of the damping control as the situation demands based on a first range, i.e., the lift adjusting operating range, and a second range, i.e., the throttle adjusting operating range. Here, the variable intake valve lift mechanism is able to change the lift amount of an intake valve provided in the intake passage of the engine, and adjusts the intake air amount by changing the lift amount of the intake valve in a continuous manner.

The lift adjusting operating range is an operating range in which the damping torque which is the control amount of the damping control is adjusted by adjusting the lift amount of the intake valve provided in the intake passage with the variable intake valve lift mechanism of the engine that forms the power source 21. The throttle adjusting operating range is an operating range in which the damping torque which is the control amount of the damping control is adjusted by adjusting the opening amount of the intake passage with the throttle valve provided in the intake passage of the engine that forms the power source 21.

The first range, i.e., the lift adjusting operating range, and the second range, i.e., the throttle adjusting operating range, are operating ranges in which the boundary therebetween is set according to the temperature (i.e., the coolant temperature or the control fluid temperature) of the engine which is the power source 21, for example. Here, the first range, i.e., the lift adjusting operating range, is an operating range in which the temperature of the engine is relatively high, the viscosity of the control fluid of the variable intake valve lift mechanism is relatively low, and sufficient control accuracy of the lift amount of the intake valve is able to be ensured. On the other hand, the second range, i.e., the throttle adjusting operating range, is an operating range in which the temperature of the engine is relatively low, the viscosity of the control fluid of the variable intake valve lift mechanism is relatively high, and sufficient control accuracy of the lift amount of the intake valve is unable to be ensured, such that there is a tendency for there to be a large amount of control error in the lift amounts of the intake valves among the cylinders of the engine, for example.

If it is determined by the coordinated control portion 105 that the current operating point of the power source 21 is within the first range, i.e., the lift adjusting operating range, the vehicular damping control system 101 executes damping control in a first mode in which the damping torque is adjusted by adjusting the lift amount of the intake valve with the variable intake valve lift mechanism. That is, if the current operating point of the power source 21 is within the first range, i.e., the lift adjusting operating range, such that the vehicular damping control system 101 executes damping control in the first mode, the vehicular damping control system 101 uses the lift amount of the intake valve as the operation amount of the power source 21 for adjusting the damping torque, and includes this operation amount for adjusting the lift amount of the intake valve in a control command from the control command determining portion 103*c* to the power source 21.

On the other hand, if it is determined by the coordinated control portion 105 that the current operating point of the power source 21 is within the second range, i.e., the throttle adjusting operating range, the vehicular damping control system 101 executes damping control in a second mode in which the damping torque is adjusted by adjusting the throttle opening amount with the throttle valve. That is, if the current operating point of the power source 21 is within the second range, i.e., the throttle adjusting operating range, such that the vehicular damping control system 101 executes damping control in the second mode, the vehicular damping control system 101 uses the throttle opening amount as the operation amount of the power source 21 for adjusting the damping torque, and includes this operation amount for adjusting the throttle opening amount in a control command from the control command determining portion 103c to the power source 21.

Therefore, the vehicular damping control system 101 is able to coordinate damping control with variable intake valve lift control of the power source 21, and thus appropriately execute damping control, by changing the control mode of the damping control by changing the means for adjusting the damping torque that is the control amount in the damping control for each different operating range of the power source 21.

Incidentally, the vehicular damping control system 101 according to this first example embodiment may also be applied to a hybrid vehicle 10A that has a hybrid type drive system 20A, as shown in FIG. 11. The drive system 20A in this hybrid vehicle 10A includes at least an engine and an electric motor as the driver source 21A.

The hybrid vehicle 10A includes an engine 210, a power split device 220 that splits the engine torque output from this engine 210, a first motor-generator 231 that operates mainly as a generator by some of the engine torque split by the power split device 220, a second motor-generator 232 that operates mainly as an electric motor using power generated by the first motor-generator 231 or power from a battery 241, and a power transmitting device 250 that transmits output torque from the power source 21A to the wheels 30RL and 30RR (i.e., drive shafts Ds, Ds) which are the driving wheels.

Moreover, this hybrid vehicle 10A is provided with an ECU 50 that has the vehicular damping control system 101 built into it. The ECU 50 includes, for example, an electronic control unit that controls the operation of the overall vehicle, an electronic control unit that controls the operation of the engine 210, and an electronic control unit that controls the operation of the first motor-generator 231 and the second motor-generator 232, and the like.

The engine 210 serves as the power source 21A, and is an engine such as a gasoline engine, a diesel engine, or an LPG engine. In this engine 210, the piston is moved up and down by combusting fuel in a combustion chamber. This up and down motion generates mechanical power (i.e., engine torque) in an output shaft (i.e., a crankshaft) 211.

The first motor-generator 231 and the second motor-generator 232 also serve as the power source 21A, and are each formed as a well-known synchronous generator-motor that is able to be driven as a motor or a generator, and supply and receive power to and from the battery 241 via an inverter 242. This inverter 242 is controlled by the ECU 50 with the built-in vehicular damping control system 101.

The power split device 220 is formed as a planetary gear set that has a sun gear which is a gear with external teeth, a ring gear which is a gear with internal teeth that is arranged concentric with the sun gear, a plurality of pinion gears that are in mesh with both the sun gear and the ring gear, and a planetary carrier that rotatably and revolvably retains these pinion gears. The planetary gear set performs a differential operation with the sun gear, the ring gear, and the planetary carrier as the rotating elements. The sun gear is connected to a rotating shaft 231a of the first motor-generator 231. The ring gear is connected via a ring gear shaft to a reduction gear of the power transmitting device 250 that is formed by a reduction gear unit and a differential gear unit and the like. In this power transmitting device 250, the reduction gear is connected to a rotating shaft 232a of the second motor-generator 232, and the differential gear unit is connected to the drive shafts Ds and Ds of the wheels 30RL and 30RR. Also, the planetary carrier is connected to the output shaft 211 of the engine 210.

In this power split device 220, engine torque is divided and transmitted to the ring gear and the sun gear via the pinion gears. A portion of the engine torque is transmitted to the sun gear, and the rest of the engine torque is transmitted to the ring gear. The portion of the engine torque that is transmitted via the sun gear is used to operate the first motor-generator 231 as a generator. At this time, the power produced by the first motor-generator 231 is sent to the inverter 242 and then used to charge the battery 241 or supplied to the second motor-generator 232. On the other hand, the rest of the engine torque that is transmitted via the ring gear is used to directly drive the drive shafts Ds and Ds via the power transmitting device 250. Also, this power split device 220 is also able to control the amount of engine torque by adjusting the motor-generator torque of the first motor-generator 231.

When changing the control mode of the damping control by changing the means for adjusting the damping torque which is the control amount in the damping control for each different operating range of the power source 21A, when the power source 21A includes the engine 210 and the second motor-generator 232, the different operating ranges of the power source 21A may also include an engine adjusting operating range and an electric motor adjusting operating range, for example. The coordinated control portion 105 may also use the first mode and the second mode of the damping control as the situation demands based on a first range, i.e., the engine adjusting operating range, and a second range, i.e., the electric motor adjusting operating range, for example.

The engine adjusting operating range is an operating range in which the damping torque which is the control amount in the damping control is adjusted by adjusting the output of the engine 210 that forms the power source 21A. The electric motor adjusting operating range is an operating range in which the damping torque which is the control amount in the damping control is adjusted by adjusting the output of the second motor-generator 232 that forms the power source 21A.

The first range, i.e., the engine adjusting operating range, and the second range, i.e., the electric motor adjusting operating range, are operating ranges in which the boundary therebetween is set according to the SOC (state-of-charge) of the battery 241 or the temperature (i.e., the coolant temperature or the control fluid temperature) of the engine 210 that serves as the power source 21A, or the like. Here, the first range, i.e., the engine adjusting operating range, is an operating range in which the SOC is relatively low and sufficient output from the second motor-generator 232 is difficult to ensure, for example. On the other hand, the second region, i.e., the electric motor adjusting operating range, is an operating range when the engine 210 is cold, i.e., when the temperature of the engine 210 is relatively low, and in which sufficient accuracy of output control of the engine 210 is difficult to ensure, for example.

If it is determined by the coordinated control portion 105 that the current operating point of the power source 21A is within the engine adjusting operating range, the vehicular damping control system 101 executes damping control in a first mode in which the damping torque is adjusted by adjusting the output of the engine 210. That is, if the current operating point of the power source 21A is within the first range, i.e., the engine adjusting operating range, such that the vehicular damping control system 101 executes damping control in the first mode, the vehicular damping control system 101 then uses the operation amount that adjusts the output of the engine 210, i.e., the throttle opening amount or the ignition timing if the engine 210 is a gasoline engine, or the fuel injection quantity if the engine 210 is a diesel engine, as the operation amount of the power source 21A for adjusting the damping torque, and includes this operation amount that adjusts the output of the engine 210 in a control command from the control command determining portion 103c to the engine 210, i.e., the power source 21A.

On the other hand, if it is determined by the coordinated control portion 105 that the current operating point of the power source 21A is within the second range, i.e., the electric motor adjusting operating range, the vehicular damping control system 101 executes damping control in a second mode in which the damping torque is adjusted by adjusting the output of the second motor-generator 232. That is, if the current operating point of the power source 21A is within the second range, i.e., the electric motor adjusting operating range, such that the vehicular damping control system 101 executes damping control in the second mode, the vehicular damping control system 101 uses the operation amount that adjusts the output of the second motor-generator 232, i.e., the amount of supplied current or the like, as the operation amount of the power source 21A for adjusting the damping torque, and includes this operation amount that adjusts the output of the second motor-generator 232 in a control command from the control command determining portion 103c to the second motor-generator 232, i.e., the power source 21A.

Therefore, the vehicular damping control system 101 is able to coordinate damping control with normal output control of the power source 21A, and thus appropriately execute damping control, by changing the control mode of the damping control by changing the means for adjusting the damping torque that is the control amount in the damping control for each different operating range of the power source 21A. Incidentally, the boundary between the first range, i.e., the engine adjusting operating range, and the second range, i.e., the electric motor adjusting operating range, may also be set according to the vehicle speed or the like, for example.

Incidentally, when changing the control mode of the damping control by changing the means for adjusting the damping torque which is the control amount in the damping control for each different operating range of the power source 21 and 21A, and the different operating ranges of the power source 21 and 21A include three or more different operating ranges, the vehicular damping control system 101 may change the control mode of the damping control by changing the means for adjusting the damping torque that is the control amount in the damping control for each of these operating ranges. In this case as well, the vehicular damping control system 101 is able to coordinate the damping control with other control related to the power source 21 and 21A, and thus execute appropriate damping control according to the state of the power source 21 and 21A. Also, when the power source 21 and 21A is operating near a boundary between different operating ranges, the vehicular damping control system 101 may also appropriately combine control that changes the control mode of the damping control such that the power source 21 and 21A operates in one of the operating ranges when damping control is not executed, with control that changes the control mode of the damping control by changing the means for adjusting the control amount in the damping control for each of the different operating ranges of the power source 21 and 21A.

With the vehicular damping control system 101 according to the first example embodiment of the invention described above, the vehicular damping control system 101 that executes damping control that suppresses sprung mass vibration in the vehicle 10 and 10A by controlling the power source 21 and 21A provided in the vehicle 10 and 10A changes the control mode of the damping control according to the operating range of the power source 21 and 21A. Having the vehicular damping control system 101 change the control mode of the damping control according to the operating range of the power source 21 and 21A makes it possible to coordinate the damping control with other control related to the power source 21 and 21A, for example, and thus execute damping control appropriately.

Furthermore, with the vehicular damping control system 101 according to the first example embodiment of the invention described above, when the power source 21 and 21A is operating near a boundary between different operating ranges of this power source 21 and 21A, the control mode of the damping control may also be changed such that the power source 21 and 21A operates in one of the operating ranges when damping control is not executed. In this case, having the vehicular damping control system 101 change the control mode of the damping control such that the power source 21 and 21A operates in one of the operating ranges when damping control is not executed, when the power source 21 and 21A is operating near a boundary between different operating ranges, makes it possible to coordinate the damping control with other control related to the power source 21 and 21A, for example, and thus execute damping control appropriately.

Moreover, with the vehicular damping control system 101 according to the first example embodiment of the invention described above, the operating range of the power source 21 and 21A may be set according to at least the operation amount of the power source 21 and 21A for adjusting the control amount of the damping control, and the control mode of the damping control may be changed by limiting the operation amount of the power source 21 and 21A for adjusting the control amount in the damping control when the power source 21 and 21A is operating near a boundary between different operating ranges of this power source 21 and 21A. In this case, having the vehicular damping control system 101 change the control mode of the damping control by limiting the operation amount of the power source 21 and 21A for adjusting the control amount in the damping control when the power source 21 and 21A is operating near a boundary between operating ranges makes it possible to coordinate the damping control with other control related to the power source 21 and 21A, for example, and thus execute damping control appropriately.

Further, with the vehicular damping control system 101 according to the first example embodiment of the invention described above, the control mode of the damping control may also be changed by changing the means for adjusting the control amount in the damping control for each different operating range of the power source 21 and 21A. In this case, having the vehicular damping control system 101 change the control mode of the damping control by changing the means for adjusting the damping torque which is the control amount in the damping control for each of the different operating ranges of the power source 21 and 21A makes it possible to coordinate the damping control with other control related to the power source 21 and 21A, for example, and thus execute damping control appropriately.

Incidentally, the vehicular damping control system according to the first example embodiment of the invention described above is not limited to the first example embodiment, but may be modified in various ways within the scope of the claims.

In the description above, the vehicular damping control system performs sprung mass damping control assuming a sprung mass or a sprung mass/unsprung mass motion model as the motion mode, and using the theory of the optimum regulator. However, the invention is not limited to this. That is, the vehicular damping control system may also employ a motion model other than those described above, or perform damping by a control method other than the optimum regulator.

Also, in the first example embodiment, a case in which the power of the power source 21 and 21A is controlled based on the driving force required by the driver is described. However, the invention is not limited to this. For example, the vehicle 10 and 10A may also be provided with an automatic running control apparatus, and the power may be controlled based on automatic running required torque that is calculated when controlling the power source 21 and 21A during automatic running control.

Figure 12:
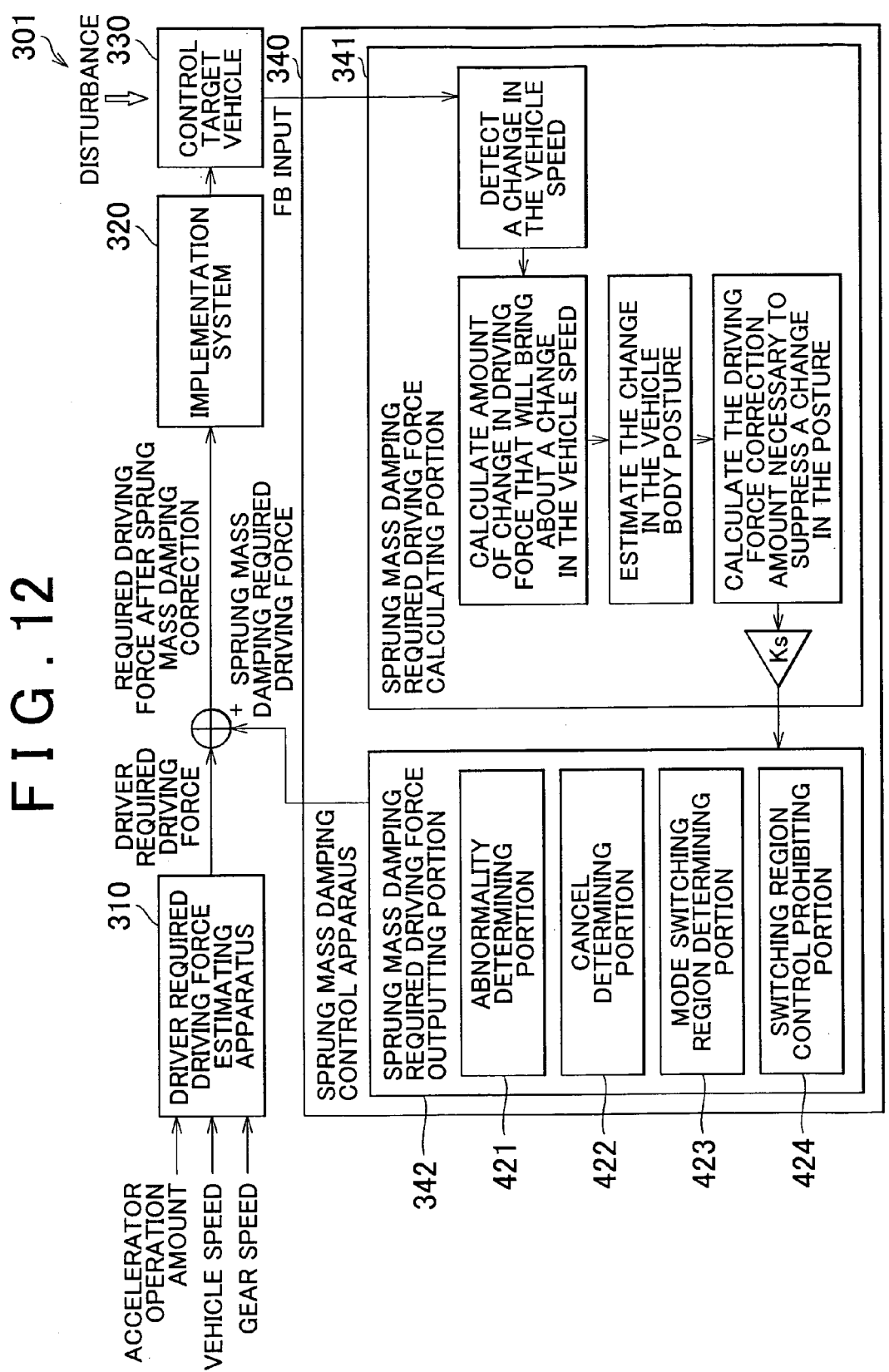
FIG. 12 is a view in the form of control blocks showing a frame format of an example of the functional structure of a vehicular damping control system according to a second example embodiment of the invention.

FIG. 12 is a view in the form of control blocks showing a frame format of an, example of the functional structure of a vehicular damping control system according to a second example embodiment of the invention. As shown in FIG. 12, the vehicular damping control system 301 according to this second example embodiment includes a driver required driving force estimating apparatus 310, an implementation system 320, a control target vehicle 330, and a sprung mass damping control apparatus 340.

The driver required driving force estimating apparatus 310 estimates the driver required driving force that is required by the driver. That is, the driver required driving force estimating apparatus 310 estimates the driver required driving force based on input such as the accelerator operation amount, the vehicle speed, and the gear speed. The driver required driving force estimating apparatus 310 then outputs the estimated driver required driving force to the implementation system 320.

Figure 13:
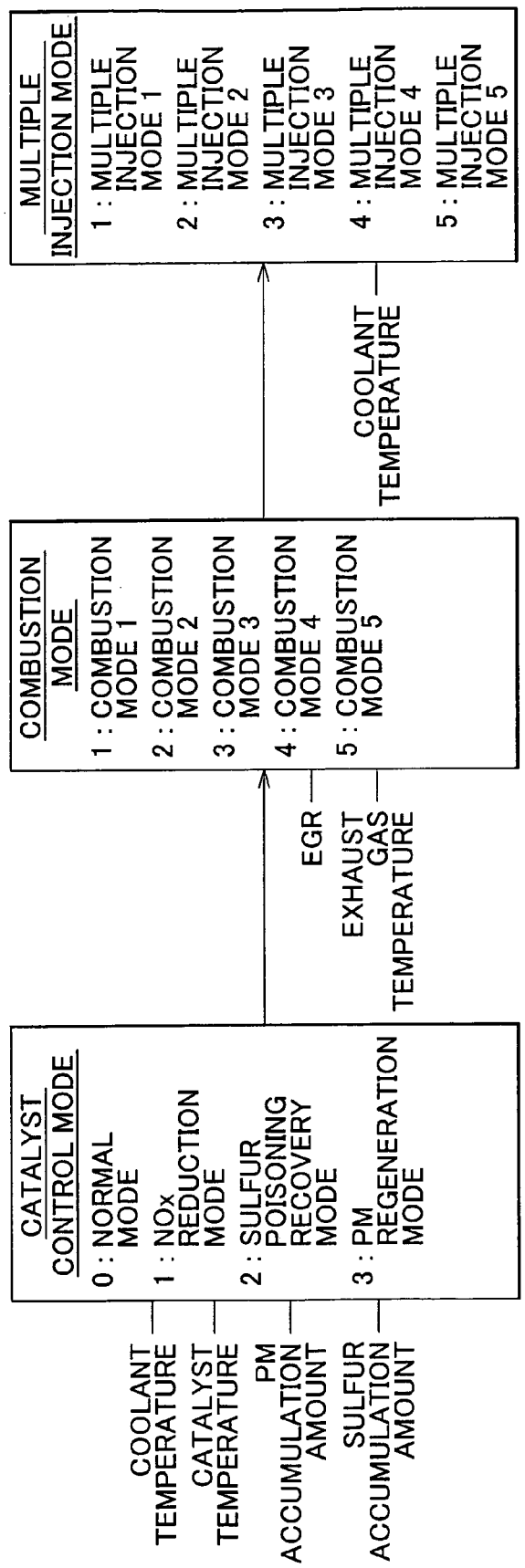
FIG. 13 is a view illustrating an engine control mode in the vehicular damping control system according to the second example embodiment of the invention.

The implementation system 320 is an engine control portion that controls the injection quantity and injection timing and the like of fuel injected into the engine, based on the driver required driving force output from the driver required driving force estimating apparatus 310. The implementation system 320 also controls the injection quantity and the injection timing and the like of fuel injected into the engine, based on a control mode for controlling the engine, as shown in FIG. 13. There are three types of control modes: catalyst control modes, combustion modes, and multiple injection modes.

The catalyst control modes are modes that are selected based on the coolant temperature, the catalyst temperature, and the accumulation amount of NOx, PM (particulate matter), and sulfur (S) that have accumulated in the catalyst, and the like, in order to purify the exhaust gas. As shown in Table 1, there are four types of catalyst control modes: 0: normal control mode, 1: NOx reduction mode, 2: sulfur poisoning recovery mode, and 3: PM regeneration mode. The implementation system 320 purifies the exhaust gas discharged from the engine by selecting these modes as appropriate.

The combustion modes are modes that are selected to perform lean combustion or stoichiometric combustion or the like which have different air-fuel ratios, to realize the type of catalyst control mode that has been set. As shown in Table 2, there are five types of combustion modes: 1: normal combustion mode, 2: EGR shut-off temperature increasing combustion mode, 3: temperature increasing multiple injection combustion mode, 4: low temperature combustion lean combustion mode, and 5: sulfur poisoning recovery mode. The implementation system 320 has one or a plurality of combustion mode maps for selecting these combustion modes 1 to 5, for each catalyst control mode.

Figure 14:
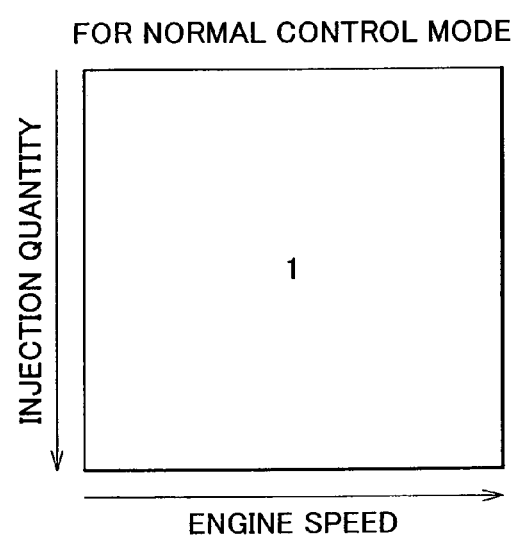
FIG. 14 is a combustion mode map for when the catalyst control mode is the normal control mode, in the vehicular damping control system according to the second example embodiment of the invention.
Figure 15A:
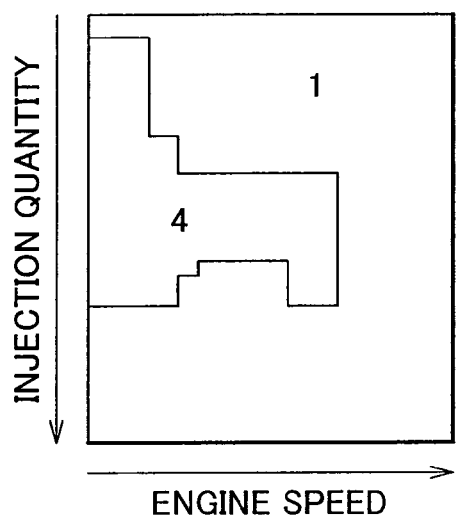
FIGS. 15A and 15B are combustion mode maps for when the catalyst control mode is a NOx reduction mode, in the vehicular damping control system according to the second example embodiment of the invention.
Figure 15B:
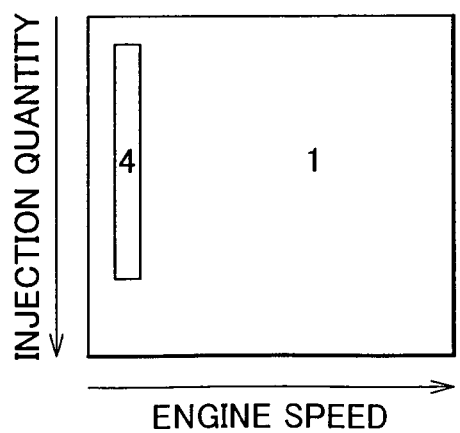
Figure 16A:
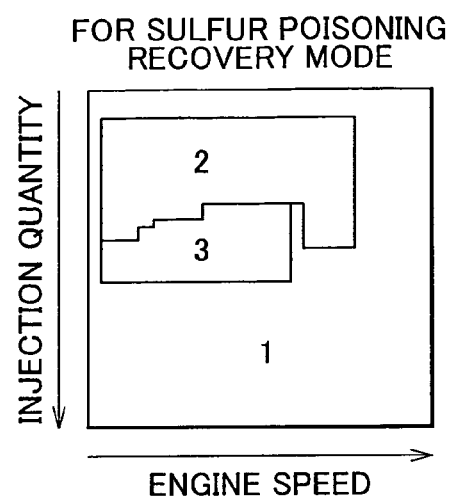
FIGS. 16A, 16B, and 16C are combustion mode maps for when the catalyst control mode is a sulfur poisoning recovery mode, in the vehicular damping control system according to the second example embodiment of the invention.
Figure 16B:
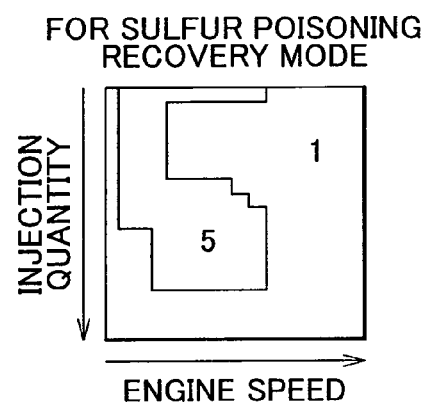
Figure 16C:
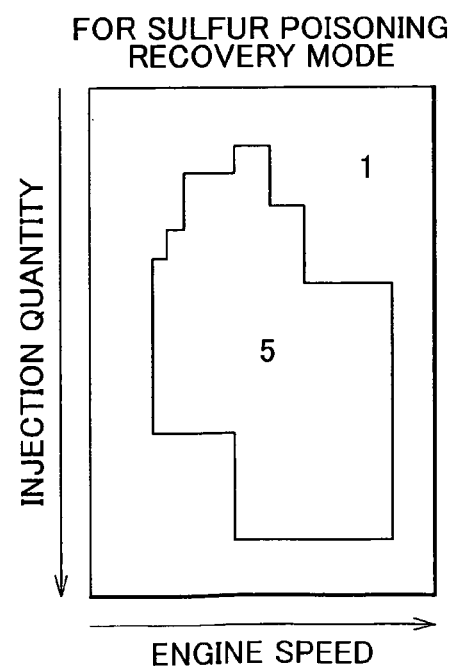
Figure 17:
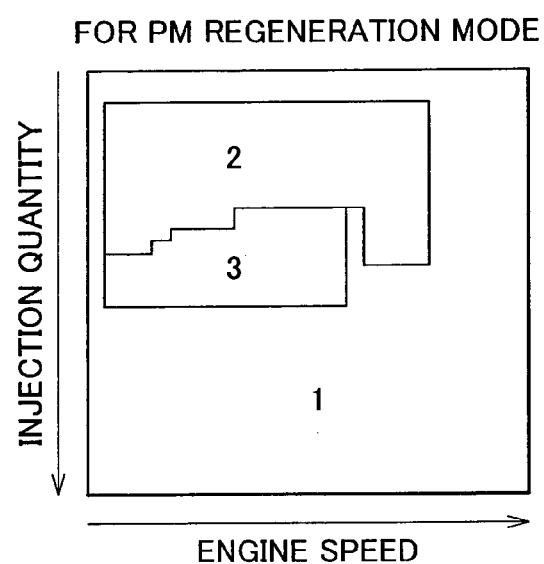
FIG. 17 is a combustion mode map for when the catalyst control mode is a PM regeneration mode, in the vehicular damping control system according to the second example embodiment of the invention.

FIG. 14 is a combustion mode map for when the catalyst control mode is the normal control mode. FIGS. 15A and 15B are combustion mode maps for when the catalyst control mode is the NOx reduction mode. FIGS. 16A, 16B, and 16C are combustion mode maps for when the catalyst control mode is the sulfur poisoning recovery mode, and FIG. 17 is a combustion mode map for when the catalyst control mode is the PM regeneration mode.

As shown in FIGS. 14 to 17, each combustion mode map is shown in two-dimensional table form with the engine speed and the injection quantity. The implementation system 320 has one type of combustion mode map for the normal combustion mode. Also, the implementation system 320 has a plurality of types of combustion mode maps (FIGS. 15A and 15B), according to on the catalyst temperature, for the NOx reduction mode. Further, the implementation system 320 has a plurality of types of combustion mode maps (FIGS. 16A, 16B, and 16C), according to on the catalyst temperature and the sulfur accumulation amount, for the sulfur poisoning recovery mode. Also, the implementation system 320 has one type of combustion mode map (FIG. 17) for the PM regeneration mode.

Figure 18:
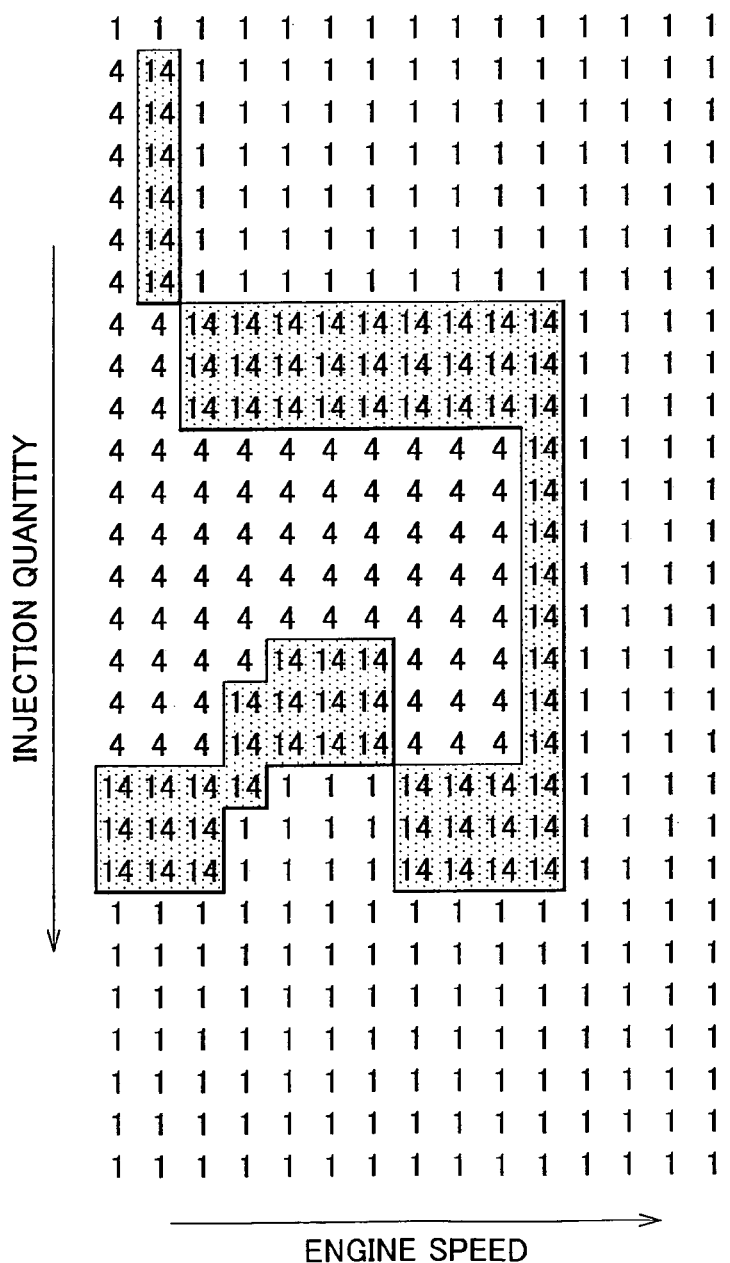
FIG. 18 is a partially enlarged view of the combustion mode map in the vehicular damping control system according to the second example embodiment of the invention.

FIG. 18 is a partially enlarged view of the combustion mode map. As shown in FIG. 18, the combustion mode map is set so that combustion modes 1 to 5 are uniquely determined by the relationship between the engine speed and the injection quantity. Hysteresis is provided in a switching region where the combustion mode switches in order to suppress frequent switching of the combustion mode. In FIG. 18, a "1" represents combustion mode 1, a "4" represents combustion mode 4, and a "14" represents a switching region where there is a switch between combustion mode 1 and combustion mode 4. This switching region is a hysteresis region.

Figure 19:
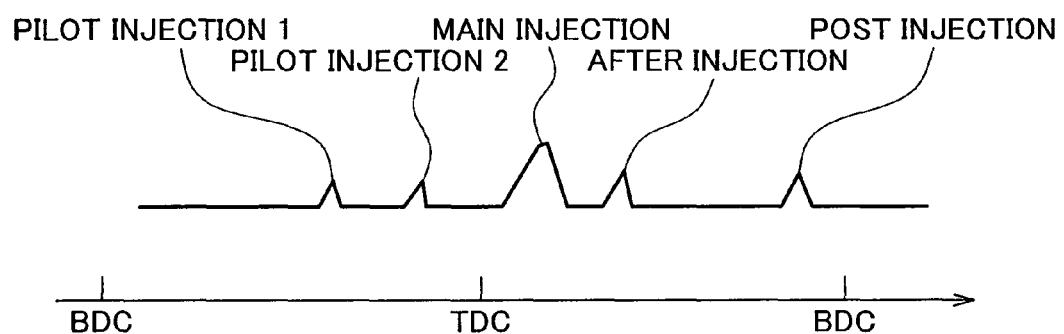
FIG. 19 is a view of the fuel injection timing in the vehicular damping control system according to the second example embodiment of the invention.

FIG. 19 is a view of the fuel injection timing. As shown in FIG. 19, various fuel injections are performed, which include a main injection, a pilot injection 1 and a pilot injection 2 that inject a minute amount of fuel before the main injection, an after injection that injects a minute amount of fuel after the main injection, and a post injection that injects fuel after the after injection.

The multiple injection modes are modes for setting a combination of the injections shown in FIG. 19, i.e., the main injection, the pilot injection 1, the pilot injection 2, and the after injection.

As shown in Table 3, there are six types of multiple injection modes: 0: no injection, 1: main injection only, 2: pilot injection 2+main injection, 3: pilot injection 1+pilot injection 2+main injection, 4: pilot injection 1+pilot injection 2+main injection+after injection, and 5: pilot injection 2+main injection+after injection.

As shown in Table 4, the multiple injection modes 0 to 5 are selected according to the combustion mode and the coolant temperature. That is, when the combustion mode is combustion mode 2, i.e., the EGR shut-off temperature increasing combustion mode, multiple injection mode 4 is selected. When the combustion mode is combustion mode 3, i.e., the temperature increasing multiple injection combustion mode, multiple injection mode 2 is selected. When the combustion mode is combustion mode 4, i.e., the low temperature combustion lean combustion mode, multiple injection mode 2 is selected, and when the combustion mode is combustion mode 5, i.e., the sulfur poisoning recovery combustion mode, multiple injection mode 2 is selected.

Figure 20A:
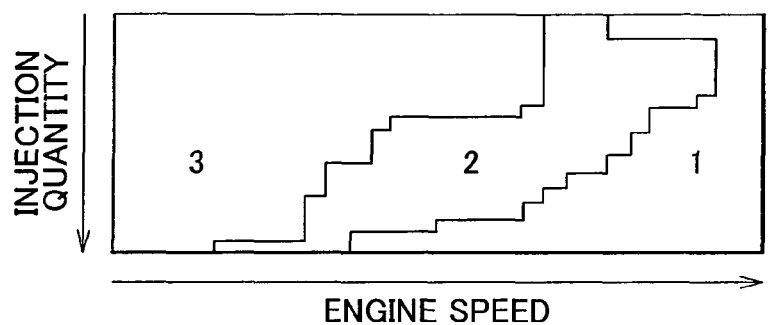
FIGS. 20A, 20B, and 20C are views of multiple injection mode maps in the vehicular damping control system according to the second example embodiment of the invention.
Figure 20B:
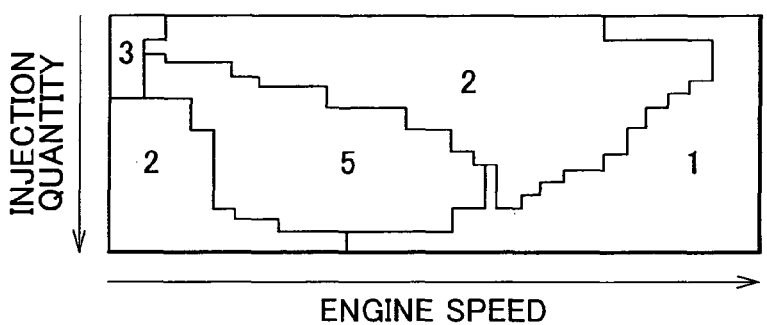
Figure 20C:
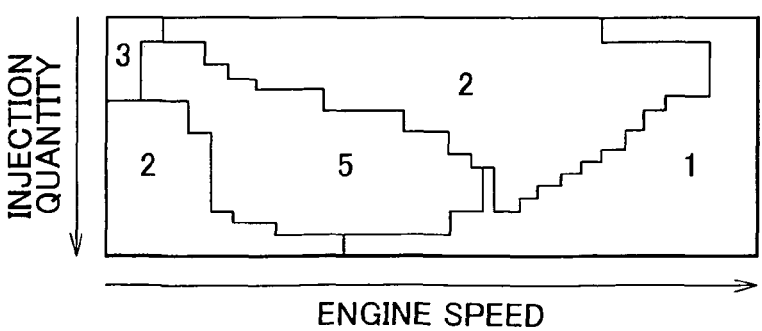

On the other hand, if the combustion mode is combustion mode 1, i.e., the normal combustion mode, any one of multiple injection modes 1, 2, 4, or 5 may be selected. A case in which the combustion mode is combustion mode 1, i.e., the normal combustion mode, will be described in detail. The implementation system 320 has a multiple injection mode map for selecting a multiple injection mode. FIGS. 20A, 20B, and 20C are views of multiple injection mode maps. As shown in FIGS. 20A, 20B, and 20C, the multiple injection mode maps are shown in two-dimensional table form with the engine speed and the injection quantity. The implementation system 320 has a multiple injection mode map corresponding to a low coolant temperature, a multiple injection mode map corresponding to a medium coolant temperature, and a multiple injection mode map corresponding to a high coolant temperature. As shown in FIG. 20A, the multiple injection mode map corresponding to a low coolant temperature is a map that selects one multiple injection mode from among multiple injection mode 1, multiple injection mode 2, and multiple injection mode 3. As shown in FIG. 20B, the multiple injection mode map corresponding to a medium coolant temperature is a map that selects one multiple injection mode from among multiple injection mode 1, multiple injection mode 2, multiple injection mode 3, and multiple injection mode 5. As shown in FIG. 20C, the multiple injection mode map corresponding to a high coolant temperature is a map that selects one multiple injection mode from among multiple injection mode 1, multiple injection mode 2, multiple injection mode 3, and multiple injection mode 5.

The control target vehicle 330 is a vehicle provided with an engine that is controlled by the implementation system 320. In the control target vehicle 330, a variety of information is able to be detected. This information includes the sprung mass vibration, the accelerator operation amount, the gear speed, the unsprung mass vibration, whether EGR is on or off, the exhaust gas temperature, the coolant temperature, the catalyst temperature, the PM accumulation amount, and the sulfur accumulation amount, and the like.

The sprung mass damping control apparatus 340 is an apparatus that performs sprung mass damping feedback control on the control target vehicle 330 by outputting the sprung mass damping required driving force for suppressing sprung mass vibration. That is, the sprung mass damping control apparatus 340 calculates the sprung mass damping required driving force for suppressing sprung mass vibration, based on feedback input of the various information detected in the control target vehicle 330. Then the sprung mass damping control apparatus 340 performs sprung mass damping feedback control on the control target vehicle 330 by adding that calculated sprung mass damping required driving force to the driver required driving force output from the driver required driving force estimating apparatus 310. Therefore, the sprung mass damping control apparatus 340 is provided with a sprung mass damping required driving force calculating portion 341 and a sprung mass damping required driving force outputting portion 342.

The sprung mass damping required driving force calculating portion 341 is a portion that calculates the sprung mass damping required driving force based on a predetermined damping model. In one example of this damping model, first a change in the vehicle speed is detected based on the feedback input from the control target vehicle 330. Next, the amount of change in the driving force that will bring about this change in the vehicle speed is calculated. Then the change in vehicle body posture is estimated. Here, bounce displacement and velocity and the pitch angle and angular velocity and the like may be used as the estimated state variables for estimating the change in the vehicle body posture. Next, the driving force correction amount necessary to suppress a change in the posture is calculated. Then the driving force correction amount is multiplied by a predetermined feedback constant Ks to calculate the sprung mass damping required driving force.

The sprung mass damping required driving force outputting portion 342 is a portion that executes sprung mass damping feedback control by outputting the sprung mass damping required driving force calculated by the sprung mass damping required driving force calculating portion 341. This sprung mass damping required driving force outputting portion 342 includes an abnormality determining portion 421, a cancel determining portion 422, a mode switching region determining portion 423, and a switching region control prohibiting portion 424.

The abnormality determining portion 421 is a portion that determines whether an abnormality has occurred in the sprung mass damping required driving force outputting portion 342.

The cancel determining portion 422 is a portion that cancels the sprung mass damping feedback control by the sprung mass damping control apparatus 340 when it has been determined in the abnormality determining portion 421 that an abnormality has occurred in the sprung mass damping required driving force outputting portion 342.

The mode switching region determining portion 432 is a portion that determines whether the combustion mode and the multiple injection mode will switch due to a change in the accelerator operation amount, the vehicle speed, or the gear speed or the like.

The switching region control prohibiting portion 424 is a portion that prohibits the sprung mass damping feedback control in a switching region of each mode of the combustion mode and the multiple injection mode, in a predetermined situation. The switching region control prohibiting portion 424 includes a sprung mass damping feedback control execution flag. When the switching region control prohibiting portion 424 sets the sprung mass damping feedback control execution flag, the sprung mass damping required driving force outputting portion 342 outputs the sprung mass damping required driving force calculated by the sprung mass damping required driving force calculating portion 341, thereby executing the sprung mass damping feedback control. On the other hand, when the switching region control prohibiting portion 424 resets the sprung mass damping feedback control execution flag, the sprung mass damping required driving force outputting portion 342 prohibits the sprung mass damping required driving force calculated by the sprung mass damping required driving force calculating portion 341 from being output, thereby prohibiting the sprung mass damping feedback control from being executed.

Next, the operation of the vehicular damping control system 301 according to this second example embodiment will be described with reference to FIG. 21 which is a flowchart illustrating a sprung mass damping feedback executing condition determining routine of the sprung mass damping required driving force outputting portion.

Figure 21:
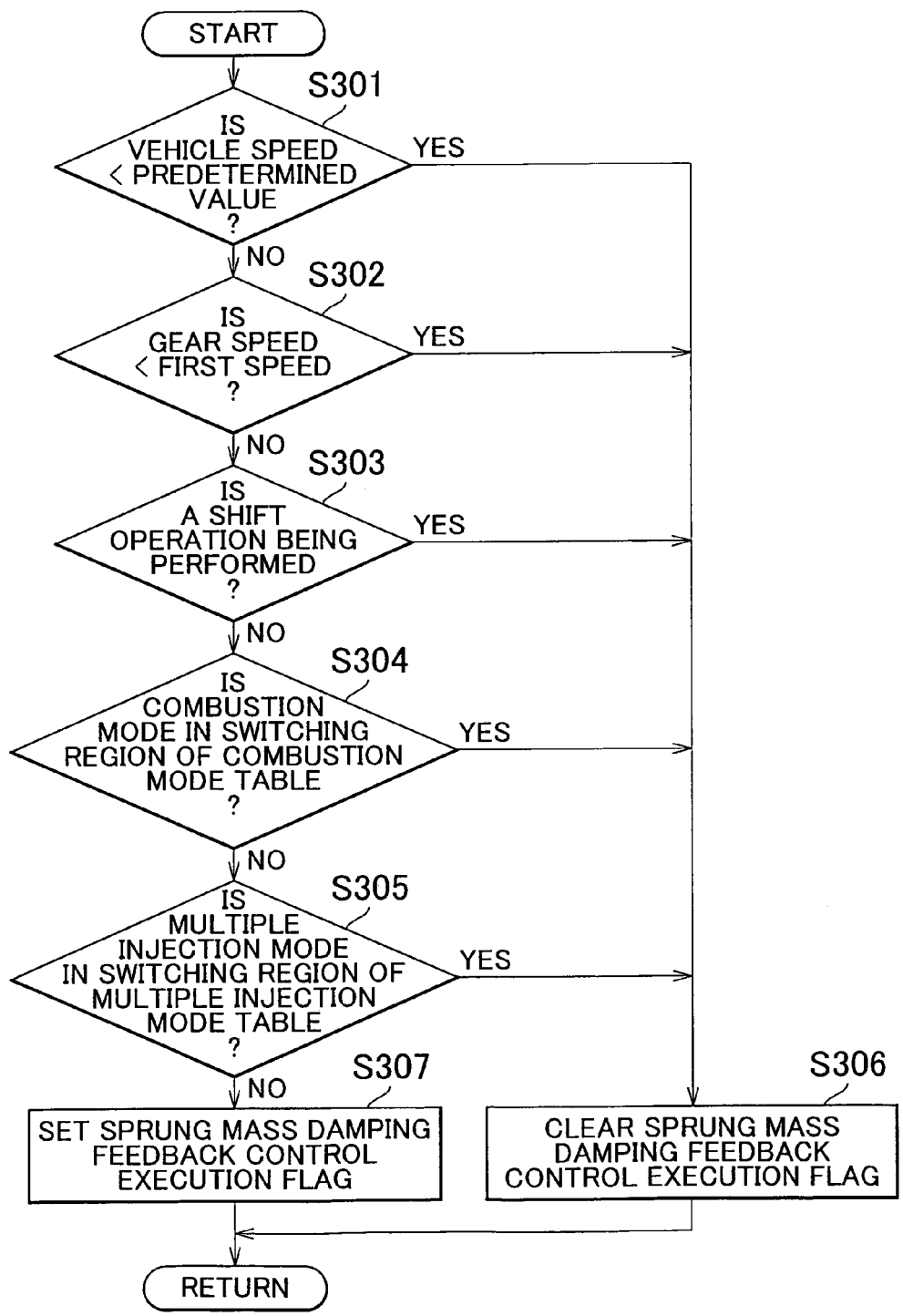
FIG. 21 is a flowchart illustrating a sprung mass damping feedback executing condition determining routine of a sprung mass damping required driving force outputting portion, in the vehicular damping control system according to the second example embodiment of the invention.

As shown in FIG. 21, first the sprung mass damping required driving force outputting portion 342 of the sprung mass damping control apparatus 340 determines whether the vehicle speed is less than a predetermined value based on the feedback input from the control target vehicle 330 (step S301).

If it is determined that the vehicle speed is less than the predetermined value (i.e., YES in step S301), the sprung mass damping required driving force outputting portion 342 determines that vehicle speed has not reached the speed range where sprung mass damping feedback control is executed, so the sprung mass damping required driving force outputting portion 342 clears the sprung mass damping feedback control execution flag (step S306). As a result, the sprung mass damping required driving force calculated by the sprung mass damping required driving force calculating portion 341 is prohibited from being output, and the sprung mass damping feedback control is prohibited from being executed.

If, on the other hand, it is determined that the vehicle speed is equal to or greater than the predetermined value (i.e., NO in step S301), the sprung mass damping required driving force outputting portion 342 then determines whether the gear speed is less than first speed (step S302). If at this time the shift position is such that the gear speed is neutral, reverse, or park or the like, it is determined that the gear speed is less than first speed.

If it is determined that the gear speed is less than first speed (i.e., YES in step S302), the sprung mass damping required driving force outputting portion 342 determines that it is not necessary to execute sprung mass damping feedback control and therefore clears the sprung mass damping feedback control execution flag (step S306). As a result, the sprung mass damping required driving force calculated by the sprung mass damping required driving force calculating portion 341 is prohibited from being output, and the sprung mass damping feedback control is prohibited from being executed.

If, on the other hand, it is determined that the gear speed is equal to or greater than first speed (i.e., NO in step S302), the sprung mass damping required driving force outputting portion 342 then determines whether the driver is performing a shift operation (step S303).

If it is determined that the driver is performing a shift operation (i.e., YES in step S303), the sprung mass damping required driving force outputting portion 342 determines that it is not necessary to execute sprung mass damping feedback control and clears the sprung mass damping feedback control execution flag (step S306). As a result, the sprung mass damping required driving force calculated by the sprung mass damping required driving force calculating portion 341 is prohibited from being output, and the sprung mass damping feedback control is prohibited from being executed.

If, on the other hand, it is determined that the driver is not performing a shift (i.e., NO in step S303), the sprung mass damping required driving force outputting portion 342 then determines whether the combustion mode selected based on the engine speed and the fuel injection quantity is in a switching region in the combustion mode map (step S304). That is, the sprung mass damping required driving force outputting portion 342 first calculates the fuel injection quantity to be realized by the implementation system 320 based on the engine speed. Next, the sprung mass damping required driving force outputting portion 342 detects the combustion mode that matches this injection quantity and the engine speed by referencing the combustion mode map selected based on the coolant temperature and the state of the catalyst. Then the sprung mass damping required driving force outputting portion 342 determines whether the detected combustion mode is in a switching region.

If it is determined that the combustion mode selected based on the engine speed and the fuel injection quantity is in a switching region of the combustion mode map (i.e., YES in step S304), the sprung mass damping required driving force outputting portion 342 clears the sprung mass damping feedback control execution flag (step S306). As a result, the sprung mass damping required driving force calculated by the sprung mass damping required driving force calculating portion 341 is prohibited from being output, and the sprung mass damping feedback control is prohibited from being executed.

If, on the other hand, it is determined that the combustion mode selected based on the engine speed and the fuel injection quantity is not in a switching region of the combustion mode map (i.e., NO in step S304), the sprung mass damping required driving force outputting portion 342 then determines whether the multiple injection mode selected based on the engine speed and the fuel injection quantity is in a switching region of the multiple injection mode map (step S305). That is, the sprung mass damping required driving force outputting portion 342 calculates the fuel injection quantity to be realized by the implementation system 320 based on the engine speed, just as in step S304. Next, the sprung mass damping required driving force outputting portion 342 detects the multiple injection mode that matches this injection quantity and the engine speed by referencing the multiple injection mode map selected based on the combustion mode and the coolant temperature. Then the sprung mass damping required driving force outputting portion 342 determines whether the detected multiple injection mode is in a switching region.

If it is determined that the multiple injection mode selected based on the engine speed and the fuel injection quantity is in a switching region of the multiple injection mode map (i.e., YES in step S305), the sprung mass damping required driving force outputting portion 342 clears the sprung mass damping feedback control execution flag (step S306). As a result, the sprung mass damping required driving force calculated by the sprung mass damping required driving force calculating portion 341 is prohibited from being output, and the sprung mass damping feedback control is prohibited from being executed.

If, on the other hand, it is determined that the multiple injection mode selected based on the engine speed and the fuel injection quantity is not in a switching region of the multiple injection mode map (i.e., NO in step S305), the sprung mass damping required driving force outputting portion 342 sets the sprung mass damping feedback control execution flag (step S307). As a result, the sprung mass damping required driving force calculated by the sprung mass damping required driving force calculating portion 341 is output, so this sprung mass damping required driving force is added to the driver required driving force output from the driver required driving force estimating apparatus 310, and the sprung mass damping feedback control of the control target vehicle 330 is executed.

Next, the operation of the vehicular damping control system 301 according to this second example embodiment will be described in greater detail.

First, a case in which a fluctuation component in the vicinity of approximately 1.5 Hz in the vertical direction is generated in the control target vehicle 330 will be considered. At this time, information such as the vehicle speed and the vibration is fed back from the control target vehicle 330 to the sprung mass damping control apparatus 340, so the sprung mass damping required driving force based on this feedback input is calculated in the sprung mass damping required driving force calculating portion 341 of the sprung mass damping control apparatus 340.

Then, if neither the combustion mode nor the multiple injection mode is in a switching region, this sprung mass damping required driving force is added to the driver required driving force output from the driver required driving force estimating apparatus 310, and anti-phase torque is output from the engine.

If, on the other hand, the combustion mode or the multiple injection mode is in a switching region, the sprung mass damping required driving force is prohibited from being output from the driver required driving force estimating apparatus 310, so anti-phase torque will not be output from the engine.

In this way, with the vehicular damping control system 301 according to the second example embodiment, the sprung mass damping feedback control is prohibited in a switching region of the combustion mode or the multiple injection mode of the engine, which makes it possible to prevent the combustion mode or the multiple injection mode from switching frequently due to the affect from sprung mass damping feedback control. As a result, torque fluctuation caused by the switching of the combustion mode or the multiple injection mode can be suppressed, so riding comfort can be improved.

Also, prohibiting anti-phase torque from being output from the engine in a switching region of the combustion mode or the multiple injection mode of the engine makes it possible to prevent the combustion mode or the multiple injection mode from switching frequently due to anti-phase torque being output when a fluctuation component of approximately 1.5 Hz in the vertical direction of the vehicle is generated. As a result, torque fluctuation caused by the switching of the combustion mode or the multiple injection mode can be suppressed, so riding comfort can be improved.

Next, a third example embodiment of the invention will be described. The vehicular damping control system according to this third example embodiment is basically similar to the vehicular damping control system according to the second example embodiment. Only the sprung mass damping required driving force outputting portion is different. Therefore, only the portions that differ from the second example embodiment will be described. Descriptions of portions that are the same as those in the second example embodiment will be omitted.

Figure 22:
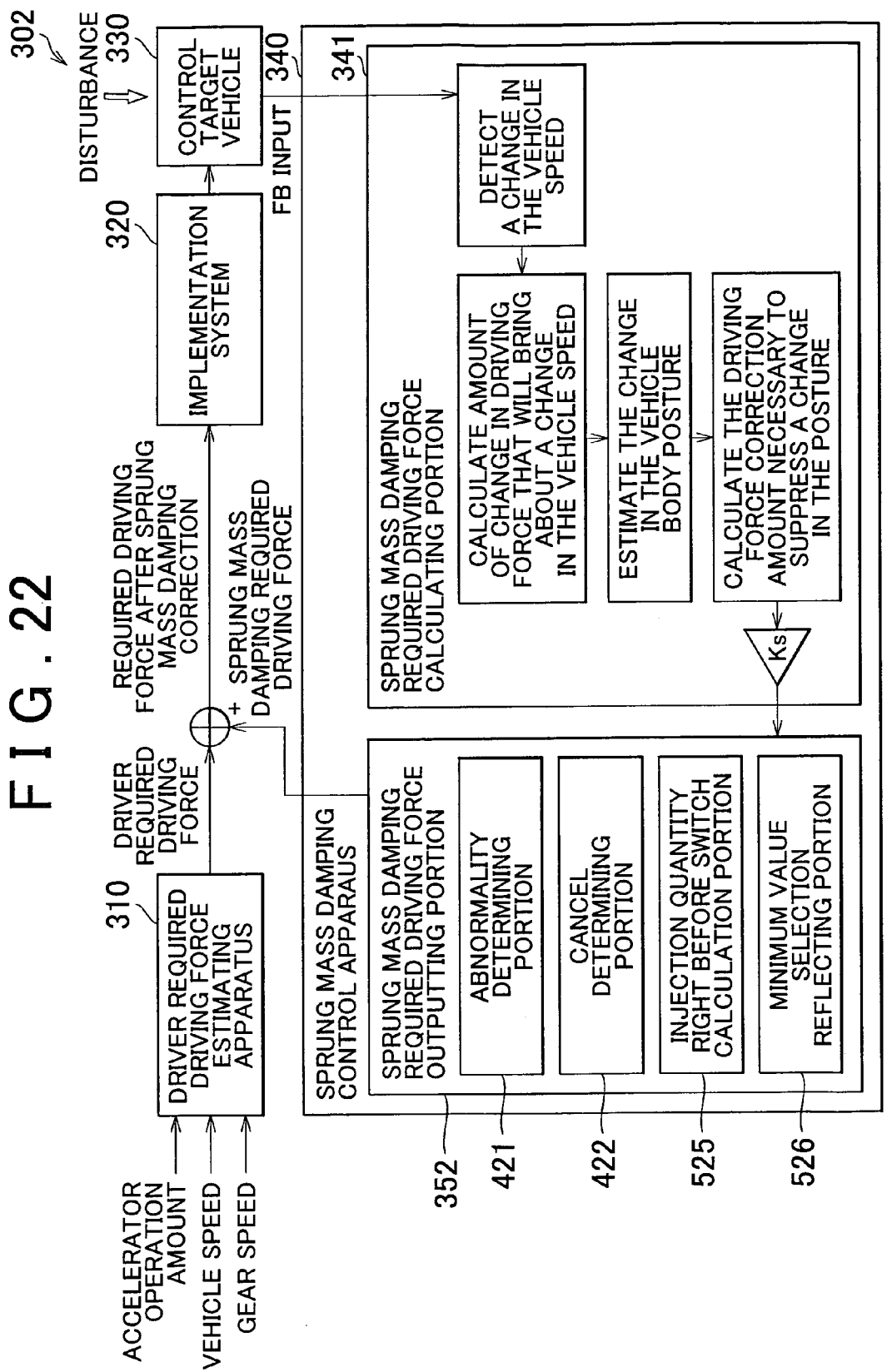
FIG. 22 is a view in the form of control blocks showing a frame format of an example of the functional structure of a vehicular damping control system according to a third example embodiment of the invention.

FIG. 22 is a view in the form of control blocks showing a frame format of an example of the functional structure of a vehicular damping control system according to the third example embodiment. As shown in FIG. 22, the vehicular damping control system 302 according to the third example embodiment has a sprung mass damping required driving force outputting portion 352 provided in the sprung mass damping control apparatus 340.

The sprung mass damping required driving force outputting portion 352 is a portion that outputs the sprung mass damping required driving force calculated by the sprung mass damping required driving force calculating portion 341 from the sprung mass damping control apparatus 340, thereby executing sprung mass damping feedback control. The sprung mass damping required driving force outputting portion 352 also changes the control amount in the sprung mass damping feedback control such that the sprung mass damping feedback control continues to be executed in the range where neither the combustion mode nor the multiple injection mode switches. Therefore, an abnormality determining portion 421 and a cancel determining portion 422 like those in the second example embodiment are provided in the sprung mass damping required driving force outputting portion 352. Further, in the third example embodiment, a portion that calculates the injection quantity right before a switch (hereinafter, simply referred to as an "injection quantity right before switch calculating portion") 525 and a minimum value selection reflecting portion 526 are also provided in the sprung mass damping required driving force outputting portion 352.

The injection quantity right before switch calculating portion 525 is a portion that calculates the injection quantity right before the mode switches (hereinafter simply referred to as the "injection quantity right before a mode switch"), when the combustion mode or the multiple injection mode of the engine switches due to a change in the engine speed resulting from a change in the driver required driving force or the like.

Figure 23:
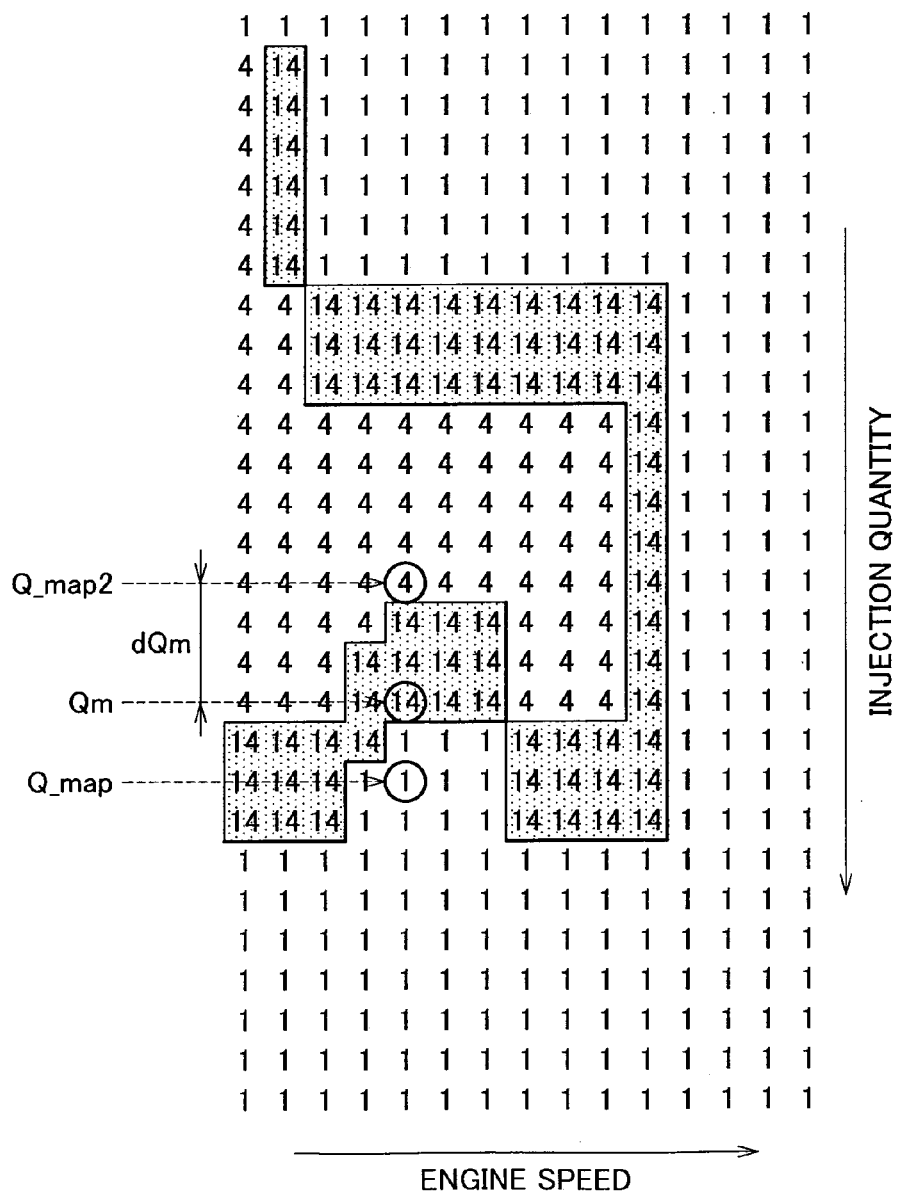
FIG. 23 is a view illustrating how the injection quantity immediately before a mode switch is calculated in the vehicular damping control system according to the third example embodiment of the invention.

FIG. 23 is a view illustrating how the injection quantity right before a mode switch is calculated, and is a partially enlarged view of the combustion mode map. In FIG. 23, Q_map represents the fuel injection quantity when the sprung mass damping required driving force calculated by the sprung mass damping required driving force calculating portion 341 has been added to the driver required driving force estimated by the driver required driving force estimating apparatus 310. Also, Q_map2 represents the fuel injection quantity when the sprung mass damping required driving force calculated by the sprung mass damping required driving force calculating portion 341 is not added to the driver required driving force estimated by the driver required driving force estimating apparatus 310. The injection quantity right before switch calculating portion 525 calculates an injection quantity right before a mode switch Qm of right before the combustion mode switches, when the injection quantity switches from Q_map2 to Q_map, by referencing this combustion mode map. Incidentally, the injection quantity right before switch calculating portion 525 is also able to calculate an injection quantity right before a mode switch Qm of right before the multiple injection mode switches, by referencing the multiple injection mode map.

The minimum value selection reflecting portion 526 is a portion that selects the smaller injection quantity, from among the injection quantity until the combustion mode switches and the injection quantity until the multiple injection mode switches.

Here, the relationship between the driving force and the injection quantity will be briefly described. With a diesel engine, the engine torque is determined almost entirely by the fuel injection quantity, so it is possible to convert between engine torque and injection quantity by referencing a map of the engine speed, injection quantity, and engine torque. Then the required driving force can be converted into the required injection quantity by converting first converting the required driving force into torque by dividing it by the tire radius, then converting this torque into engine torque by dividing it by the gear ratio, and finally calculating the injection quantity from this engine torque. Therefore, when controlling the engine, the required driving force may be given to the implementation system 320 and the implementation system 320 may calculate the required injection quantity, or the required injection quantity that has been converted from the required driving force may be given to the implementation system 320. Incidentally, as described above, the required driving force can be converted into the required injection quantity and vice versa, so for the sake of convenience in the description below, the required injection quantity may be used instead of the required driving force. In this case, the driver required injection quantity is output from the driver required driving force estimating apparatus 310, and the sprung mass damping required injection quantity is output from the sprung mass damping required driving force outputting portion 342, and a required injection quantity after the sprung mass, damping correction, which is obtained by adding the sprung mass damping required injection quantity to the driver required injection quantity, is output to the implementation system 320.

Figure 24:
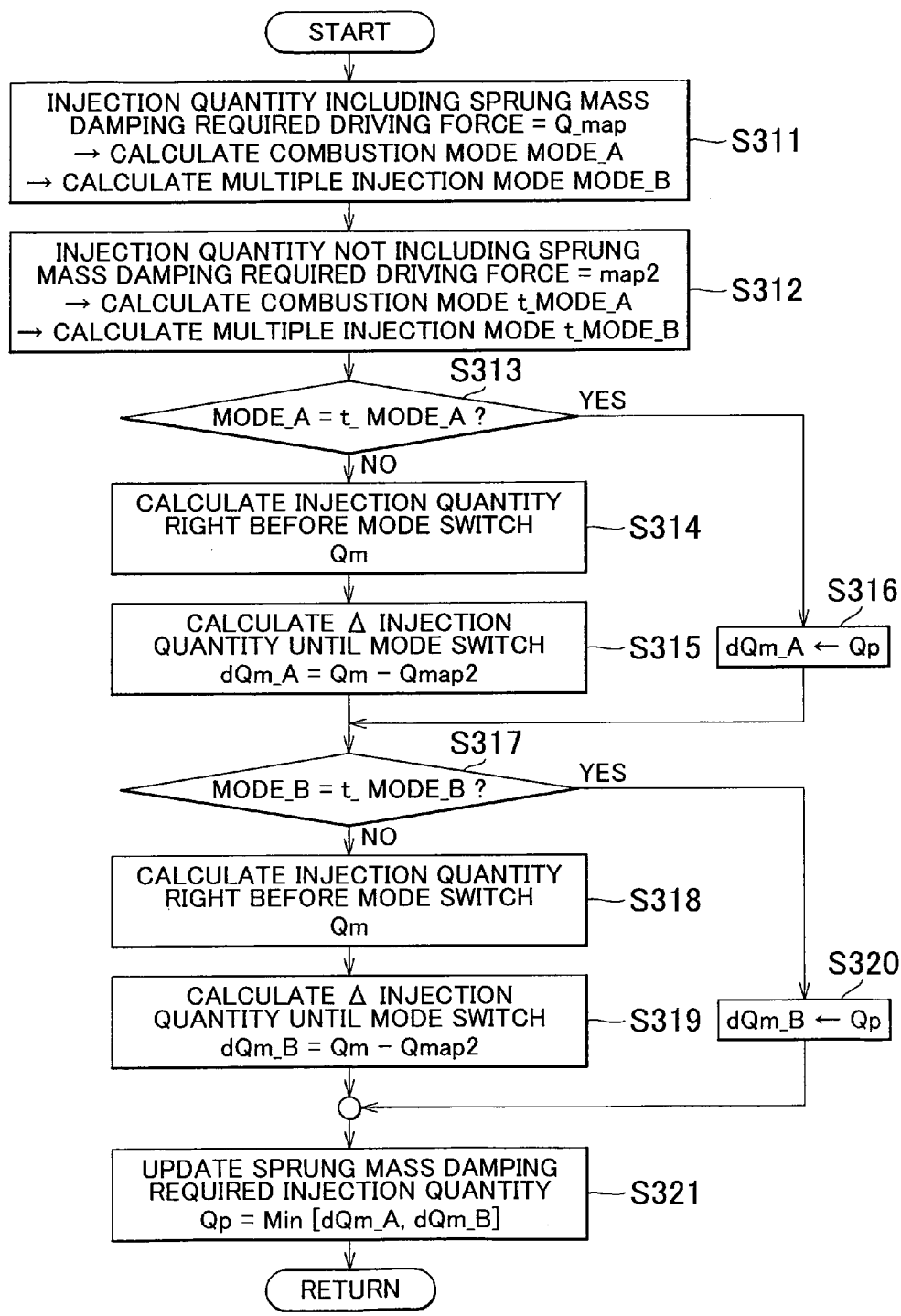
FIG. 24 is a flowchart illustrating a sprung mass damping control required injection quantity correction routine of the sprung mass damping required driving force outputting portion in the vehicular damping control system according to the third example embodiment of the invention.

Next, the operation of the vehicular damping control system 302 according to the third example embodiment will be described with reference to FIG. 24 which is a flowchart illustrating a sprung mass damping control required injection quantity correction routine of the sprung mass damping required driving force outputting portion.

First, the sprung mass damping required driving force outputting portion 352 of the sprung mass damping control apparatus 340 calculates a combustion mode MODE_A and a multiple injection mode MODE_B from the fuel injection quantity Q_map when the sprung mass damping required driving force calculated by the sprung mass damping required driving force calculating portion 341 has been added to the driver required driving force estimated by the driver required driving force estimating apparatus 310 (step S311).

Next, the sprung mass damping required driving force outputting portion 352 calculates a combustion mode t_MODE_A and a multiple injection mode t_MODE_B from the fuel injection quantity Q_map2 when the sprung mass damping required driving force calculated by the sprung mass damping required driving force calculating portion 341 is not added to the driver required driving force estimated by the driver required driving force estimating apparatus 310 (step S312).

Then the sprung mass damping required driving force outputting portion 352 determines whether MODE_A calculated in step S311 is the same as t_MODE_A calculated in step S312 (step S313).

If it is determined that MODE_A is different than t_MODE_A (i.e., NO in step S313), the sprung mass damping required driving force outputting portion 352 then calculates the injection quantity right before a mode switch Qm by referencing the combustion mode map (step S314).

Also, the sprung mass damping required driving force outputting portion 352 calculates a Δ injection quantity dQm_A, which is the difference in the injection quantity between the injection quantity Q_map2 and the injection quantity right before a mode switch Qm, by referencing the combustion mode map (step S315).

If, on the other hand, MODE_A is the same as t_MODE_A (i.e., YES in step S313), the sprung mass damping required driving force outputting portion 352 sets a sprung mass damping required injection quantity Qp that is based on the sprung mass damping required driving force calculated by the sprung mass damping required driving force calculating portion 341 as the Δ injection quantity dQm_A (step S316).

Next, the sprung mass damping required driving force outputting portion 352 determines whether MODE_B calculated in step S311 is the same as t_MODE_B calculated in step S312 (step S317).

If it is determined that MODE_B is different than t_MODE_B (i.e., NO in step S317), the sprung mass damping required driving force outputting portion 352 then calculates the injection quantity right before a mode switch Qm by referencing the multiple injection mode map (step S318).

Also, the sprung mass damping required driving force outputting portion 352 calculates a Δ injection quantity dQm_B, which is the difference in the injection quantity between the injection quantity Q_map2 and the injection quantity right before a mode switch Qm, by referencing the multiple injection mode map (step S319).

If, on the other hand, it is determined that MODE_B is the same as t_MODE_B (i.e., YES in step S317), the sprung mass damping required driving force outputting portion 352 sets the sprung mass damping required injection quantity Qp to be realized by the implementation system 320 based on the sprung mass damping required driving force calculated by the sprung mass damping required driving force calculating portion 341 as the Δ injection quantity dQm_B (step S320).

Then the sprung mass damping required driving force outputting portion 352 sets the smaller of the Δ injection quantities, from among the Δ injection quantity dZQm_A calculated in step S315 or S316 and the Δ injection quantity dZQm_B calculated in step S319 or S320, as the sprung mass damping required injection quantity Qp (step S321).

Then the sprung mass damping required driving force outputting portion 352 converts the sprung mass damping required injection quantity Qp calculated in step S321 to sprung mass damping required driving force, which it then outputs.

Accordingly, the sprung mass damping feedback control of the control target vehicle 330 is executed by the sprung mass damping required injection quantity Qp being output from the sprung mass damping control apparatus 340, and this sprung mass damping required injection quantity being added to the driver required injection quantity output from the driver required driving force estimating apparatus 310.

Next, the operation of the vehicular damping control system 302 according to the third example embodiment will be described in greater detail.

First, a case in which a fluctuation component in the vicinity of approximately 1.5 Hz in the vertical direction is generated in the control target vehicle 330 will be considered. At this time, information such as the vehicle speed and the vibration is fed back from the control target vehicle 330 to the sprung mass damping control apparatus 340, so the sprung mass damping required driving force is calculated based on this feedback input in the sprung mass damping required driving force calculating portion 341 of the sprung mass damping control apparatus 340.

The sprung mass damping required driving force becomes smaller from the sprung mass damping required driving force outputting portion 352, so anti-phase torque that is smaller than the required driving force is output from the engine. As a result, the suppression effect on the sprung mass vibration is reduced such that a slight sprung mass vibration remains. Also, the top portion of the injection quantity that is larger than the injection quantity until the mode switches is cut off, which creates an offset in the phase, but the switching of the combustion mode and the multiple injection mode is suppressed, so torque fluctuation is able to be suppressed.

In this way, with the vehicular damping control system 302 according to the third example embodiment, setting the smaller of the Δ injection quantities, from among the Δ injection quantity dZQm_A and the Δ injection quantity dZQm_B, as the sprung mass damping required injection quantity Qp enables sprung mass feedback control to continue being executed in the range where neither the combustion mode nor the multiple injection mode will switch. As a result, the combustion mode and the multiple injection mode can be prevented from switching while performing the sprung mass damping feedback control, so it is possible to prevent the effectiveness of the sprung mass damping feedback control from decreasing due to switching of the combustion mode and the multiple injection mode. Moreover, torque fluctuation caused by switching of the combustion mode and the multiple injection mode is suppressed, so riding comfort can be improved.

Also, outputting anti-phase torque from the engine in a range where the neither combustion mode nor the multiple injection mode will switch makes it possible to prevent the combustion mode and the multiple injection mode from switching, while suppressing vibration in the vehicle. As a result, it is possible to prevent the suppression effect on the vibration from decreasing due to the switching of the combustion mode and the multiple injection mode. In addition, torque fluctuation caused by the switching of the combustion mode and the multiple injection mode can be suppressed, so riding comfort can be improved.

Next, a fourth example embodiment of the invention will be described. The vehicular damping control system according to this fourth example embodiment is basically similar to the vehicular damping control systems according to the second and third example embodiments. Only the sprung mass damping required driving force outputting portion is different. Therefore, only the portions that differ from the second and third example embodiments will be described. Descriptions of portions that are the same as those in the second and third example embodiments will be omitted.

Figure 25:
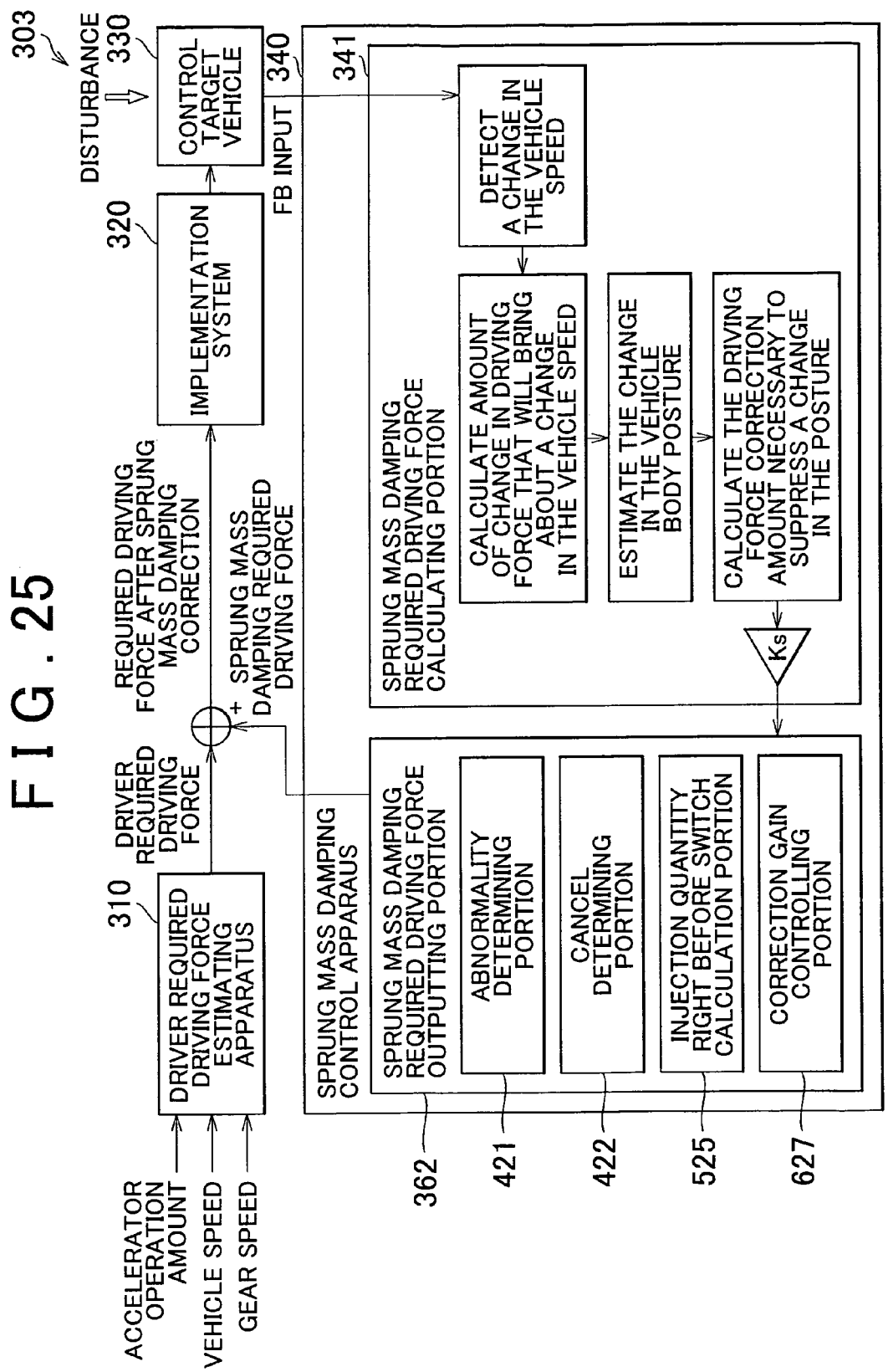
FIG. 25 is a view in the form of control blocks showing a frame format of an example of the functional structure of a vehicular damping control system according to a fourth example embodiment of the invention.

FIG. 25 is a view in the form of control blocks showing a frame format of an example of the functional structure of a vehicular damping control system according to the fourth example embodiment. As shown in FIG. 25, the vehicular damping control system 303 according to the fourth example embodiment has a sprung mass damping required driving force outputting portion 362 provided in the sprung mass damping control apparatus 340.

This sprung mass damping required driving force outputting portion 362 is a portion that outputs the sprung mass damping required driving force calculated by the sprung mass damping required driving force calculating portion 341 from the sprung mass damping control apparatus 340, thereby executing sprung mass feedback control. The sprung mass damping required driving force outputting portion 362 also changes (i.e., corrects) the gain of the output sprung mass damping required driving force (i.e., the damping required injection quantity) on the condition that neither the combustion mode nor the multiple injection mode change. Therefore, the sprung mass damping required driving force outputting portion 362 is provided with an abnormality determining portion 421, a cancel determining portion 422, and a injection quantity right before switch calculating portion 525, just as in the second and third example embodiments, as well as a correction gain controlling portion 627.

The correction gain controlling portion 627 is a portion that changes the correction gain of the sprung mass damping required injection quantity calculated by the sprung mass damping required driving force calculating portion 341, on the condition that neither the combustion mode nor the multiple injection mode change. More specifically, in the switching regions of the combustion mode and the multiple injection mode, the correction gain controlling portion 627 reduces the correction gain of the sprung mass damping required injection quantity either in a stepped manner or a continuous manner from 1.0 to 0. Also, in regions other than the switching regions of the combustion mode and the multiple injection mode, the correction gain controlling portion 627 increases the correction gain of the sprung mass damping required injection quantity either in a stepped manner or a continuous manner so that it returns to 1.0 (i.e., its original state).

Figure 26A:
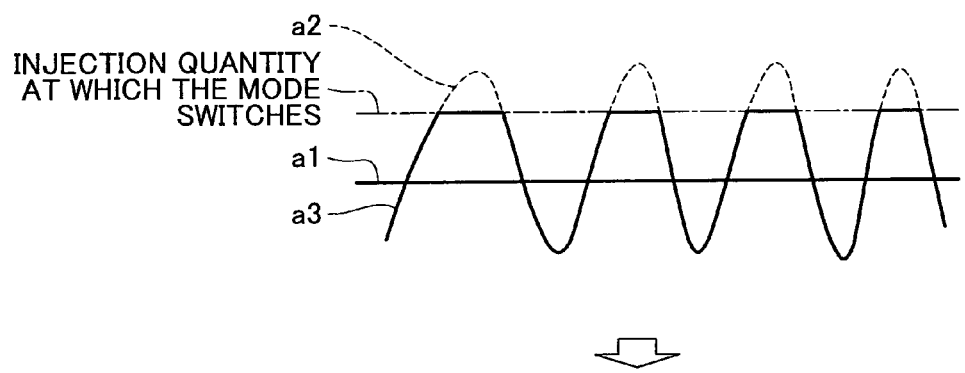
FIGS. 26A and 26B are views showing a gain correction of the sprung mass damping required injection quantity, of the vehicular damping control system according to the fourth example embodiment of the invention.
Figure 26B:
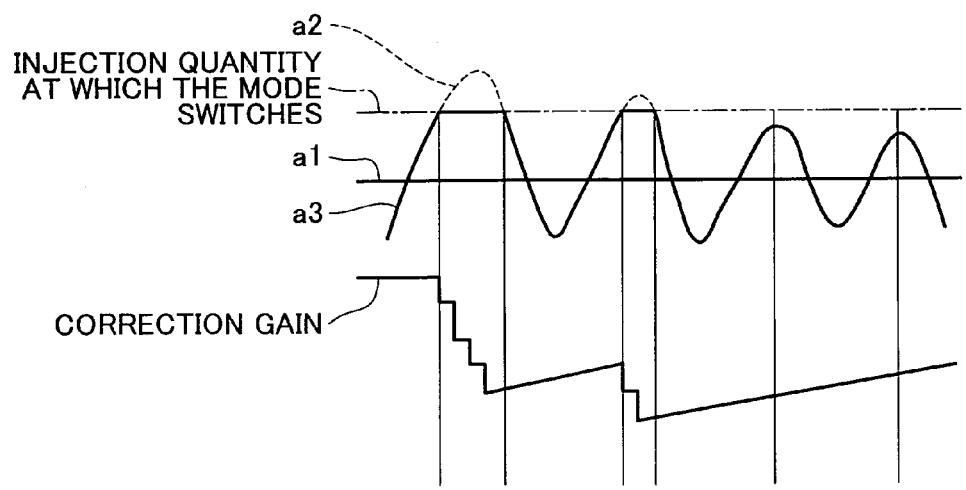

Here, the gain correction of the sprung mass damping required injection quantity will now be described with reference to FIGS. 26A and 26B which are views showing a gain correction of the sprung mass damping required injection quantity. FIG. 26A is a view of a case in which the gain correction of the sprung mass damping required injection quantity is not performed, and FIG. 26B is a view of a case in which the gain correction of the sprung mass damping required injection quantity is performed. In FIGS. 26A and 26B, the thin line a1 represents the driver required injection quantity output from the driver required driving force estimating apparatus 310, and the broken line a2 represents the required injection quantity after the sprung mass damping correction, which is obtained by adding the sprung mass damping required injection quantity to the driver required injection quantity a1. The thick line a3 represents the required injection quantity of the second example embodiment, and is the required injection quantity after the sprung mass damping correction when sprung mass damping feedback control is prohibited in the switching regions of the combustion mode and the multiple injection mode.

As shown in FIG. 26A, when a gain correction of the sprung mass damping required injection quantity is not performed, sprung mass damping feedback control is prohibited in the switching regions of the combustion mode and the multiple injection mode, so the top of the required injection quantity after the sprung mass damping correction a3 is cutoff in the switching region. In contrast, as shown in FIG. 26B, when a gain correction of the sprung mass damping required injection quantity is performed, the correction gain of the sprung mass damping required injection quantity a2 is reduced in a stepped manner from 1.0 when the operating point enters the switching regions of the combustion mode and the multiple injection mode. Then when the operating point leaves the switching regions of the combustion mode and the multiple injection mode, the correction gain of the sprung mass damping required injection quantity a2 is increased in a continuous manner. Repeatedly decreasing and increasing the correction gain in this way gradually reduces the amplitude of the required injection quantity after sprung mass damping correction a3, such that the top of the required injection quantity after sprung mass damping correction a3 will no longer be cut off.

Figure 27:
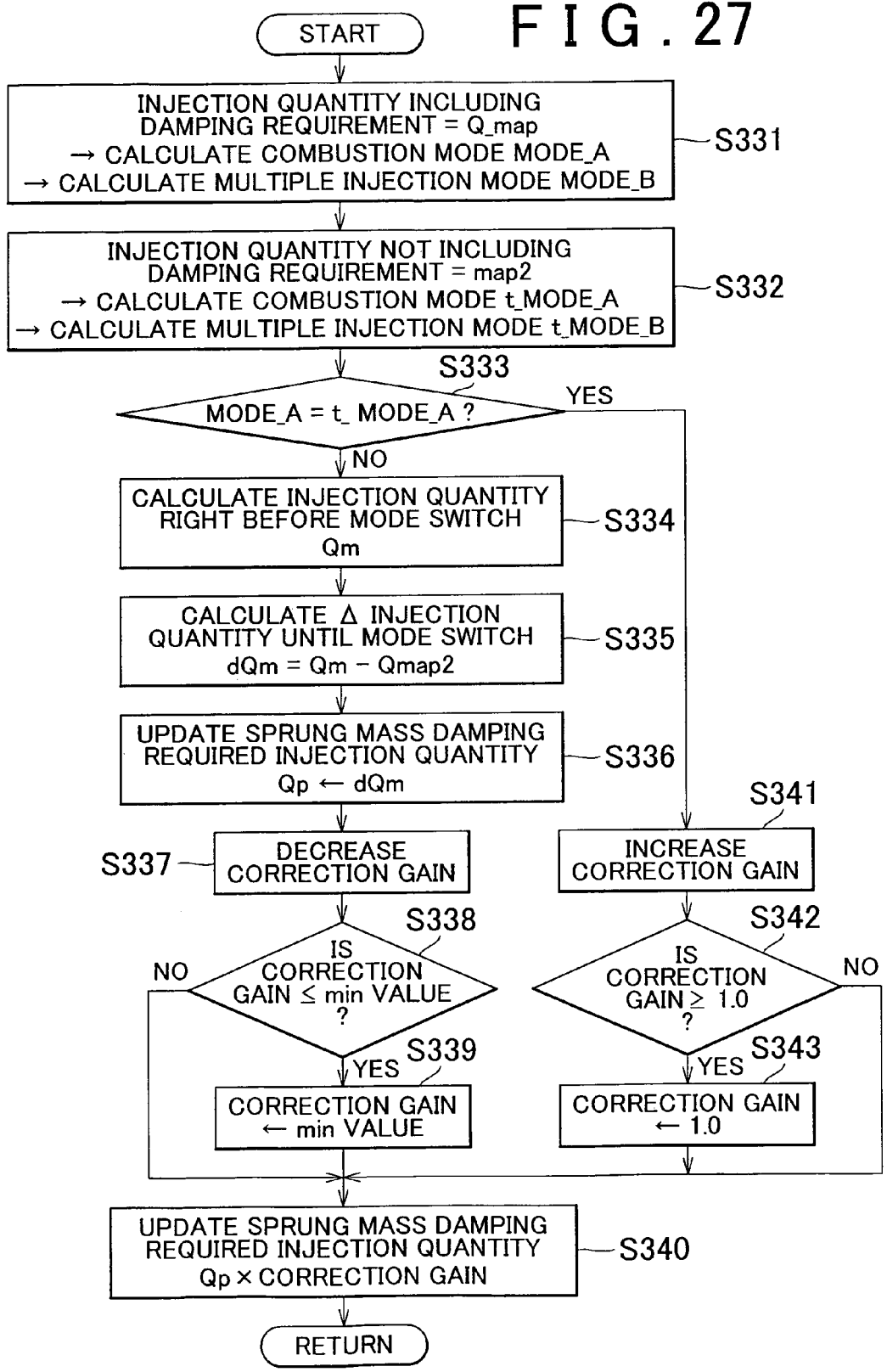
FIG. 27 is a flowchart illustrating a sprung mass damping control required injection quantity correction routine of the sprung mass damping required driving force outputting portion in the vehicular damping control system according to the fourth example embodiment of the invention.

Next, the operation of the vehicular damping control system 303 according to the fourth example embodiment will be described with reference to FIG. 27 which is a flowchart illustrating a sprung mass damping control required injection quantity correction routine of the sprung mass damping required driving force outputting portion.

First, the sprung mass damping required driving force outputting portion 362 of the sprung mass damping control apparatus 340 calculates the combustion mode MODE_A and the multiple injection mode MODE_B from the fuel injection quantity Q_map when the sprung mass damping required driving force calculated by the sprung mass damping required driving force calculating portion 341 has been added to the driver required driving force estimated by the driver required driving force estimating apparatus 310 (step S331).

Next, the sprung mass damping required driving force outputting portion 362 calculates the combustion mode t_MODE_A and the multiple injection mode t_MODE_B from the fuel injection quantity Q_map2 when the sprung mass damping required driving force calculated by the sprung mass damping required driving force calculating portion 341 is not added to the driver required driving force estimated by the driver required driving force estimating apparatus 310 (step S332).

Then, the sprung mass damping required driving force outputting portion 362 determines whether MODE_A calculated in step S311 is the same as t_MODE_A calculated in step S312 (step S333).

If it is determined that MODE_A is different than t_MODE_A (i.e., NO in step S333), the sprung mass damping required driving force outputting portion 362 then calculates the injection quantity right before a mode switch Qm by referencing the combustion mode map (step S334).

Next, the sprung mass damping required driving force outputting portion 362 calculates the Δ injection quantity dQm which is the difference in the injection quantity between the injection quantity Q_map2 and the injection quantity right before a mode switch Qm (step S335).

Then the sprung mass damping required driving force outputting portion 362 sets the Δ injection quantity dQm calculated in step S335 as the sprung mass damping required injection quantity Qp (step S336).

Next, the sprung mass damping required driving force outputting portion 362 decreases the correction gain (step S337). Here, the decrease value that decreases the correction gain is a value that is able to gradually decrease the correction gain. This decrease value is larger than the value for increasing the correction gain in step S341 which will be described later.

Then the sprung mass damping required driving force outputting portion 362 determines whether the correction gain is equal to or less than a min value (step S338). Here, the min value is a value within the range of 1.0 to 0, and is set beforehand.

If it is determined that the correction gain is equal to or less than the min value (i.e., YES in step S338), the sprung mass damping required driving force outputting portion 362 then updates the correction gain to this min value (step S339).

Then the sprung mass damping required driving force outputting portion 362 updates the sprung mass damping required injection quantity Qp by multiplying it by the correction gain updated in step S339 (step S340).

If, on the other hand, it, is determined that the correction gain is greater than the min value (i.e., NO in step S338), the sprung mass damping required driving force outputting portion 362 then updates the sprung mass damping required injection quantity Qp by multiplying it by the correction gain decreased in step S337 (step S340).

On the other hand, if it is determined in step S333 that MODE_A is the same as t_MODE_A (i.e., YES in step S333), the sprung mass damping required driving force outputting portion 362 then increases the correction gain (step S341). Here, the increase value that increases the correction gain is a value that is able to gradually increase the correction gain. This increase value is smaller than the decrease value that decreases the correction gain in step S337.

Next, the sprung mass damping required driving force outputting portion 362 determines whether the correction gain is equal to or greater than 1.0 (step S342).

If it is determined that the correction gain is equal to or greater than 1.0 (i.e., YES in step S342), the sprung mass damping required driving force outputting portion 362 updates the correction gain to 1.0 (step S343).

Then the sprung mass damping required driving force outputting portion 362 updates the sprung mass damping required injection quantity Qp by multiplying it by the correction gain updated in step S343 (step S340).

If; on the other hand, it is determined that the correction gain is less than 1.0 (i.e., NO in step S342), the sprung mass damping required driving force outputting portion 362 updates the sprung mass damping required injection quantity Qp by multiplying it by the correction gain increased in step S341 (step S340).

Accordingly, the sprung mass damping feedback control of the control target vehicle 330 is executed by the sprung mass damping required injection quantity Qp being output from the sprung mass damping control apparatus 340 and this sprung mass damping required injection quantity Qp being added to the driver required injection quantity output from the 310.

Next, the operation of the vehicular damping control system 303 according to this fourth example embodiment will be described in greater detail.

First, a case in which a fluctuation component in the vicinity of approximately 1.5 Hz in the vertical direction is generated in the control target vehicle 330 will be considered. At this time, information such as the vehicle speed and the vibration is fed back from the control target vehicle 330 to the sprung mass damping control apparatus 340, so the sprung mass damping required driving force (i.e., the sprung mass damping required injection quantity) is calculated based on this feedback input in the sprung mass damping required driving force calculating portion 341 of the sprung mass damping control apparatus 340.

The sprung mass damping required driving force becomes smaller from the sprung mass damping required driving force outputting portion 362, so anti-phase torque that is smaller than the required driving force is output from the engine. As a result, the suppression effect on the sprung mass vibration is reduced such that a slight sprung mass vibration remains, but switching of the combustion mode and the multiple injection mode is suppressed so torque fluctuation is able to be suppressed. Also, initially, the top portion of the injection quantity that is larger than the injection quantity until the mode switches is cut off, but the phase offset is able to be eliminated by reducing the gain.

In the sprung mass damping required driving force outputting portion 362, the correction gain of the sprung mass damping required driving force (i.e., the sprung mass damping required injection quantity) calculated in step S341 is changed in a range where neither the combustion mode nor the multiple injection mode will switch. As a result, anti-phase torque is output from the engine without the combustion mode or the multiple injection mode switching.

In this way, the vehicular damping control system 303 of the invention prevents the top of the required injection quantity after sprung mass damping correction a3 from being cut off by changing the correction gain of the sprung mass damping required injection quantity on the condition that neither the combustion mode nor the multiple injection mode will switch. As a result, the control amount in the sprung mass damping feedback control can be changed smoothly, so riding comfort can be improved.

Also, the gain of the anti-phase torque output from the engine is corrected in the range where neither the combustion mode nor the multiple injection mode switch, so switching of the combustion mode and the multiple injection mode can be prevented while torque fluctuation is made smooth. As a result, it is possible to prevent the vibration suppression effect from decreasing due to the switching of the combustion mode and the multiple injection mode, and torque fluctuation caused by switching of the combustion mode and the multiple injection mode is able to be suppressed, so riding comfort can be improved.

Next, a fifth example embodiment of the invention will be described. The vehicular damping control system according to this fifth example embodiment is basically similar to the vehicular damping control system according to the second example embodiment. Only the sprung mass damping required driving force outputting portion is different. Therefore, only the portions that differ from the second example embodiment will be described. Descriptions of portions that are the same as those in the second example embodiment will be omitted.

Figure 28:
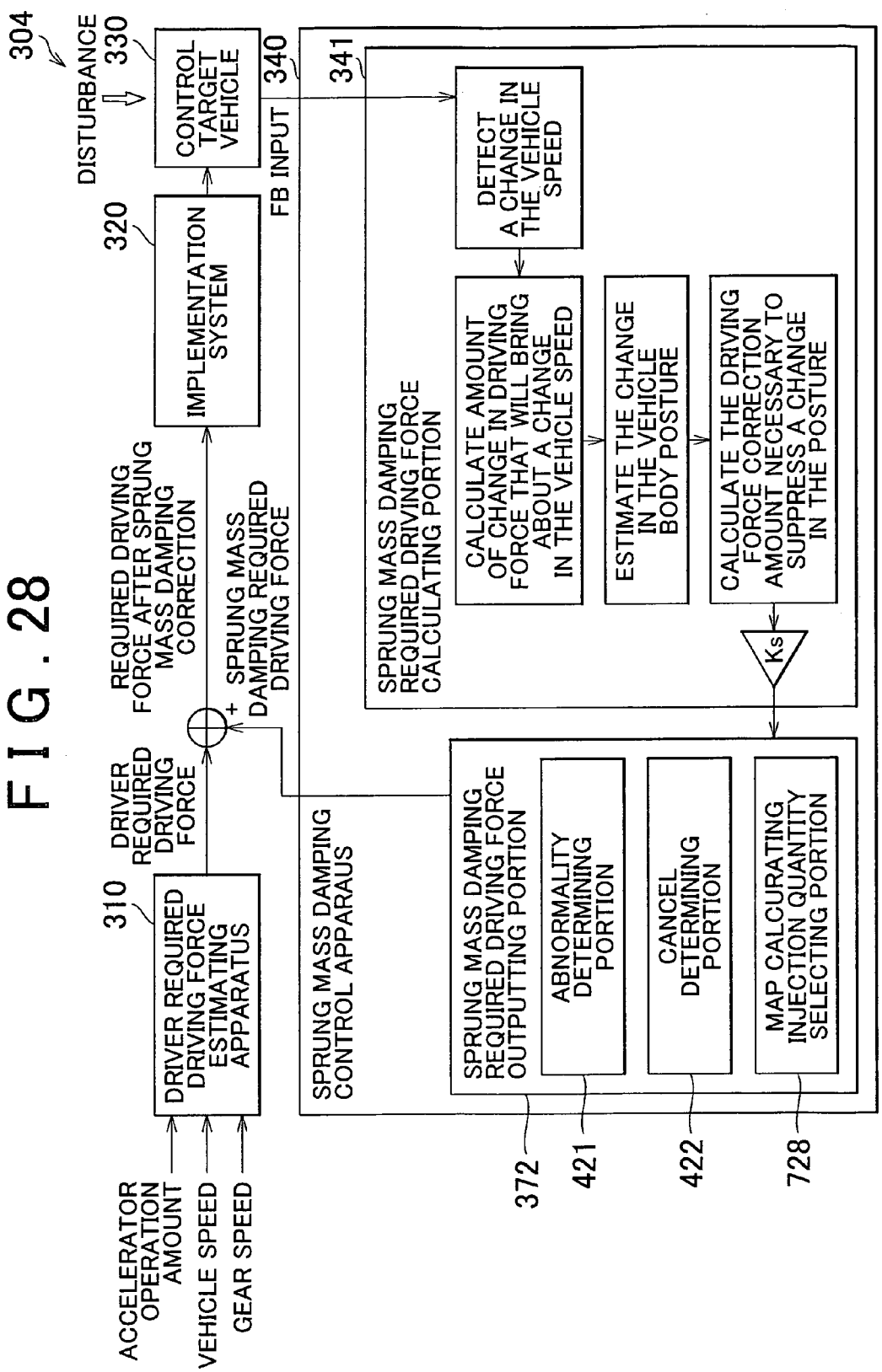
FIG. 28 is a view in the form of control blocks showing a frame format of an example of the functional structure of a vehicular damping control system according to a fifth example embodiment of the invention.

FIG. 28 is a view in the form of control blocks showing a frame format of an example of the functional structure of a vehicular damping control system according to the fifth example embodiment. As shown in FIG. 28, the vehicular damping control system 304 according to the fifth example embodiment has a sprung mass damping required driving force outputting portion 372 provided in the sprung mass damping control apparatus 340.

This sprung mass damping required driving force outputting portion 372 is a portion that outputs the sprung mass damping required driving force calculated by the sprung mass damping required driving force calculating portion 341 from the sprung mass damping control apparatus 340, thereby executing the sprung mass damping feedback control. The sprung mass damping required driving force outputting portion 372 also subtracts the sprung mass damping required injection quantity from a mode calculating injection quantity for selecting the combustion mode and the multiple injection mode, when effects will be produced when the mode switches, with any combination of the combustion modes and the multiple injection modes. That is, the vehicular damping control system 304 calculates the map calculating injection quantity that is used when selecting a combustion mode from the combustion mode map and a multiple injection mode from the multiple injection mode map in the implementation system 320, without adding the sprung mass damping required injection quantity.

Therefore, the sprung mass damping required driving force outputting portion 372 is provided with the abnormality determining portion 421 and the cancel determining portion 422, just as in the second example embodiment, as well as a map calculating injection quantity selecting portion 728.

Here, the effects produced when the mode switches will be described. With the combustion mode, the effects include, for example, i) temporarily not being able to ensure accuracy due to a gas response delay in a mode with or without EGR, i) errors occurring in the relationship between the injection quantity and the engine torque, ii) and unstable flow characteristics of the injection valve (i.e., not being able to ensure accuracy during a small flowrate). In the multiple injection mode, the injection quantity is divided into a main injection, a pilot injection, and an after injection. The effect in this case is that a difference in the efficiency with which supplied energy is converted into work occurs due to the injection timings being changed. Incidentally, normally those things that are affected are corrected, but the range of torque controlled by the sprung mass damping feedback control is small and the correction accuracy may not always be able to be ensured when the injection quantity is changed by the damping frequency.

The map calculating injection quantity selecting portion 728 calculates the map calculating injection quantity used when selecting the combustion mode from the combustion mode map and the multiple injection mode from the multiple injection mode map in the implementation system 320. The implementation system 320 sets the required driving force after the sprung mass damping correction, which is obtained by adding the sprung mass damping required injection quantity to the driver required injection quantity, as the map calculating injection quantity. Then the implementation system 320 selects the combustion mode and the multiple injection mode based on this map calculating injection quantity and the engine speed by referencing the combustion mode map and the multiple injection mode map, and performs engine control accordingly. Therefore, the map calculating injection quantity selecting portion 728 subtracts the sprung mass damping required injection quantity from the map calculating injection quantity used for mode selection in this implementation system 320, so as to suppress frequent switching of the combustion mode and the multiple injection mode. More specifically, the map calculating injection quantity selecting portion 728 calculates the map calculating injection quantity without adding the sprung mass damping required injection quantity, and then selects the combustion mode and the multiple injection mode based on this calculated map calculating injection quantity.

Next, the process performed by the vehicular damping control system 304 according to this fifth example embodiment will be described with reference to FIG. 29 which is a process chart illustrating a process performed by the sprung mass damping required driving force outputting portion.

Figure 29:
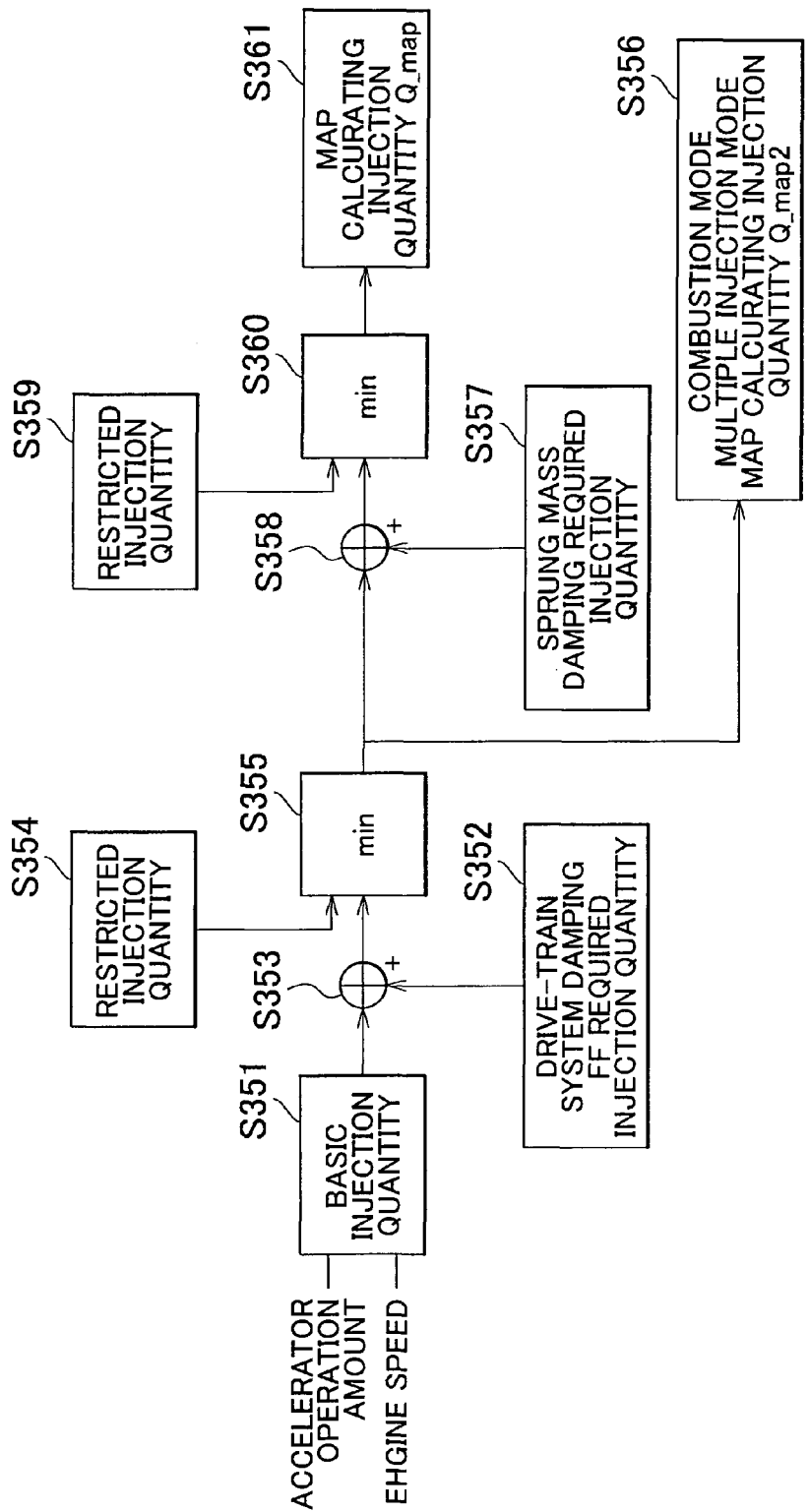
FIG. 29 is a process chart illustrating a process performed by the sprung mass damping required driving force outputting portion in the vehicular damping control system according to a fifth example embodiment of the invention.

As shown in FIG. 29, first, the sprung mass damping required driving force outputting portion 372 calculates a basic injection quantity determined from the accelerator operation amount and the engine speed (step S351).

The sprung mass damping required driving force outputting portion 372 also calculates a drive-train damping FF required injection quantity that is obtained by converting the amount of torque that suppresses drive-train resonance into an injection quantity (step S352).

Next, the sprung mass damping required driving force outputting portion 372 adds the drive-train damping FF required injection quantity calculated in step S352 to the basic injection quantity calculated in step S351.

Also, the sprung mass damping required driving force outputting portion 372 calculates a restricted injection quantity determined by various restrictions (step S354). This restricted injection quantity is an injection quantity that is restricted to control the engine in an appropriate manner, such as an injection quantity that is the limit beyond which smoke will be generated.

Next, the sprung mass damping required driving force outputting portion 372 compares the injection quantity calculated in step S353 with the restricted injection quantity calculated in step S354 and selects the smaller of the two injection quantities (step S355).

Then the sprung mass damping required driving force outputting portion 372 sets the injection quantity selected in step S355 as the map calculating injection quantity for selecting the combustion mode and the multiple injection mode, and sets this map calculating injection quantity as the injection quantity Q_map2 described above (step S356). This injection quantity Q_map2 is the injection quantity that is only used when selecting the combustion mode and the multiple injection mode by referencing the combustion mode map and the multiple injection mode map.

Meanwhile, the sprung mass damping required driving force outputting portion 372 obtains the sprung mass damping required injection quantity calculated by the sprung mass damping required driving force calculating portion 341 (step S357).

Next, the sprung mass damping required driving force outputting portion 372 adds the sprung mass damping required injection quantity obtained in step S357 to the injection quantity selected in step S355 (step S358).

Then the sprung mass damping required driving force outputting portion 372 obtains the restricted injection quantity calculated in step S354 (step S359).

Next, the sprung mass damping required driving force outputting portion 372 compares the injection quantity calculated in step S358 with the restricted injection quantity obtained in step S354, and selects the smaller of the two injection quantities (step S360).

Then the sprung mass damping required driving force outputting portion 372 sets the injection quantity selected in step S360 as the map calculating injection quantity for selecting the combustion mode and the multiple injection mode, and sets this map calculating injection quantity as the injection quantity Q_map described above (step S361). This injection quantity Q_map is an injection quantity for a map in which the various parameters are injection quantities.

Accordingly, in the implementation system 320, the combustion mode and the multiple injection mode are selected using the injection quantity Q_map2 obtained in step S356, and engine control is performed accordingly.

Next, the operation of the vehicular damping control system 304 according to this fifth example embodiment will be described in greater detail.

First, a case in which a fluctuation component in the vicinity of approximately 1.5 Hz in the vertical direction is generated in the control target vehicle 330 will be considered. At this time, information such as the vehicle speed and the vibration is fed back from the control target vehicle 330 to the sprung mass damping control apparatus 340, so the sprung mass damping required driving force (i.e., the sprung mass damping required injection quantity) is calculated based on this feedback input in the sprung mass damping required driving force calculating portion 341 of the sprung mass damping control apparatus 340.

Then in the sprung mass damping control apparatus 340, only the mode calculating injection quantity for selecting the combustion mode and the multiple injection mode is changed. The sprung mass damping required driving force is not changed, so anti-phase torque that corresponds to the required driving force is output from the engine.

In this way, with the vehicular damping control system 304 according to the fifth example embodiment, the combustion mode and the multiple injection mode can be prevented from switching while sprung mass damping feedback control is performed, by selecting the combustion mode and the multiple injection mode using the injection quantity Q_map2 obtained by subtracting the sprung mass damping required injection quantity from the mode calculating injection quantity. As a result, torque fluctuation caused by switching of the combustion mode and the multiple injection mode is able to be suppressed, so riding comfort can be improved.

Further, in the regions where the combustion mode and the multiple injection mode switch, frequent switching of the combustion mode and the multiple injection mode due to anti-phase torque being output from the engine according to the sprung mass damping feedback control can be prevented by selecting the combustion mode and the multiple injection mode based on the injection quantity minus the sprung mass damping required injection quantity. As a result, in the regions where the combustion mode and the multiple injection mode switch, it is possible to prevent the combustion mode and the multiple injection mode from switching frequently while performing sprung mass damping feedback control, by outputting anti-phase torque from the engine when a fluctuation component of approximately 1.5 Hz has occurred in the vertical direction of the vehicle.

Next, a sixth example embodiment of the invention will be described. The vehicular damping control system according to this sixth example embodiment is basically similar to the vehicular damping control system according to the fifth example embodiment. Only the sprung mass damping required driving force outputting portion is different. Therefore, only the portions that differ from the fifth example embodiment will be described. Descriptions of portions that are the same as those in the second example embodiment will be omitted.

Figure 30:
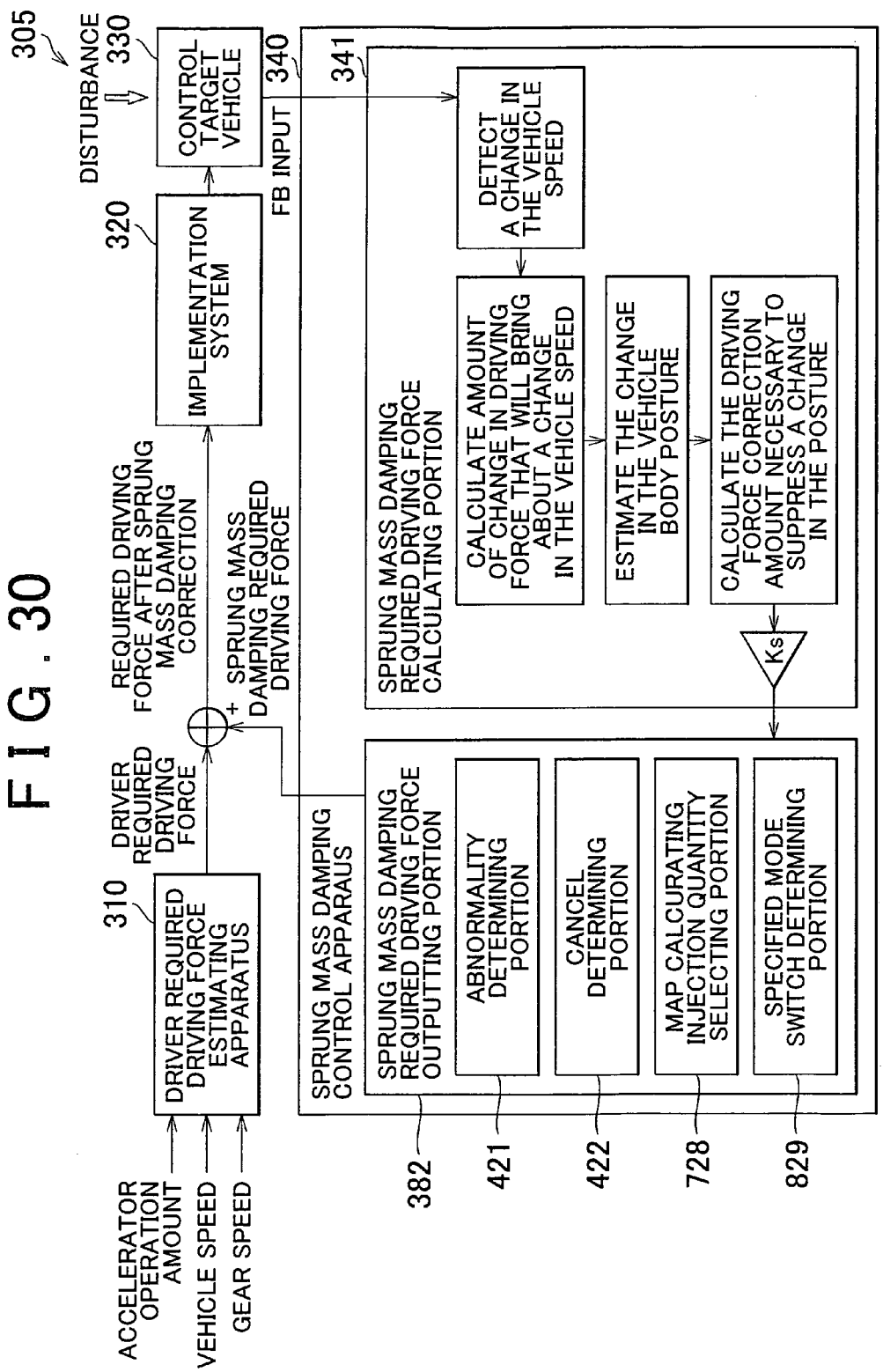
FIG. 30 is a view in the form of control blocks showing a frame format of an example of the functional structure of a vehicular damping control system according to a sixth example embodiment of the invention.

FIG. 30 is a view in the form of control blocks showing a frame format of an example of the functional structure of a vehicular damping control system according to the sixth example embodiment of the invention. As shown in FIG. 30, the vehicular damping control system has a sprung mass damping required driving force outputting portion 382 provided in the sprung mass damping control apparatus 340.

This sprung mass damping required driving force outputting portion 382 is a portion that outputs the sprung mass damping required driving force calculated by the sprung mass damping required driving force calculating portion 341 from the sprung mass damping control apparatus 340, thereby executing sprung mass damping feedback control. The sprung mass damping required driving force outputting portion 382 also subtracts the sprung mass damping required injection quantity from a mode calculating injection quantity for selecting the combustion mode and the multiple injection mode, when effects will be produced when the mode switches, with any combination of the combustion modes and the multiple injection modes. That is, the vehicular damping control system 305 calculates the map calculating injection quantity that is used when selecting a combustion mode from the combustion mode map and a multiple injection mode from the multiple injection mode map in the implementation system 320, without adding the sprung mass damping required injection quantity. Incidentally, the effects produced when a specified mode switches are the same as those described in the fifth example embodiment. Therefore, the sprung mass damping required driving force outputting portion 382 is provided with the abnormality determining portion 421, and the cancel determining portion 422, just as in the second example embodiment, and the map calculating injection quantity selecting portion 728, as well as a specified mode switch determining portion 829.

This specified mode switch determining portion 829 is a portion that determines a specified combination with which a predetermined effect described above will be produced by a switch of the combustion mode and the multiple injection mode. The specified combination of the combustion mode and the multiple injection mode with which the predetermined effect will be produced by the switch is stored in advance in the specified mode switch determining portion 829. Then the specified mode switch determining portion 829 determines whether the combustion mode and the multiple injection mode switched by the implementation system 320 is the pre-stored specified combination.

Next, the operation of the vehicular damping control system 305 according to this sixth example embodiment will be described with reference to FIG. 31 which is a flowchart illustrating a mode calculation by the sprung mass damping required driving force outputting portion. Incidentally, in the description below, a predetermined effect is produced by switching the combination of mode X and mode Y, and the predetermined effect will not be produced by switching any other combination.

As shown in FIG. 31, first, the sprung mass damping required driving force outputting portion 382 calculates a combustion mode t_MODE from the fuel injection quantity Q_map when the sprung mass damping required injection quantity calculated by the sprung mass damping required driving force calculating portion 341 has been added to the driver required injection quantity estimated by the driver required driving force estimating apparatus 310 (step S371).

Next, the sprung mass damping required driving force outputting portion 382 stores the combustion mode t_MODE calculated in step S371 in temporary reflection mode storing RAM "MODE_A" (step S372).

Then the sprung mass damping required driving force outputting portion 382 determines whether the t_MODE calculated in step S371 is mode X or mode Y (step S373).

If it is determined that the t_MODE is neither mode X nor mode Y (i.e., NO in step S373), the sprung mass damping required driving force outputting portion 382 then determines that the mode combination is one in which effects will not be produced by a switch, and this cycle of the mode calculation routine ends. Accordingly, the implementation system 320 performs engine control in the combustion mode stored in the temporary reflection mode storing RAM "MODE_A" in step S372, i.e., the mode selected based on the fuel injection quantity Q_map when the sprung mass damping required injection quantity has been added.

If, on the other hand, it is determined that the t_MODE is mode X or mode Y (i.e., YES in step S373), the sprung mass damping required, driving force outputting portion 382 then determines whether the t_MODE is mode X (step S374).

If it is determined that the t_MODE is mode X (i.e., YES in step S374), the sprung mass damping required driving force outputting portion 382 then determines whether the combustion mode before the mode switch (i.e., the last combustion mode) is mode Y (step S375).

If it is determined that the last combustion mode is not mode Y (i.e., NO in step S375), the sprung mass damping required driving force outputting portion 382 then determines that the mode combination is one in which effects will not be produced by a switch, and then this cycle of the mode calculation routine ends. Accordingly, the implementation system 320 performs engine control in the combustion mode stored in the temporary reflection mode storing RAM "MODE_A" in step S372, i.e., the mode selected based on the fuel injection quantity Q_map when the sprung mass damping required injection quantity has been added.

If, on the other hand, it is determined that the last combustion mode is mode Y (i.e., YES in step S375), the sprung mass damping required driving force outputting portion 382 determines that the mode combination is one in which effects will be produced by a switch, so the process proceeds on to step S376.

Also, if it is determined in step S374 described above that the t_MODE is not mode X (i.e., NO in step S374), the sprung mass damping required driving force outputting portion 382 then determines whether the last combustion mode is mode X (step S378).

If it is determined that the last combustion mode is not mode X (i.e., NO in step S378), the sprung mass damping required driving force outputting portion 382 then determines that the mode combination is one in which effects will not be produced by a switch, and then this cycle of the mode calculation routine ends. Accordingly, the implementation system 320 performs engine control in the combustion mode stored in the temporary reflection mode storing RAM "MODE_A" in step S372, i.e., the mode selected based on the fuel injection quantity Q_map when the sprung mass damping required injection quantity has been added.

If, on the other hand, the last combustion mode is mode X (i.e., YES in step S378), the sprung mass damping required driving force outputting portion 382 then determines that the mode combination is one in which effects will be produced by a switch, so the process proceeds on to step S376.

When the process proceeds on to step S376, the sprung mass damping required driving force outputting portion 382 calculates the combustion mode t_MODE from the fuel injection quantity Q_map2 in which the sprung mass damping required injection quantity calculated by the sprung mass damping required driving force calculating portion 341 is not added to the driver required injection quantity estimated by the driver required driving force estimating apparatus 310 (step S376).

Next, the sprung mass damping required driving force outputting portion 382 stores the combustion mode t_MODE calculated in step S376 in the temporary reflection mode storing RAM "MODE_A" (step S377). Accordingly, the implementation system 320 performs engine control in the combustion mode stored in the temporary reflection mode storing RAM "MODE_A" in step S377, i.e., the mode selected based on the fuel injection quantity Q_map2 when the sprung mass damping required injection quantity is not added.

FIG. 32 is a view showing a switch between mode X and mode Y. As shown in FIG. 32, when there is a switch between mode X and mode Y, the combustion mode is selected based on the fuel injection quantity when the sprung mass damping required injection quantity is not added. Therefore, when the combustion mode t_MODE calculated in step S376 is stored in the temporary reflection mode storing RAM "MODE_A", the combustion mode is fixed until the injection quantity Q_map changes and becomes an injection quantity in which the combustion mode will switch.

Next, the operation of the vehicular damping control system 305 according to this sixth example embodiment will be described in greater detail.

First, a case in which a fluctuation component in the vicinity of approximately 1.5 Hz in the vertical direction is generated in the control target vehicle 330 will be considered. At this time, information such as the vehicle speed and the vibration is fed back from the control target vehicle 330 to the sprung mass damping control apparatus 340, so the sprung mass damping required driving force (i.e., the sprung mass damping required injection quantity) is calculated based on this feedback input in the sprung mass damping required driving force calculating portion 341 of the sprung mass damping control apparatus 340.

Then in the sprung mass damping control apparatus 340, only the mode calculating injection quantity for selecting the combustion mode and the multiple injection mode is changed. The sprung mass damping required driving force is not changed, so anti-phase torque that corresponds to the required driving force is output from the engine.

In this way, with the vehicular damping control system 305 according to the sixth example embodiment, the combustion mode and the multiple injection mode can be prevented from switching while sprung mass damping feedback control is performed, by selecting the combustion mode based on the fuel injection quantity when the sprung mass damping required injection quantity is not added, when the mode combination is switched to a specified mode combination. As a result, torque fluctuation caused by a switch of the combustion mode can be suppressed, so riding comfort can be improved.

While the invention has been described with reference to example embodiments thereof, it should be understood that the invention is not limited to the example embodiments or constructions. For example, in the example embodiments described above, the map calculating injection quantity selecting portion 728 and the specified mode switch determining portion 829 function as the sprung mass damping control apparatus 340, but they may also function as the implementation system 320, for example.

Also, in the example embodiments described above, combustion modes 1 to 5 and multiple injection modes 1 to 5 are used as the control modes of the engine. Alternatively, however, various modes related to the engine, such as fuel injection and ignition timing, may also be used.

Further, in the example embodiments described above, the damping control damps vibration in the vertical direction that is input to the sprung mass. Alternatively, however, the target for damping may also be the entire vehicle. Also, the damping control may dampen vibration in the lateral direction of the vehicle.

TABLE 1

| | CATALYST CONTROL MODES |
|---|---|
| 0 | NORMAL MODE |
| 1 | NOx REDUCTION MODE |
| 2 | SULFUR POISONING RECOVERY MODE |
| 3 | PM REGENERATION MODE |

TABLE 2

COMBUSTION MODES

1 NORMAL COMBUSTION MODE
2 EGR SHUT-OFF TEMPERATURE INCREASING COMBUSTION MODE
3 TEMPERATURE INCREASING MULTIPLE INJECTION COMBUSTION MODE
4 LOW TEMPERATURE COMBUSTION LEAN COMBUSTION MODE
5 SULFUR POISONING RECOVERY COMBUSTION MODE

TABLE 3

MULTIPLE INJECTION MODES

0 NO INJECTION
1 MAIN INJECTION ONLY
2 PILOT INJECTION 2 + MAIN INJECTION
3 PILOT INJECTION 1 + PILOT INJECTION 2 + MAIN INJECTION
4 PILOT INJECTION 1 + PILOT INJECTION 2 + MAIN INJECTION + AFTER INJECTION
5 PILOT INJECTION 2 + MAIN INJECTION + AFTER INJECTION

TABLE 4

| | MULTIPLE INJECTION MODE | | |
|---|---|---|---|
| COMBUSTION MODE | LOW COOLANT TEMPERATURE | MEDIUM COOLANT TEMPERATURE | HIGH COOLANT TEMPERATURE |
| 1 | 3, 2, 1 | 5, 3, 2, 1 | 5, 3, 2, 1 |
| 2 | | 4 | |
| 3 | | 2 | |
| 4 | | 2 | |
| 5 | | 2 | |

The invention claimed is:

1. A vehicular damping control system comprising an ECU that executes damping control that suppresses sprung mass vibration in a vehicle by controlling an engine mounted in the vehicle,
wherein a control mode of the engine related to fuel combustion switches if engine speed and injection quantity fall within a predetermined region, and the damping control is prohibited when the engine speed and the injection quantity fall within the predetermined region.

2. The vehicular damping control system according to claim 1, wherein a control mode of the damping control is changed according to a control mode of the engine that is selected according to a state of the engine.

3. The vehicular damping control system according to claim 1, wherein a control amount of the damping control is reduced in a region where the control mode of the engine is switching compared to a region where the control mode of the engine is not switching.

4. The vehicular damping control system according to claim 1, wherein a control mode of the damping control is changed such that the damping control will continue to be executed in a region where the control mode of the engine is not switching.

5. The vehicular damping control system according to claim 4, wherein an execution state of the damping control is determined based on a control amount until the control mode of the engine switches.

6. The vehicular damping control system according to claim 4, wherein an execution state of the damping control is determined based on a condition that the control mode of the engine is not switching.

7. The vehicular damping control system according to claim 6, wherein a gain of the damping control is corrected.

8. The vehicular damping control system according to claim 1, wherein the engine is a diesel engine.

9. The vehicular damping control system according to claim 1, wherein when a vibration fluctuation component of approximately 1.5 Hz is generated in a vertical direction of the vehicle, damping control is performed by outputting anti-phase torque from the engine.

10. The vehicular damping control system according to claim 9, wherein anti-phase torque is prohibited from being output from the engine in a region where a control mode of the engine that is selected according to a usage region of the engine switching.

11. The vehicular damping control system according to claim 9, wherein anti-phase torque is output from the engine in a range where a control mode of the engine that is selected according to a usage region of the engine not switching.

12. The vehicular damping control system according to claim 9, wherein a gain of anti-phase torque output from the engine is corrected in a range where a control mode of the engine that is selected according to a usage region of the engine not switching.

13. The vehicular damping control system according to claim 9, wherein a control mode of the engine is selected precluding the anti-phase torque that is output from the engine by the damping control, in a region where the control mode of the engine that is selected according to a usage region of the engine switches.

14. A vehicular damping control system comprising an ECU that executes damping control that suppresses sprung mass vibration in a vehicle by controlling a power source mounted in the vehicle,
wherein the damping control is prohibited when a control mode of the power source is in one of a combustion mode switching region and an injection mode switching region.

15. The vehicular damping control system according to claim 14, wherein the control mode of the damping control is changed such that the damping control will continue to be executed in a region other than the combustion mode switching region and the injection mode switching region.

16. The vehicular damping control system according to claim 14, wherein the power source includes at least an engine, and when a vibration fluctuation component of approximately 1.5 Hz is generated in a vertical direction of the vehicle, damping control is performed by outputting anti-phase torque from the engine.

* * * * *